US008182867B2

(12) United States Patent
Goh et al.

(10) Patent No.: US 8,182,867 B2
(45) Date of Patent: *May 22, 2012

(54) PRODUCING COMPOSITE NANOPARTICLES CONTAINING ORGANIC IONS

(75) Inventors: Cynthia M. Goh, Toronto (CA); Jose Amado Dinglasan, Toronto (CA); Jane B. Goh, Toronto (CA); Richard Loo, Toronto (CA); Darren Anderson, Toronto (CA)

(73) Assignee: Vive Crop Protection, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/163,449

(22) Filed: Jun. 17, 2011

(65) Prior Publication Data

US 2012/0029109 A1 Feb. 2, 2012

Related U.S. Application Data

(63) Continuation of application No. 12/116,869, filed on May 7, 2008, now Pat. No. 8,003,166, which is a continuation of application No. 11/745,377, filed on May 7, 2007, now Pat. No. 7,964,277, and a continuation of application No. 11/749,507, filed on May 16, 2007, now abandoned, said application No. 11/745,377 is a continuation of application No. PCT/CA2006/001686, filed on Oct. 13, 2006.

(60) Provisional application No. 60/726,184, filed on Oct. 14, 2005.

(51) Int. Cl.
 *B05D 1/24* (2006.01)
(52) U.S. Cl. ............... 427/212; 427/213.13; 424/499; 528/481
(58) Field of Classification Search .............. 427/212, 427/213.13; 424/499; 528/481
See application file for complete search history.

(56) References Cited

U.S. PATENT DOCUMENTS

| | | | |
|---|---|---|---|
| 5,433,797 A | 7/1995 | Erb et al. | |
| 5,807,636 A | 9/1998 | Sheu et al. | |
| 5,874,111 A * | 2/1999 | Maitra et al. | 424/499 |
| 6,090,858 A | 7/2000 | El-Sayed | |
| 6,562,403 B2 | 5/2003 | Klabunde et al. | |
| 6,607,994 B2 | 8/2003 | Soane et al. | |
| 6,616,869 B2 | 9/2003 | Mathiowitz et al. | |
| 6,632,671 B2 | 10/2003 | Unger et al. | |
| 6,649,138 B2 | 11/2003 | Adams et al. | |
| 6,680,013 B1 | 1/2004 | Stein et al. | |
| 6,721,083 B2 | 4/2004 | Jacobson et al. | |
| 6,846,345 B1 | 1/2005 | Keller et al. | |
| 7,022,156 B2 | 4/2006 | Hattori et al. | |
| 7,108,915 B2 | 9/2006 | Adams et al. | |
| 7,129,293 B2 | 10/2006 | Kataoka et al. | |
| 7,147,917 B2 | 12/2006 | Adams et al. | |
| 7,189,279 B2 | 3/2007 | Guillet et al. | |
| 7,217,457 B2 | 5/2007 | Elaissari et al. | |
| 7,267,875 B2 | 9/2007 | Whiteford et al. | |
| 7,303,819 B2 | 12/2007 | Brotzman, Jr. | |
| 7,319,127 B2 | 1/2008 | Kim et al. | |
| 7,534,490 B1 * | 5/2009 | Goh et al. | 428/402 |
| 7,594,949 B2 * | 9/2009 | Guillet | 75/362 |
| 7,666,506 B2 | 2/2010 | Rieger et al. | |
| 7,964,277 B2 * | 6/2011 | Goh et al. | 428/403 |
| 8,003,166 B2 * | 8/2011 | Goh et al. | 427/212 |
| 2003/0082237 A1 | 5/2003 | Cha et al. | |
| 2003/0124194 A1 | 7/2003 | Gaw et al. | |
| 2003/0129405 A1 | 7/2003 | Zhang et al. | |
| 2004/0079195 A1 * | 4/2004 | Perry et al. | 75/345 |
| 2005/0245658 A1 | 11/2005 | Mehrotra et al. | |
| 2006/0153929 A1 | 7/2006 | Drake | |
| 2006/0251896 A1 | 11/2006 | Ferencz et al. | |
| 2007/0054119 A1 | 3/2007 | Garstecki et al. | |
| 2007/0101825 A1 | 5/2007 | He | |
| 2007/0154709 A1 | 7/2007 | Koch et al. | |
| 2007/0218019 A1 | 9/2007 | Andre et al. | |
| 2007/0243145 A1 | 10/2007 | Andre et al. | |
| 2007/0264481 A1 | 11/2007 | DeSimone et al. | |
| 2008/0020051 A1 | 1/2008 | Dahne et al. | |
| 2008/0081192 A1 * | 4/2008 | Goh et al. | 428/407 |
| 2010/0119829 A1 | 5/2010 | Karpov et al. | |

FOREIGN PATENT DOCUMENTS

| | | |
|---|---|---|
| CN | 1129044 A | 8/1996 |
| CN | 1566381 A | 1/2005 |
| CN | 1649922 A | 8/2005 |
| JP | 2005161238 A | 6/2005 |
| WO | WO9501643 | 1/1995 |
| WO | WO2006076636 | 7/2006 |
| WO | WO 2007038192 | 4/2007 |
| WO | WO 2007041862 A1 * | 4/2007 |
| WO | WO 2007106771 | 9/2007 |

OTHER PUBLICATIONS

International Search Report for PCT/IB2008/000817 (2008).
Laguecir et al., "Charge Polymer/Nanoparticles Mixtures Monte Carlo Simulations," Chimia 56: 702-706 (2002).
Office Action for Chinese Patent Application No. 20060047088.6, date of issue Apr. 14, 2010.
Search Report for International Application No. PCT/CA2006/001686.
Supplementary European Search Report for EP 06 79 08 41 (Mar. 2010).
Written Opinion for International Application No. PCT/CA2006/001686.

(Continued)

*Primary Examiner* — Leszek Kiliman
(74) *Attorney, Agent, or Firm* — Choate Hall & Stewart LLP; Charles E. Lyon; Jeffrey E. Buchholz

(57) ABSTRACT

A method for producing a composite nanoparticle, including the steps of, collapsing at least a portion of a polyelectrolyte polymer in solution about one or more precursor moieties to form a composite precursor moiety having a mean diameter in the range between about 1 nm and about 100 nm, wherein the polyelectrolyte polymer has an extended conformation in a first solution state and a more compact conformation in a second solution state; and cross-linking the polyelectrolyte polymer of the composite precursor moiety to form a composite nanoparticle wherein the precursory moiety is a charged organic ion.

28 Claims, 35 Drawing Sheets

OTHER PUBLICATIONS

Written Opinion for PCT/IB2008/000817 (2008).
Examination Report for European Patent Application No. 067908418.8.
Office Action for European Patent Application No. 067908418.8.
Office Action for Japanese Patent Application No. 2008-534839.

* cited by examiner

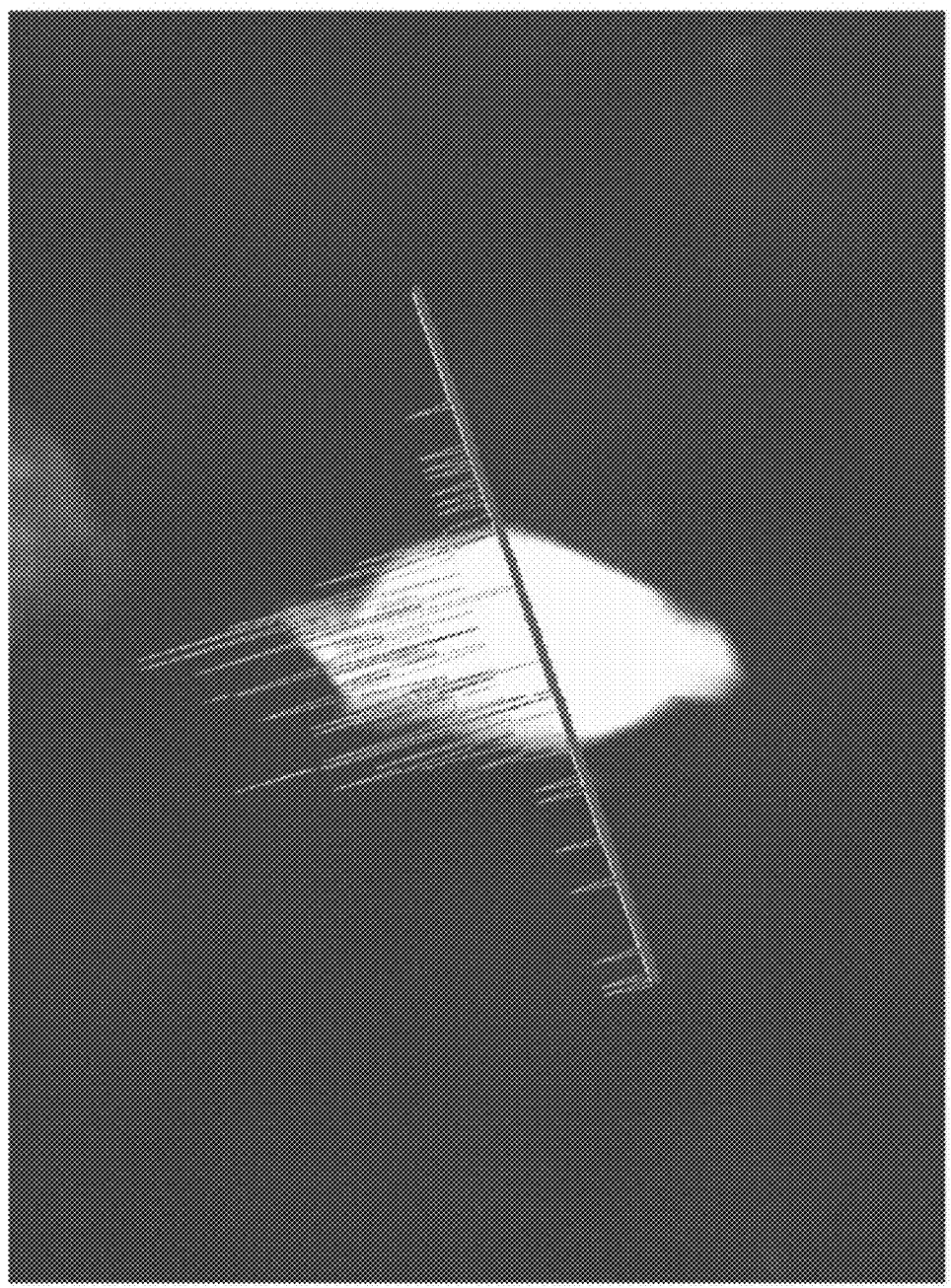

Phosphorus Kα1

Iron Kα1

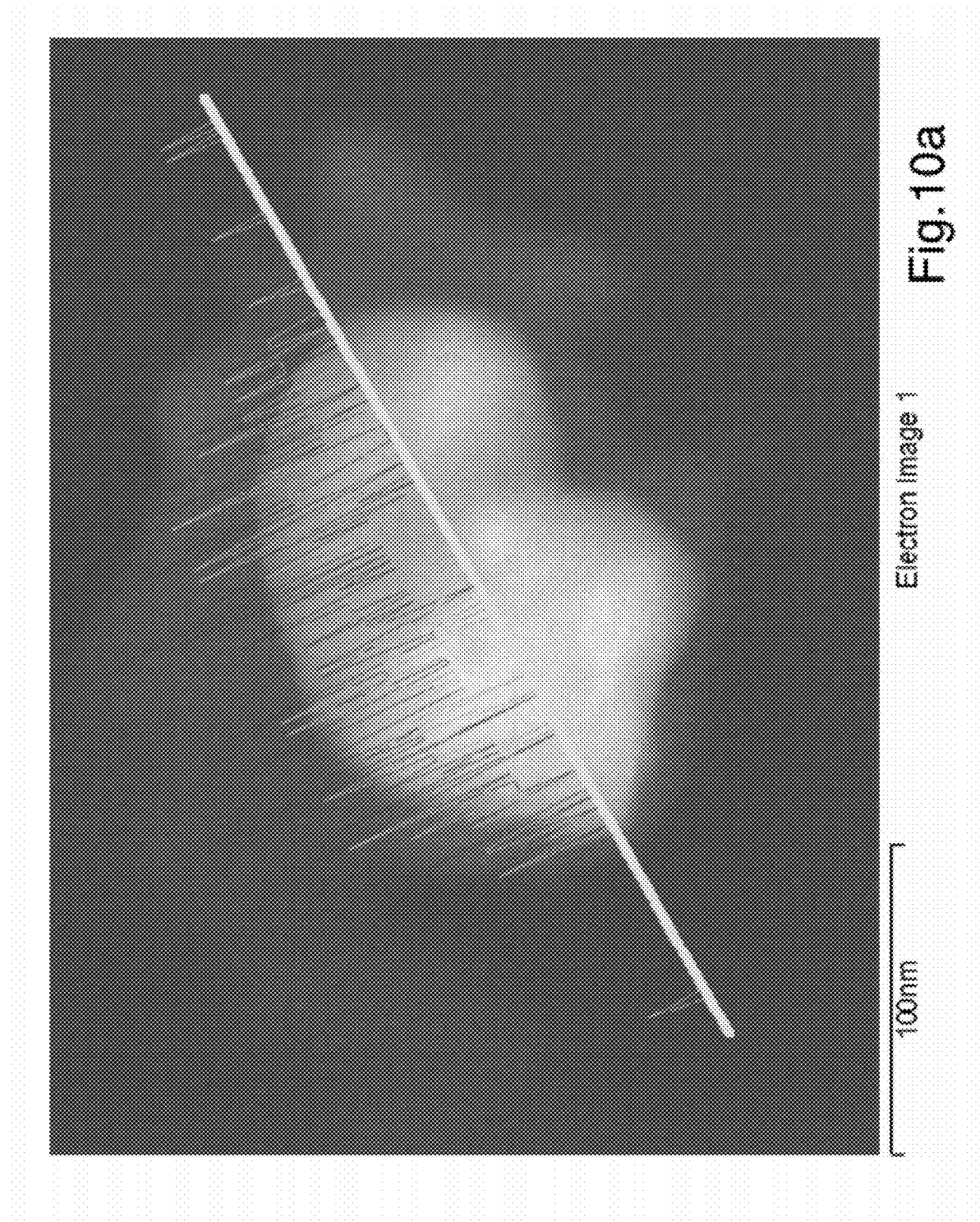

Iron Kα1

Phosphorus Kα1

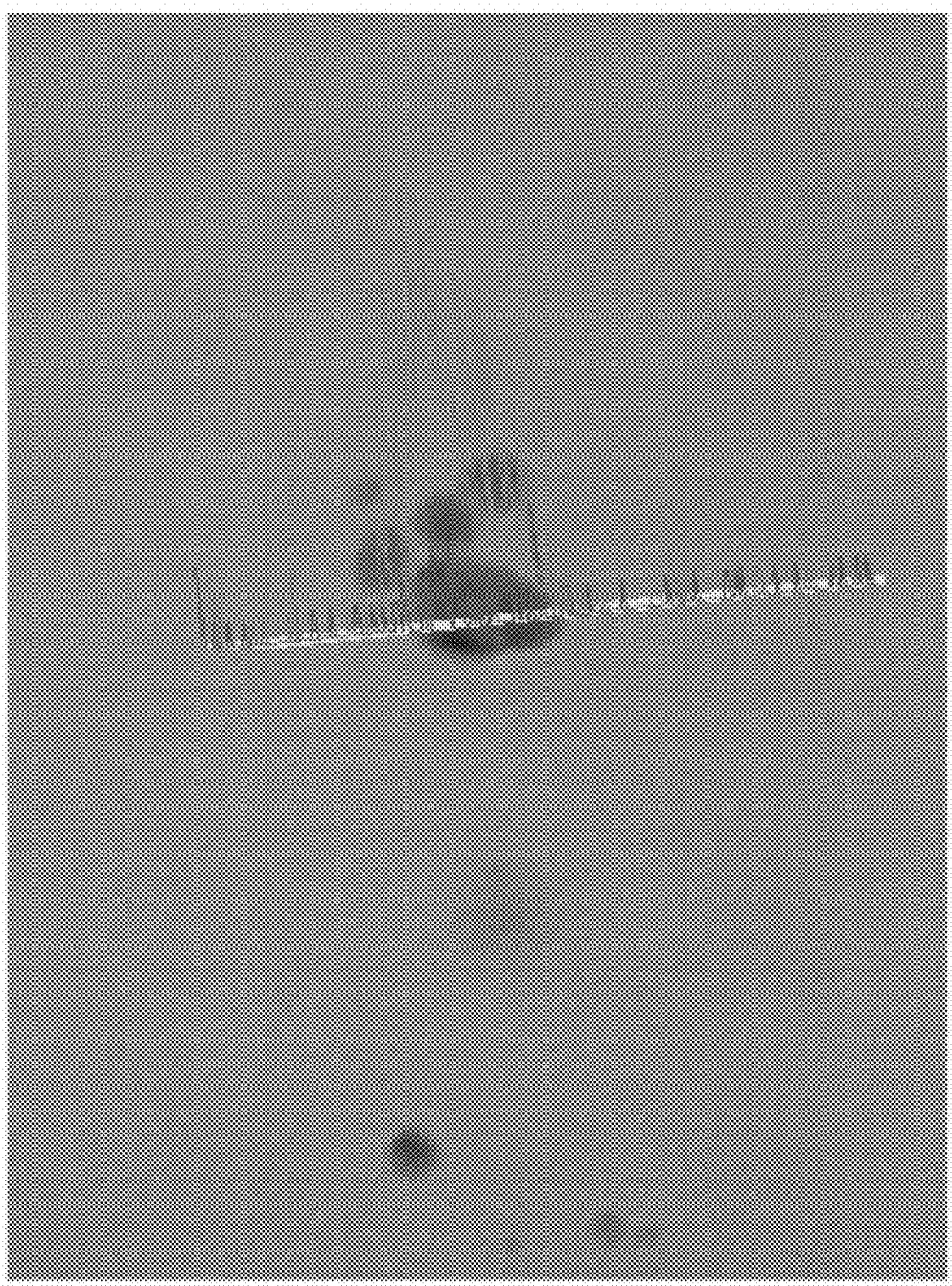

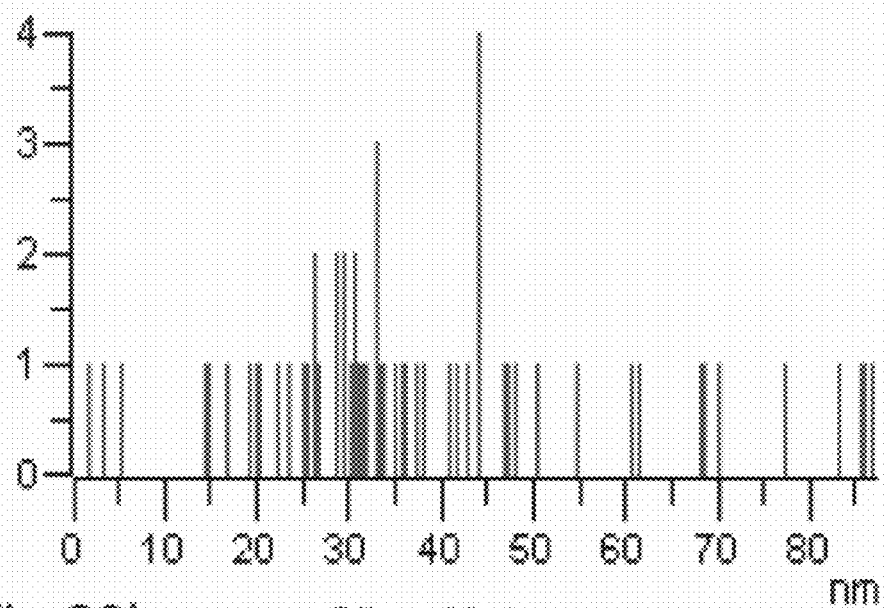
Fig.20b    Silver Ka1
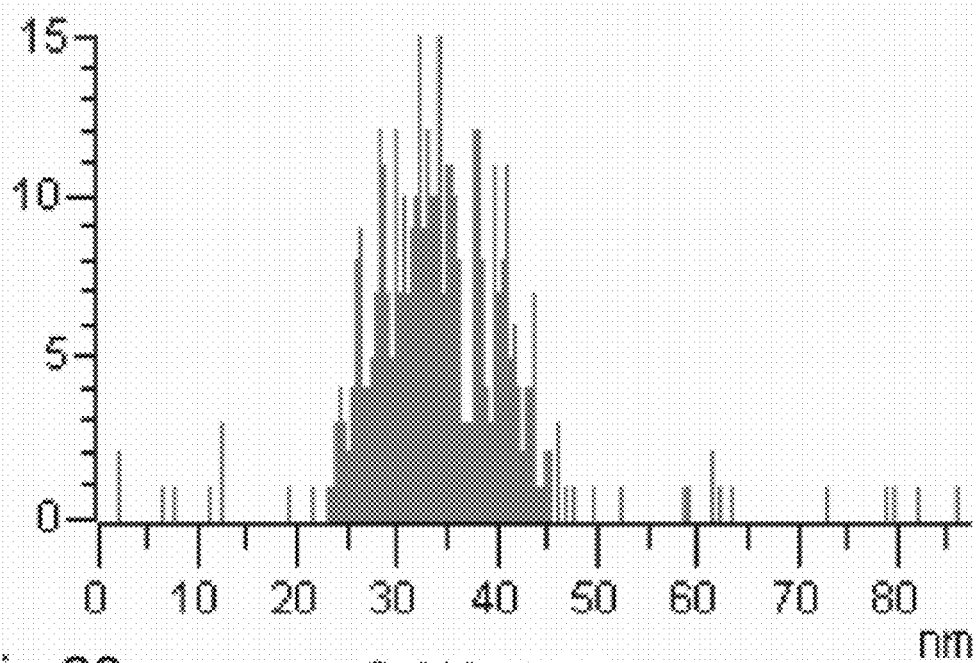
Fig.20c    Gold La1

PRODUCING COMPOSITE NANOPARTICLES CONTAINING ORGANIC IONS

This application claims the priority of U.S. Provisional Application No. 60/726,184 filed Oct. 14, 2005, U.S. patent application Ser. Nos. 11/745,377, and 11/749,507, both filed May 16, 2007 and PCT Application No. PCT/CA06/001686, filed Oct. 13, 2006, the entire contents of all of which are incorporated herein by reference.

FIELD OF THE INVENTION

This invention relates to methods for producing composite nanoparticles comprising nanoparticles confined within cross-linked collapsed polymers, and nanoparticles per se; said composite nanoparticles, nanoparticles and carbon-coated nanoparticles.

BACKGROUND OF THE INVENTION

Nanoparticles are nanometer-sized materials e.g., metals, semiconductors, polymers, and the like, possessing unique characteristics because of their small size. Nanoparticles in both aqueous and non-aqueous solvents can be synthesized using a variety of methods.

The conformation of a polymer in solution is dictated by various conditions of the solution, including its interaction with the solvent, its concentration, and the concentration of other species that may be present. The polymer can undergo conformational changes depending on the pH, ionic strength, cross-linking agents, temperature and concentration. For polyelectrolytes, at high charge density, e.g., when "monomer" units of the polymer are fully charged, an extended conformation is adopted due to electrostatic repulsion between similarly charged monomer units. Decreasing the charge density of the polymer, either through addition of salts or a change of pH, can result in a transition of extended polymer chains to a more tightly-packed globular i.e. collapsed conformation. The collapse transition is driven by attractive interactions between the polymer segments that override the electrostatic repulsion forces at sufficiently small charge densities. A similar transition can be induced by changing the solvent environment of the polymer. This collapsed polymer is itself of nanoscale dimensions and is, itself, a nanoparticle. In this specification and claims the term "collapsed polymer" refers to an approximately globular form, generally as a spheroid, but also as an elongate or multi-lobed conformation collapsed polymer having nanometer dimensions. This collapsed conformation can be rendered irreversible by the formation of intramolecular chemical bonds between segments of the collapsed polymer, i.e. by cross-linking.

Macromolecules, i.e. polymers with the appropriate functional groups can undergo inter- or intra-molecular cross-linking reactions to produce new materials or new molecules with distinct properties, such as for example, shape, solubility, thermal stability, and density. These reactions are important in making new materials and various schemes for chemical reactions leading to cross-linking are described in the literature. For example, U.S. Pat. No. 5,783,626—Taylor et al, issued Jul. 21, 1998, describes a chemical method to cross-link allyl-functional polymers in the form of latexes, containing enamine moieties and pendant methacrylate groups via a free-radical cross-linking reaction during film formation producing coatings with superior solvent resistance and increased thermal stability. Polymer cross-linking has also been used to stabilize semiconductor and metal nanoparticles. U.S. Pat. No. 6,872,450—Liu et al, issued Mar. 29, 2005, teaches a method for stabilizing surface-coated semiconductor nanoparticles by self assembling diblock polymers on the surface coating and cross-linking the functional groups on the diblock polymer. Similarly, U.S. Pat. No. 6,649,138—Adams et al, issued Nov. 18, 2003, describes how branched amphipathic dispersants coated onto hydrophobic nanoparticles can also be cross-linked to form a permanent cohesive over coating around the nanoparticle.

Chemical means of cross-linking can be through radical reactions of pendant groups containing unsaturated bonds as described in aforesaid U.S. Pat. No. 5,783,626. Another method is through the use of molecules having multifunctional groups than can react with the functional groups of the polymer as described in aforesaid United States U.S. Pat. Nos. 6,649,138 and 6,872,450. Alternatively, cross-linking can be achieved though high energy radiation, such as gamma radiation. The most common method of preparing chalcogenide semiconductor nanocrystals is the TOP/TOPO synthesis (C. B. Murray, D. J. Norris, and M. G. Bawendi, "Synthesis and Characterization of Nearly Monodisperse CdE (E=S, Se, Te) Semiconductor Nanocrystallites," *J. Am. Chem. Soc.*, 115:8706-8715, 1993). However, this method again involves multiple chemical steps and large volumes of expensive and toxic organometallic metal precursors and organic solvents. Furthermore, such nanoparticles need to be chemically modified in order to render them soluble in aqueous solution, which is important for a number of applications. Chalcogenide nanoparticles have also been synthesized in aqueous solution at low temperature using water-soluble thiols as stabilizing agents ((a) Rajh, O. L. Mićić, and A. J. Nozik, "Synthesis and Characterization of Surface-Modified Colloidal CdTe Quantum Dots," *J. Phys. Chem.*, 97: 11999-12003, 1993. (b) A. L. Rogach, L. Ktsikas, A. Kornowski, D. Su, A. Eychmüller, and H. Weller, "Synthesis and Characterization of Thiol-Stabilized CdTe Nanocrystals," *Ber. Bunsenges. Phys. Chem.*, 100(11): 1772-1778, 1996. (c) A. Rogach, S. Kershaw, M. Burt, M. Harrison, A. Kornowski, A. Eychmüller, and H. Weller, "Colloidally Prepared HgTe Nanocrystals with Strong Room-Temperature Infrared Luminescence," *Adv. Mater.* 11:552-555, 1999. (d) Gaponik, N., D. V. Talapin, A. L. Rogach, K. Hoppe, E. V. Shevchencko, A. Kornowski, A. Eychmüller, H. Weller, "Thiol-capping of CdTe nanocrystals: an alternative to organometallic synthetic routes," Journal of Physical Chemistry B, 2002, vol. 106, iss. 39, p. 7177-7185. (e) A. L. Rogach, A. Kornowski, M. Gao, A. Eychmüller, and H. Weller, "Synthesis and Characterization of a Size Series of Extremely Small Thiol-Stabilized CdSe Nanocrystals," *J. Phys. Chem. B*. 103:3065-3069, 1999). However, this method generally requires the use of an inert atmosphere with multiple processing steps and production of precursor gases. Another water-based synthesis involves the formation of undesirable by-products that must first be removed before semiconductor particles can be obtained (H. Zhnag, Z. Hou, B. Yang, and M. Gao, "The Influence of Carboxyl Groups on the Photoluminescence of Mercaptocarboxylic Acid-Stabilized Nanoparticles," *J. Phys. Chem. B*, 107:8-13, 2003).

CdTe nanocrystals are known to have tunable luminescence from green to red and have shown tremendous potential in light-emitting thin films (A. A. Mamedov, A. Belov, M. Giersig, N. N. Mamedova, and N. A. Kotov, "Nanorainbows: Graded Semiconductor Films from Quantum Dots," *J. Am. Chem. Soc.*, 123: 7738-7739, 2001), photonic crystals (A. Rogach, A. Susha, F. Caruso, G. Sukhoukov, A. Kornowski, S. Kershaw, H. Möhwald, A. Eychmüller, and H. Weller, "Nano- and Microengineering: Three-Dimensional Colloidal Photonic Crystals Prepared from Submicrometer-Sized Polystyrene Latex Spheres Pre-Coated with Luminescent Polyelectrolyte/Nanocrystal Shells," *Adv. Mater.* 12:333-337, 2000), and biological applications (N. N. Memedova and N. A. Kotov, "Albumin-CdTe Nanoparticle Bioconjugates: Preparation, Structure, and Interunit Energy Transfer with Antenna Effect," *Nano Lett.*, 1(6):281-286, 2001). PbTe and HgTe materials exhibit tunable emission in the infrared and look promising in the telecommunications industry. HgTe nanoparticles have been incorporated into more sophisticated assemblies, particularly as components in thin-film electroluminescent devices ((a) A. L. Rogach, D. S. Koktysh, M. Harrison, and N. A. Kotov, "Layer-by-Layer Assembled Films of HgTe Nanocrystals with Strong Infrared Emission," *Chem. Mater.*, 12:1526-1528, 2000. (b) É. O'Conno, A. O'Riordan, H. Doyle, S. Moynihan, a. Cuddihy, and G. Redmond, "Near-Infrared Electroluminescent Devices Based on Colloidal HgTe Quantum Dot Arrays," *Appl. Phys. Lett.*, 86: 201114-1-20114-3, 2005. (c) M. V. Kovalenko, E. Kaufmann, D. Pachinger, J. Roither, M. Huber, J. Stang, G. Hesser, F. Schäffler, and W. Heiss, "Colloidal HgTe Nanocrystals with Widely Tunable Narrow Band Gap Energies: From Telecommunications to Molecular Vibrations," *J. Am. Chem. Soc.*, 128:3516-3517, 2006) or solar cells (S. Günes, H. Neugebauer, N. S. Sariciftci, J. Roither, M. Kovalenko, G. Pillwein, and W. Heiss, "Hybrid Solar Cells Using HgTe Nanocrystals and Nanoporous $TiO_2$ Electrodes," *Adv. Funct. Mater.* 16:1095-1099, 2006). PbTe, on the other hand, can be grown in a variety of glasses at high temperatures to produce composite materials for applications in optoelectronic devices ((a) A. F. Craievich, O. L. Alves, and L. C. Barbosa, "Formation and Growth of Semiconductor PbTe Nanocrystals in a Borosilicate Glass Matrix," *J. Appl. Cryst.*, 30:623-627, 1997. (b) V. C. S. Reynoso, A. M. de Paula, R. F. Cuevas, J. A. Medeiros Neto, O. L. Alves, C. L. Cesar, and L. C. Barbosa, "PbTe Quantum Dot Doped Glasses with Absorption Edge in the 1.5 µm Wavelength Region," *Electron. Lett.*, 31(12):1013-1015, 1995).

Doping of CdTe with Hg results in the formation of CdHgTe composite nanocrystals. Red shifts in absorbance/photoluminescence spectra and enhanced PL are observed with increasing Hg content (A. L. Rogach, M. T. Harrison, S. V. Kershaw, A. Kornowski, M. G. Burt, A. Eychmüller, and H. Weller, "Colloidally Prepared CdHgTe and HgTe Quantum Dots with Strong Near-Infrared Luminescence," *phys. scat. sol.*, 224(1):153-158, 2001). $Cd_{1-x}Hg_xTe$ alloys are popular components in devices used for near-IR detector technology. A variety of methods have been developed to create these materials. U.S. Pat. No. 7,026,228—Hails et al, issued Apr. 11, 2006, describes an approach to fabricating devices and semiconductor layers of HgCdTe in a metal organic vapour phase epitaxy (MOVPE) process with mercury vapor and volatile organotelluride and organocadmium compounds. In a different approach, U.S. Pat. No. 7,060,243—Bawendi et al, issued Jun. 13, 2006, describes the synthesis of tellurium-containing nanocrystals (CdTe, ZnTe, MgTe, HgTe and their alloys) by the injection of organometallic precursor materials into organic solvents (TOP/TOPO) at high temperatures. U.S. Pat. No. 6,126,740—Schulz, issued Oct. 3, 2000, discloses another non-aqueous method of preparing mixed-semiconductor nanoparticles from the reaction between a metal salt and chalcogenide salt in an organic solvent in the presence of a volatile capping agent.

Mixtures of CdTe and PbTe have also been investigated for IR detection in the spectral range of 3 to 5 µm. However, because these materials have such fundamentally different structures and properties (S. Movchan, F. Sizov, V. Tetyorkin. "Photosensitive Heterostructures CdTe—PbTe Prepared by Hot-Wall Technique," Semiconductor Physics, Quantum Electronics & Optoelectronics. 2:84-87, 1999. V), the preparation of the alloy is extremely difficult. U.S. Pat. No. 5,448,098—Shinohara et al, issued Sep. 5, 1995, describes a superconductive device based on photo-conductive ternary semiconductors such as PbCdTe or PbSnTe. Doping of telluride quantum dots, e.g. CdTe, with transition metals, e.g. Mn offers the possibility of combining optical and magnetic properties in one single nanoparticle ((a) S. Mackowski, T. Gurung, H. E. Jackson, L. M. Smith, G. Karczewski, and J. Kossut, "Exciton-Controlled Magnetization in Single Magnetic Quantum Dots," *Appl. Phys. Lett.* 87: 072502-1-072502-3, 2005. (b) T. Kümmel, G. Bacher, M. K. Welsch, D. Eisert, A. Forchel, B. König, Ch. Becker, W. Ossau, and G. Landwehr, "Semimagnetic (Cd,Mn)Te Single Quantum Dots—Technological Access and Optical Spectroscopy," *J. Cryst. Growth*, 214/215:150-153, 2000). Unfortunately, these materials are mostly fabricated using thin-film technologies such as molecular beam epitaxy or chemical vapour deposition and the necessity for a very controlled environment during growth makes these materials inaccessible. Some mixed-metal tellurides such as CdHgTe (S. V. Kershaw, M. Burt, M. Harrison, A. Rogach, H. Weller, and A. Eychmüller, "Colloidal CdTe/HgTe Quantum Dots with High Photoluminescence quantum Efficiency at Room Temperature," *Appl. Phys. Lett.*, 75: 1694-1696, 1999); and CdMnTe (N. Y. Morgan, S. English, W. Chen, V. Chemornordik, A. Russ, P. D. Smith, A. Gandjbakhche, "Real Time In Vivo Non-Invasive Optical Imaging Using Near-Infrared Fluorescent Quantum Dots," *Acad. Radiol,* 12(3): 313-323, 2005) quantum dots have been prepared in aqueous solution which is an adaptation of the synthetic technique outlined in supra Rajh, O. L. et al. However, all of the aforementioned methods involve many processing steps, sophisticated equipment or large volumes of expensive and toxic organometallic metal precursors and organic solvents.

A simple tellurite reduction method to prepare cadmium telluride materials has been used using sodium tellurite ($Na_2TEO_3$) as a tellurium precursor salt with a suitable reducing agent, such as $NaBH_4$ with $M^{p+}$ cations (H. Bao, E. Wang, and S. Dong, "One-Pot Synthesis of CdTe Nanocrytals and Shape Control of Luminescent CdTe-Cystine Nanocomposites," small, 2(4):476-480, 2006).

Accordingly, there is a need in the art for an environmentally friendly, "one-pot", cost-effective, and generalizable method of directly producing metallic, metallic alloyed, semiconductor, oxide, and other forms of nanocomposite particles having effective functionality in a multitude of scientific disciplines.

SUMMARY OF THE INVENTION

In various aspects, the present invention provides methods of producing a composite nanoparticle comprising a nanoparticle confined within a cross-linked collapsed polymeric material, which is itself a nanoparticle.

The term "composite nanoparticle" in this specification, means a nanoparticle substantially confined within a cross-linked, polymeric material.

In various aspects, the present invention provides said composite nanoparticles when made by the methods of the present inventions.

In various aspects, the present invention provides methods for providing non-encapsulated nanoparticles from the aforesaid composite nanoparticles.

In various aspects, the present invention provides methods for producing wholly or partially carbon-coated nanoparticles from said composite nanoparticles.

In various embodiments, the present inventions teaches the ability to make a wider variety of composite nanoparticles, including oxide, semiconductor, and more complex composite nanoparticles.

In various aspects, the present inventions provide methods for producing a composite nanoparticle comprising the steps of:

a) providing a polymeric solution comprising a polymeric material and a solvent;

b) collapsing at least a portion of the polymeric material about one or more precursor moieties to form a composite precursor moiety having a mean diameter in the range between about 1 nm and about 100 nm;

c) cross-linking the polymeric material of said composite precursor moiety; and d) modifying at least a portion of said precursor moieties of said composite precursor moiety to form one or more nanoparticles and thereby forming a composite nanoparticle.

"Confined" in this specification means that the nanoparticle is substantially within the limits of the collapsed polymer's dimensions and includes, but is not limited to, the situation wherein portions of the polymer may be strongly interacting with the nanoparticle within the polymer dimensions.

As used herein, the term "precursor moiety" refers to a compound or entity at least a portion of which is a component of the eventual nanoparticle formed and includes nanoparticle precursors.

A polymeric material of use in the practice of the present inventions can be any molecule capable of collapse that contains units of monomers, that can be synthetic or naturally occurring and can be linear, branched, hyperbranched, or dendrimeric. Non-limiting examples of suitable polymeric materials are discussed in the various examples, which include, but are not limited to, poly(diallyldimethylammonium chloride) (PDDA), and polyacrylic acid (PAA), poly (styrene sulfonic acid) (PSS), It also can be any polymer containing ionized or ionizable moieties along its length and is of sufficient length such that the collapsed form has nanometer dimensions. The collapsed form can be of different morphologies, such as, for example, spherical, elongated, or multi-lobed. The dimensions in any direction are anywhere from 0.1 to 100 nm, and preferably 1-50 nm.

A wide variety of solvents can be used to form a polymeric solution of use in the present inventions. In various embodiments, the polymeric solution is preferably an aqueous solution.

In preferred embodiments of the present inventions, a chosen polymer is dissolved in a suitable solvent to form a solution of the polymer. The solvent can be water, an organic solvent or a mixture of two or more such solvents. The addition to the solution of the collapsing agent induces a collapse of the polymer which substantially surrounds, e.g., confines, a precursor moiety. The collapsing agent can itself be the precursor moiety. The chosen confined agent, for example a precursor moiety, can be, e.g., an organic or inorganic charged ion or a combination thereof. For example, the confined agent can be an ion from an organic salt, an inorganic salt, or an inorganic salt that is water soluble where the water soluble inorganic salt is of the form $M_xA_y$, where M is a metal cation belonging to Groups I to IV of the Periodic Table possessing a charge +y and A is the counter ion to M with a charge −x or a combination thereof. The confined agent could further comprise a mixture of ions from at least two inorganic salts.

Collapsing agents are usually water-soluble inorganic salts, most preferably, those that contain metal cations and their corresponding anions, both of which are known to induce a collapse-transition for certain polymeric materials. Non-limiting examples are $Cd(NO_3)_2$, $Zn(NO_3)_2$, $Cu(SO_4)$, $Pb(NO_3)_2$, $Pb(CH_3COO)_2$, $Ag(NO_3)$, $Mn(SO_4)$, $Ni(NO_3)_2$.

A variety of techniques can be used to collapse the polymeric material around a precursor moiety. For example, in various embodiments a collapsing agent such as a different solvent, an ionic species (e.g., a salt); or combinations thereof can be used. In various embodiments, it is preferred that the precursor moiety itself serve as a collapsing agent. Multiple collapsing agents can be used.

In various embodiments the at least one collapsing agent preferably comprises at least one ionic species. Preferably, in various embodiments, the at least one ionic species is a precursor moiety.

In various embodiments, the precursor moiety comprises at least one metal cation, complexed metal cation, or complexed metal anion. In various embodiments where the precursor moiety comprises a metal cation, complexed metal cation, or complexed metal anion, the modifying step (production means) comprises treating the cation, complexed cation, or complexed anion with γ-radiation or an agent selected from a reducing agent or an oxidizing agent to effect production of the nanoparticle comprising elemental metal confined within the cross-linked, collapsed polymeric material.

In various embodiments, the precursor moiety comprises two or more different metals. In various embodiments where the precursor moiety comprises two or more different metals, the modifying step comprises forming an alloy of two or more of the two or more metals.

In various embodiments, the precursor moiety comprises ions selected from a cation, complexed cations, or complexed metal anions of a plurality of metals and the modifying step comprises treating the cations or complexed anions with radiation, for example, γ-radiation, or an agent selected from a reducing agent or an oxidizing agent to effect production of the nanoparticle comprising an alloy of said metals, confined within the cross-linked collapsed polymeric material.

In various embodiments, the precursor moiety comprises a metal species-containing compound.

By the term "metal species-containing compound" is meant a compound containing a metal or metalloid in any valence state.

In various embodiments of the present inventions having an elemental metal, alloy comprising a metal, or a metal species-containing compound, the metal is preferably Cd, Zn, Cu, Pb, Ag, Mn, Ni, Au, Mg, Fe, Hg, Pt or a combination thereof.

In various embodiments of the present inventions having a metal species-containing compound, said compound containing said metal species preferably comprises one or more of a sulphide, selenide, telluride, chloride, bromide, iodide, oxide, hydroxide, phosphate, carbonate, sulphate, chromate and a combination thereof.

In various embodiments, a composite precursor moiety formed by a method of the present inventions has a mean diameter in the range between about 1 nanometer (nm) to about 100 nm. In various embodiments, the composite precursor moiety has a mean diameter in one or more of the ranges between: (a) about 1 nm to about 10 nm; (b) about 10 nm to about 30 nm; (c) about 15 nm to about 50 nm; and (d) about 50 nm to about 100 nm). It is to be understood that the term "mean diameter" is not meant to imply any sort of specific symmetry (e.g., spherical, ellipsoidal, etc.) of a composite precursor moiety. Rather, the composite precursor moiety could be highly irregular and asymmetric.

The formation of intra-molecular covalent bonds that effects the cross-linking of the polymeric material can be induced either by chemical means or by irradiation. Chemical means of cross-linking can also be achieved through the use of multi-dentate molecules as cross-linkers. These molecules contain multiple functional groups that are complementary to, and, therefore, can form covalent bonds with the functional groups on the polyelectrolyte polymeric material. These molecules can be linear, branched, or dendrimeric. For example, a molecule containing multiple amine groups, such as 2,2'-ethylenedioxydiethylamine can effect the intramolecular cross-linking of collapsed poly(acrylic acid). The cross-linking reaction in this case is promoted by the addition of an activating agent, typically used for amide bond formation, such as a carbodiimide.

The chemical cross-linking can be carried out to derivatize the polymer, such that a fraction of the ionizable groups are converted to groups that can be cross-linked through free-radical reactions. An example is to convert some of the carboxylic acid groups of poly(acrylic acid) to allyl esters. The allyl groups can then be reacted to form intramolecular bonds through radical chemistry.

Cross-linking by irradiation can be effected by exposing a solution of the collapsed polymer to an electromagnetic radiation source. The radiation source can be, for example, an excimer laser, a mercury arc lamp, a light emitting diode, UV germicidal lamp radiation or gamma rays.

A variety of techniques can be used in the present inventions to modify at least a portion of said precursor moieties of said composite precursor moiety to form one or more nanoparticles and thereby form a composite nanoparticle. These techniques are also referred to as "production means" herein since they are used in the production of the nanoparticle.

Suitable techniques for modifying a precursor moiety to form the desired nanoparticle include, but are not limited to, exposure to electromagnetic radiation, chemical treatment, and combinations thereof. Examples of suitable electromagnetic radiation exposure, include, for example γ-radiation, ultraviolet radiation, infrared radiation, etc. In various embodiments, the electromagnetic radiation is coherent radiation, such as provided, e.g., by a laser, in others it is incoherent, such as provided, e.g., by a lamp. Examples of chemical treatments include, but are not limited to, contacting with an oxidizing agent, contacting with a reducing agent, addition of at least one counter ion, a compound containing the counter ion, or a precursor to the counter ion, where the counter ion is a counter ion with respect to the precursor moiety or a portion thereof. Generally, modification of the precursor moiety results in the formation of a nanoparticle that is no longer soluble within the solvent of the polymeric solution.

Reaction either by reduction or oxidation of the ions, ionic precursor moieties, within the cross-linked polymeric material to form the composite nanoparticles can be effected through chemical, electrochemical, or photochemical means.

The resultant nanoparticles can be, for example, semiconductor crystals, including, but not limited, to CdS, CdSe, CdTe, ZnS, ZnSe, ZnTe, PbS, PbSe, PbTe, CuI, HgS, HgSe, and HgTe. The nanoparticles can also be metal alloys.

In various embodiments, a composite nanoparticle formed by a method of the present inventions has a mean diameter in the range between about 1 nanometer (nm) to about 100 nm. In various embodiments, the composite nanoparticle has a mean diameter in one or more of the ranges between: (a) about 1 nm to about 10 nm; (b) about 10 nm to about 30 nm; (c) about 15 nm to about 50 nm; and (d) about 50 nm to about 100 nm). It is to be understood that the term "mean diameter" is not meant to imply any sort of specific symmetry (e.g., spherical, ellipsoidal, etc.) of a composite nanoparticle. Rather, the composite nanoparticle could be highly irregular and asymmetric.

In various embodiments, the nanoparticle, formed from a precursor moiety, comprises an alloy of two or more different metals. In various embodiments where the precursor moiety comprises two or more different metals, the modifying step comprises forming an alloy of two or more of the two or more metals.

In various embodiments, the nanoparticle, formed from a precursor moiety, comprises a metal species-containing compound. By the term "metal species-containing compound" is meant a compound containing a metal or metalloid in any valence state.

In various embodiments of the present inventions having an elemental metal, alloy comprising a metal, or a metal species-containing compound, the metal is preferably Cd, Zn, Cu, Pb, Ag, Mn, Ni, Au, Mg, Fe, Hg, Pt or a combination thereof.

In various embodiments of the present inventions having a metal species-containing compound, said compound containing said metal species preferably comprises one or more of a sulphide, selenide, telluride, chloride, bromide, iodide, oxide, hydroxide, phosphate, carbonate, sulphate, chromate and a combination thereof.

In various aspects, the present inventions provide methods for producing a nanoparticle material, comprising the steps of: (a) providing a polymeric solution comprising a polymeric material and a solvent; (b) collapsing at least a portion of the polymeric material about one or more precursor moieties to form a composite precursor moiety; (c) cross-linking the polymeric material of said composite precursor moiety; and (d) modifying at least a portion of said precursor moieties of said composite precursor moiety to form one or more nanoparticles having a mean diameter in the range between about 1 nm and about 100 nm and thereby forming a composite nanoparticle; and (e) pyrolysing said composite nanoparticle to form a nanoparticle material. In various embodiments, the pyrolysis conditions are controlled such that the nanoparticle material formed comprises at least a partially carbon-coated nanoparticle In various embodiments, the present inventions provide methods for producing a metal nanoparticle, comprising pyrolysing the composite nanoparticle prepared by a method of the present inventions described herein, wherein the metal nanoparticle is an elemental metal, an alloy comprising the metal with at least one other metal, or a metal species-containing compound, at a temperature to effective to substantially remove the polymeric material.

In various embodiments, the present inventions provide methods for producing a carbon-coated metal nanoparticle comprising incompletely pyrolysing the composite nanoparticle prepared by a method of the present inventions described herein, wherein the metal nanoparticle is selected from an elemental metal, an alloy comprising the metal with at least one other metal, and a metal species-containing compound, at a temperature to effect production of the carbon-coated metal nanoparticle.

In various aspects, the present inventions provide composite nanoparticles when made by a method or process of one of the inventions described herein.

In various aspects, the present inventions provide non-confined and wholly or partially carbon-coated metal nanoparticles when made by methods of the present inventions described herein.

Various embodiments of the present inventions can be of value in the production of semiconductor nanoparticles, including, for example, quantum dots such as CdSe, CdS, CdTe, and others. Various embodiments of the present inventions can be of value in the production of complex salts, such as $LiFePO_4$, and oxide particles, such as $Fe_2O_3$.

Accordingly, in an various embodiments, the precursor moiety comprises at least one metal cation, complexed metal cation, or complexed metal anion, and the production means (modifying step) comprises treating the metal cation, complexed cation, or complexed anion with a suitable counterion or precursor thereof to effect production of the composite nanoparticle comprising a metal species-containing compound.

In various embodiments, the precursor moiety comprises an anion, and the modifying step (production means) comprises treating the anion with a suitable metal counterion or precursor thereof to effect production of the composite nanoparticle comprising a metal species-containing compound.

In various aspects, the modifying step comprises use of a suitable counterion or precursor thereof to effect production of a semiconductor nanoparticle or composite nanoparticle.

In a various aspects, the modifying step comprises use of a suitable counterion or precursor thereof to effect production of a composite nanoparticle comprising a complex salt.

In a various aspects, modifying step comprises use of a suitable counterion or precursor thereof to effect production of a nanoparticle comprising a hydroxide. In a preferred aspect, the hydroxide may be subsequently heated to convert the hydroxide to an oxide.

The aforesaid composite nanoparticles comprising a metal species-containing compound, a complex salt, hydroxide, or oxide, a semiconductor entity, can be, in various embodiments, effectively pyrolysed to substantially remove the polymeric material, or to only partially remove the polymeric material to produce, for example, a wholly or partially carbon-coated nanoparticle.

Thus, various embodiments of the present inventions relate to methods of making composite nanoparticles and nanoparticles that may have a wide variety of applications in a variety of sectors, including, but not limited to, biology, analytical and combinatorial chemistry, catalysis, energy and diagnostics. By utilizing starting materials that are readily soluble in water, the present inventions, in various embodiments, can provide nanoparticles and composite nanoparticles having unique characteristics applicable in the aforesaid sectors, which nanoparticles may be water soluble.

The synthesis routes of various embodiments of the present inventions, include, but are not limited to, synthesis in a "one pot" system in an aqueous medium. The particle size can be controlled, for example, by varying the molecular weight of the polymer, the degree of internal cross-linking, solution conditions and the amount of collapsing agent added. The polymer coat can be chosen to have desirable functional groups that can impart desirable properties, for example, having the capability for attachment to molecules, such as proteins or to enhance or decrease the sticking to substrates.

In various embodiments, the present inventions provide methods for making water-dispersible composite nanoparticles with inherent chemical functional groups that can be reacted with complementary functional groups on other molecules. Water-dispersible, in this context, refers to the formation of composite nanoparticles that can be prevented from aggregation in aqueous solution through adjustment of solution conditions.

In various embodiments, the methods of the present inventions provide a composite nanoparticle having at least one confined agent substantially surrounded by a polymeric material which polymer can be either a linear or branched polyanion or polycation or a combination thereof.

In preferred embodiments of the present inventions, a chosen polymer is dissolved in a suitable solvent to form a solution of the polymer. The solvent can be water, an organic solvent or a mixture of two or more such solvents. The addition to the solution of the collapsing agent induces a collapse of the polymer which substantially surrounds, e.g., confines the agent therein. The chosen confined agent can be an organic or inorganic charged ion or a combination thereof. For example, the confined agent can be an ion from an organic salt, an inorganic salt, or an inorganic salt that is water soluble where the water soluble inorganic salt is of the form $M_xA_y$, where M is a metal cation belonging to Groups I to IV of the Periodic Table possessing a charge +y and A is the counter ion to M with a charge −x or a combination thereof. The confined agent could further comprise a mixture of ions from at least two inorganic salts.

In various embodiments, to retain the conformation of the collapsed polymer, cross-linking of the collapsed polymer is achieved by exposing the polymer to γ-radiation alpha radiation, beta radiation, neutron radiation or UV radiation. Preferably, the UV radiation is UV laser radiation or UV arc lamp radiation. In various embodiments, the intra-molecular cross-links of the intra-molecular cross-linking process are chemically produced, for example, with carbodiimide chemistry with a multifunctional cross-linker.

One preferred embodiment of the present inventions involves the formation of composite nanoparticles by the addition of ions that induce precipitate formation of the confined agent within the collapsed polymeric material, wherein the collapsed polymer is intra-molecularly cross-linked. As used herein, "precipitation" of a confined ion refers to modification of the ion to a compound that is substantially insoluble in the solvent of the polymeric solution.

Various preferred embodiments of the aspects of the present inventions include, but are not limited to, using polymers dissolved in a solvent, usually water, so as to make a dilute solution. Polymers with ionizable groups, for example, $NH_2$, RNH, and COOH can be chosen because of their water-solubility under appropriate solution conditions and their ability to undergo a collapse transition when exposed to certain concentrations of ions in solution, usually through addition of an inorganic salt. The collapse of the polymer brings about the confinement of some of the ions within a collapsed polymeric structure. In order to make the collapsed conformation of the polymers permanent, intra-macromolecular bond formation is facilitated either through radiation exposure, through the use of chemical cross-linkers, or both. In various embodiments, the collapsed intra-molecular, cross-linked polymer have some of the ions from an inorganic salt confined within the collapsed structure as the basis for the formation of the composite nanoparticle. The confined ions, for example, can be reduced, oxidized, and/or reacted (e.g. by precipitation with an external agent), which results in the formation of the composite nanoparticle of the inner nanoparticle confined within the collapsed intra-molecular cross-linked polymeric material. Un-reacted ionizable groups, for example, can serve as future sites for further chemical modification, dictate the particles solubility in different media, or both.

An ionizable moiety or group is any chemical functional group that can be rendered charged by adjusting solution conditions, while ionized moieties refers to chemical functional groups that are charged regardless of solution conditions. The ionized or ionizable moiety or group can be either cationic or anionic, and can be continuous along an entire chain as in the case of regular polymers, or can be interrupted by blocks containing different functional groups, as in the case of block polymers.

In various embodiments, a preferred cationic group is the amino group and preferred anionic groups are carboxylic acid, sulfonic acid, phosphates, and the like. For cationic polymers, examples are poly(allylamine), poly(ethyleneimine) poly(diallyldimethylammonium chloride, and poly(lysine). For anionic polymers, examples are poly(acrylic acid), poly(styrene sulfonic acid), poly(glutamic acid), etc. Block polymers are made up of blocks of polymers having different functional groups. The block polymers can be made up of blocks of any of the mentioned anionic and cationic polymers and another polymer that imparts a specific desirable property to the block polymer.

In various embodiments, functional groups of the polymeric material can be used for conjugating the composite nanoparticles to other molecules containing complementary functional groups. These molecules can be any member of affinity-binding pairs such as antigen-antibody, DNA-protein, DNA-DNA, DNA-RNA, biotin-avidin, hapten-antihapten, protein-protein, enzyme-substrate and combinations thereof. These molecules can also be protein, ligand, oligonucleotide, aptamer, carbohydrate, lipid, or other nanoparticles. An example is the conjugation of poly(acrylic acid)-encased nanoparticles to proteins through amide bond formation between amine groups on proteins and the carboxylic acid groups on poly acrylic acid (PAA).

A fraction of the functional groups of the polyelectrolyte polymer can also be modified to convert them to other functional groups that can be used for conjugation. For example, a hetero bi-functional molecule containing an amine group and a latent thiol group can be reacted with poly(acrylic acid)-encased nanoparticles through amide bond formation thereby converting the carboxylic acid to a thiol group. The thiol group can be used for conjugation to other molecules containing thiol-reactive groups.

The wide variety of potential applications for the composite nanoparticles and nanoparticles, produced by the methods of the present invention include, but are not limited to, the absorption of light energy selected from the group consisting of UV, visible, and IR light, wherein the composite nanoparticle or nanoparticle are used as pigments or are incorporated into an optical device. In various embodiments, after absorbing light energy the composite nanoparticle may be capable of emitting light.

In various embodiments of the present inventions, provided are methods wherein the polymeric material is conjugated to molecules containing functional groups for binding to complementary binding partners to form an affinity-binding pair selected from the group having an enzyme-substrate, antigen-antibody, DNA-DNA, DNA-RNA, biotin-avidin, hapten-antihapten and combinations thereof. Preferably, the molecules are selected from the group consisting of protein, ligand, oligonucleotide, aptamer, and other nanoparticles.

In various embodiments, a composite nanoparticle of the present inventions may be used, e.g., to enhance spectroscopic techniques, including vibrational spectroscopy.

In various embodiments, provided are methods wherein the composite nanoparticles are further assembled on a surface of a substrate using layer-by-layer assembly or further aggregated into three-dimensional systems of composite nanoparticles, whereby the three-dimensional systems are created on a surface. In various embodiments this substrate is a film.

Accordingly, in various aspects the present inventions provide a coated substrate having a plurality of layers of composite nanoparticles as herein described interspersed between adjacent layers of oppositely charged compounds.

In various embodiments, a coated substrate as herein described is preferably coated, with a composite nanoparticle of CdS/PAA and the oppositely charged compound is poly(allylamine) hydrochloride (PAH).

In various embodiments, the present inventions provide use of a composite nanoparticle as herein described in the production of a multi-layered coated substrate. This substrate could be of value, for example, as one or more of: (a) a solid substrate comprising catalytic or otherwise reactive nanoparticles; and (b) an optical filter or as an element in an optical device where the incorporated composite nanoparticles have useful properties.

In various embodiments, the compounds according to the present inventions could be of value as semiconductor materials, for example, as quantum dots.

BRIEF DESCRIPTION OF THE DRAWINGS

The foregoing and other aspects, embodiments, objects, features and advantages of the present inventions can be more fully understood from the following description in conjunction with the accompanying drawings. In the drawings, like reference characters generally refer to like features and structural elements throughout the various figures. The drawings are not necessarily to scale, emphasis instead being placed upon illustrating the principles of the present inventions, wherein.

FIGS. 20(a)-20(c) represent STEM with EDX analysis image of (Au, Ag)/PAA composite nanoparticles produced according to Example 24;

DETAILED DESCRIPTION OF VARIOUS EMBODIMENTS

EXAMPLES

Figure 1:
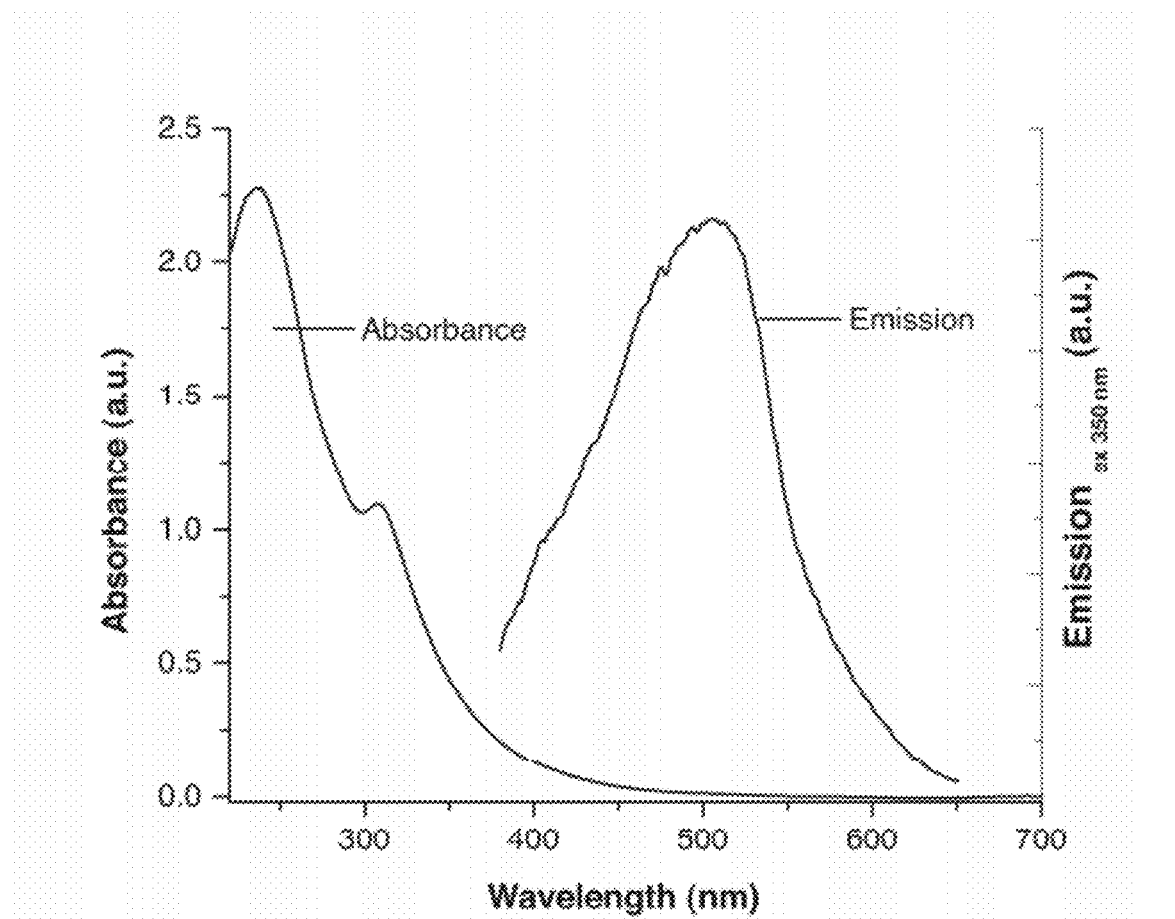
FIG. 1 represents UV-Vis absorption spectra of CdS/PAA composite nanoparticles prepared according to Example 13.

In the following examples, the term (a) "M$^{p+}$/polymer refers to the collapsed polymeric material with the metal cation M$^{p+}$, wherein M is the stated metal in the example; and (b) A$^{x-}$/polymer refers to the collapsed polymeric material collapsed with the anion A$^{x-}$.

In the case of multiple cations or anions used to collapse a single polymer, the different metal cations and anions will be separated by a comma "," as in the case $(M_1^{y1+}, M_2^{y2}, \text{etc.} \ldots)$/Polymer and $(A_1^{x1-}, A_2^{x2-}, \text{etc.} \ldots)$/Polymer (e.g. Cd$^{2+}$/PAA, Cl$^-$/PDDA, etc.). Nanoparticles formed from the metal ions will be designated as $M_{1\ x1} A_{1\ y1}$/Polymer (e.g. CdS/PAA, (CdS, PbS)/PAA, etc). Nanoparticles formed from the metal ions that have been treated with another agent to form a different material will be designated by a "-" as in $(M_{1x1}A_{1y1}\text{-}M_{2\ y2}A_{2\ y2})$/Polymer (e.g. (CdSe—CdS)/PAA, (CdTe—ZnS)/PAA, etc).

Example 1

Polycation Collapse with (−1) Anion

In a plastic 400.0 ml beaker, 3.0 ml of poly(diallyldimethylammonium chloride) (PDDA) [Sigma, Average M$_w$ 400-500K, 20 wt % in water] was diluted to 300 ml with deionized water. The solution was stirred for 10 minutes. 5.0 ml aliquots were obtained, and placed in 20 ml scintillation vials. To each was added dropwise with vigorous stirring 5.0 ml of aqueous NaCl solutions of different concentrations (2 mM-60 mM) yielding 10 mL of Cl$^-$/PDDA solutions with different [Cl$^-$] between 1 and 50 mM and a final PDDA concentration of 1 mg/ml. The relative viscosity of each solution was measured with an Ostwald viscometer. The viscosity as a function of NaCl concentration changed suddenly at approximately 10 mM; this was taken as the PDDA collapse point with Cl$^-$, such that at lower concentrations, the PDDA is primarily in an extended configuration.

Example 2

Polycation Collapse with (−2) Anion

In a plastic 400.0 ml beaker, 3.0 ml of poly(diallyldimethylammonium chloride) (PDDA) [Sigma, Average M$_w$ 400-500K, 20 wt % in water] was diluted to 300 ml with deionized water. The solution was stirred for 10 minutes. 5.0 ml aliquots were obtained, and placed in 20 ml scintillation vials. To each was added dropwise with vigorous stirring 5.0 ml of aqueous Na$_2$SO$_4$ solutions of different concentrations (2 mM-20 mM) yielding 10 mL of SO$_4^{2-}$/PDDA solutions with different [SO$_4^{2-}$] between 1 and 10 mM and a final PDDA concentration of 1 mg/ml. The relative viscosity of each solution was measured with an Ostwald viscometer. The viscosity as a function of NaCl concentration changed suddenly at approximately 3 mM; this was taken as the PDDA collapse point with SO$_4^{2-}$, such that at lower concentrations, the PDDA is primarily in an extended configuration.

Example 2

Polycation Collapse with (−3) Anion

In a plastic 400.0 ml beaker, 15 ml of poly(diallyldimethylammonium chloride) (PDDA) [Sigma, Average M$_w$ 400-

500K, 20 wt % in water] was diluted to 300 ml with deionized water. The solution was stirred for 10 minutes. 5.0 ml aliquots were obtained, and placed in 20 ml scintillation vials. To each was added dropwise with vigorous stirring 5.0 ml of aqueous $Na_3PO_4$ solutions of different concentrations (2 mM-50 mM) yielding 10 mL of $PO_4^{3-}$/PDDA solutions with different $[PO_4^{3-}]$ between 1 and 25 mM and a final PDDA concentration of 5 mg/ml. The relative viscosity of each solution was measured with an Ostwald viscometer. The viscosity as a function of NaCl concentration changed suddenly at approximately 2 mM; this was taken as the PDDA collapse point with $PO_4^{3-}$, such that at lower concentrations, the PDDA is primarily in an extended configuration.

Example 4

Polyanion Collapse with (+1) Cation

In a 400 ml plastic beaker, 400.0 mg of (PAA) (Sigma, Average $M_V$ 1.2 million) was dissolved in 200 ml deionized water. The plastic beaker was immersed in a hot water bath (approximately 80-90° C.) and was stirred vigorously for at least 30 minutes or until all of the solid PAA has dissolved. Once the solution has cooled to room temperature, the pH was adjusted to 6.8 using 0.1 M NaOH. pH measurements were done using narrow range pH paper. 5 ml aliquots of the pH adjusted PAA were obtained and to each was added 5.0 ml aliquots were obtained, and placed in 20 ml scintillation vials. To each was added dropwise with vigorous stirring 5.0 ml of aqueous NaCl solutions of different concentrations (0.2 mM-10.0 mM) yielding 10 mL of $Na^+$/PDDA solutions with different $[Na^+]$ between 0.1 mM and 5.0 mM and a final PAA concentration of 1 mg/ml. The relative viscosity of each solution was measured with an Ostwald viscometer. The viscosity as a function of NaCl concentration changed suddenly at approximately 2 mM; this was taken as the PAA collapse point with $Na^+$, such that at lower concentrations, the PAA is primarily in an extended configuration.

Example 5

Polyanion Collapse with (+2) Cation

In a 400 ml plastic beaker, 400.0 mg of PAA (Sigma, Average $M_w$ 1.2 million) was dissolved in 200 ml deionized water. The plastic beaker was immersed in a hot water bath (approximately 80-90° C.) and was stirred vigorously for at least 30 minutes or until all of the solid PAA has dissolved. Once the solution has cooled to room temperature, the pH was adjusted to 6.8 using 0.1 M NaOH. pH measurements were done using narrow range pH paper. 5 ml aliquots of the pH adjusted PAA were obtained and to each was added 5.0 ml aliquots were obtained, and placed in 20 ml scintillation vials. To each was added dropwise with vigorous stirring 5.0 ml of aqueous $Cd(NO_3)_2$ solutions of different concentrations (0.1-6.0 mM) yielding 10 mL of $Cd^{2+}$/PAA solutions with different $[Cd^{2+}]$ between 0.1 mM and 3.0 mM and a final PAA concentration of 1 mg/ml. The relative viscosity of each solution was measured with an Ostwald viscometer. The viscosity as a function of $Cd(NO_3)_2$ concentration changed suddenly at between 1-2 mM; this was taken as the PAA collapse point with $Cd^{2+}$, such that at lower concentrations, the PAA is primarily in an extended configuration. Addition of more $Cd(NO_3)_2$ such that the final concentration >2 mM caused a white precipitate to form. Solutions with a final concentration of 1.2 mM $Cd(NO_3)_2$ and approx 0.7 mg/ml PAA were then prepared for use in subsequent examples below; this solution is referred to as $Cd^{2+}$/PAA in this work.

Example 6

Polyanion Collapse with (+3) Cation

In a 400 ml plastic beaker, 400.0 mg of poly(styrene sulfonic acid) (PSS) (Alfa Aesar, Average $M_w$ 1 million) was dissolved in 200 ml deionized water. 5 ml aliquots of the PSS solution were obtained, and placed in 20 ml scintillation vials. To each was added dropwise with vigorous stirring 5.0 ml of aqueous solutions containing $FeCl_3$ of different concentrations (0.2 mM-20.0 mM) yielding 10 mL of $Fe^{3+}$/PDDA solutions with different $[Fe^{3+}]$ between 0.1 mM and 10.0 mM and a final PSS concentration of 1 mg/ml. The relative viscosity of each solution was measured with an Ostwald viscometer. The viscosity as a function of $FeCl_3$ concentration changed suddenly at approximately 2 mM; this was taken as the PSS collapse point with $Fe^{3+}$ such that at lower concentrations, the PSS is primarily in an extended configuration.

Example 7

Polyanion Collapse with 2 Cations

In a 400 ml plastic beaker, 400.0 mg of PAA (Sigma, Average $M_V$ 1.2 million) was dissolved in 200 ml deionized water. The plastic beaker was immersed in a hot water bath (approximately 80-90° C.) and was stirred vigorously for at least 30 minutes or until all of the solid PAA has dissolved. Once the solution had cooled to room temperature, the pH was adjusted to 6.8 using 0.1 M NaOH. pH measurements were done using narrow range pH paper. 5.0 ml aliquots were obtained, and placed in 20 ml scintillation vials. To each was added dropwise with vigorous stirring 5.0 ml of aqueous solutions containing $FeCl_2$ and LiCl at a mole ratio of (2:1) of different concentrations* (0.2 mM-8.0 mM) yielding 10 mL of ($2Fe^{2+}$, $Li^+$)/PAA solutions with different $[2Fe^{2+}, Li^{2+}]$ between 0.1 mM and 4.0 mM and a final PAA concentration of 1 mg/ml. The relative viscosity of each solution was measured with an Ostwald viscometer. The viscosity as a function of $FeCl_2$ and LiCl concentration changed suddenly at approximately 0.3 mM; this was taken as the PAA collapse point with $2Fe^{2+}$, $Li^+$ such that at lower concentrations, the PAA is primarily in an extended configuration.
*concentrations refer to the total concentration of both metal ions combined Example 8

Preparation of $Cd^{2+}$/PAA Crosslinked Composite Nanoparticles According to the Invention Using Mercury Arc Lamp A solution of $Cd^{2+}$/PAA was prepared by dropwise addition of 10 ml of 0.005M $Cd(NO_3)_2$ solution to 10 ml of 2 mg/ml aqueous solution of PAA (Sigma, Ave $M_w$ 1.2 million PAA, pH adjusted to 6.8 with 0.1 M NaOH). The solution was exposed to light from a 200 W mercury arc lamp for approximately 1 hour to effect collapse, while undergoing vigorous stirring. The irradiated solution was then dialyzed against deionized water for 3 hours. The dialysis is expected to substantially reduce the concentration of ions in solution, thus reversing the polymer collapse. However, it was found that the solution viscosity remains unchanged (still low), indicating that the collapsed configuration is retained, and that the collapsed polymer has been crosslinked to remain in the collapsed configuration. An aliquot of the solution was cast onto mica and allowed to air dry. Atomic force microscopy imaging indicated the presence of particles 10-25 nm in size.

Example 9

Preparation of $Zn^{2+}$/PAA and $Cd^{2+}$/PAA Crosslinked Composite Nanoparticles According to the Invention Using Laser Irradiation A solution of $Zn^{2+}$/PAA was prepared by dropwise addition of 10 ml of 0.005M $Zn(NO_3)_2$ solution to 10 ml of 2 mg/ml aqueous solution of PAA (Sigma, Ave $M_w$ 1.2 million PAA, pH adjusted to 6.8 with 0.1 M NaOH) with vigorous stirring. The solution was exposed to 5000 pulses from an excimer laser source (10 mJ/cm$^3$) while undergoing vigorous stirring. The laser irradiated solution was then dialyzed against deionized water for 3 hours, changing the deionized water reservoir every hour. The solution viscosity remained unchanged by dialysis, indicating that the collapsed configuration is retained.

A solution of $Cd^{2+}$/PAA was prepared by dropwise addition of 10 ml of 0.005M $Cd(NO_3)_2$ solution to 10 ml of 2 mg/ml aqueous solution of PAA (Sigma, Ave $M_w$ 1.2 million PAA, pH adjusted to 6.8 with 0.1 M NaOH) with vigorous stirring. The solution was exposed to 5000 pulses from an excimer laser source (10 mJ/cm$^3$) while undergoing vigorous stirring. The laser irradiated solution was then dialyzed against deionized water for 3 hours, changing the deionized water reservoir every hour. The solution viscosity remained unchanged by dialysis, indicating that the collapsed configuration is retained.

Example 10

Preparation of $Zn^{2+}$/PAA Crosslinked Composite Nanoparticles According to the Invention Using Chemical Crosslinking Agent $Zn^{2+}$/PAA solution was prepared according to example 9. 2.0 ml of $Zn^{2+}$/PAA was placed in a 5 ml glass vial and 160 µl of a solution that was 26.4 mg/mL in 1-Ethyl-N' (3-dimethylaminopropyl)carbodiimide (EDC) and 33.45 mM in 2,2'-(Ethylenedioxy)bis-(ethylamine) (EDE) was added under constant stirring. The resulting solution was stirred for 12 hours and was then dialyzed against deionized water for 3 hours, changing the deionized water reservoir every hour. $Zn^{2+}$/PAA that was not treated with the EDC/EDE solution was also dialyzed against deionized water for 3 hours, changing the deionized water reservoir every hour. After dialysis, the viscosity of the EDC/EDE treated $Zn^{2+}$/PAA solution was much lower than that of an untreated $Zn^{2+}$/PAA solution. This indicates that the collapsed configuration is retained after $Zn^{2+}$/PAA was treated with the EDC/EDE solution.

Example 11

Polyacrylic Acid Crosslinking with Gamma Radiation to Produce $Cd^{2+}$/PAA Composite Nanoparticles According to the Invention 20 ml of $Cd^{2+}$/PAA, prepared as described in Example 5, was placed in a 20 ml scintillation vial. To this, 200 µl of isopropanol (ACS grade) was added. The vial was sealed with a rubber septum and was vortexed for 10 seconds. The solution was exposed to a total dose of ~15 kGy of gamma radiation at a dose rate of 3.3 kGy/hr. The irradiated solution was then dialyzed against deionized water for 3 hours, changing the deionized water reservoir every hour. Similarly, $Cd^{2+}$/PAA that was not exposed to gamma radiation was also dialyzed in a similar manner. After dialysis, the viscosity of the collapsed irradiated, dialyzed solution was much lower than that of a collapsed, un-irradiated solution. $Na^+$/PAA prepared according to example 4, $[Na^+]$=2 mM, was also exposed to the same gamma radiation dose, and similarly the viscosity of the collapsed irradiated, dialyzed $Na^+$/PAA solution was much lower than that of a collapsed, un-irradiated solution.

Example 12

Polyacrylic Acid Crosslinking with 4 G25T8 Germicidal Lamps to Produce $Cd^{2+}$/PAA Composite Nanoparticles According to the Invention 20 ml of $Cd^{2+}$/PAA was prepared according to Example 5 was placed in a 50.0 ml glass beaker. The solution was exposed to 4 G25T8 germicidal UV lamps (approximate power is 12 µW/mm$^2$) for approximately 1.5-2 hours under vigorous stirring. The irradiated solution was then dialyzed against deionized water for 3 hours, changing the deionized water reservoir every hour. $Cd^{2+}$/PAA that was not exposed to the UV lamp was also dialyzed in a similar manner. The viscosity of the irradiated, dialyzed $Cd^{2+}$/PAA solution was much lower than that of a $Cd^{2+}$/PAA solution that was not exposed to the UV lamp. Collapsed PAA with $Zn(NO_3)_2$, $Pb(NO_3)_2$, $Cd/Pb(NO_3)_2$, $Zn/Cd(NO_3)_2$, $FeCl_2$, LiCl, $FeCl_3$, $Co(SO_4)$, $Cu(SO_4)$, $Mn(SO_4)$, $Ni(CH_3COOH)$, $Zn(NO_3)_2$/$MgCl_2$ was also UV irradiated in a similar manner and the viscosity of the collapsed irradiated, dialyzed solutions were much lower than that of a collapsed, un-irradiated solutions. These solutions were filterable using a 0.2 nm nylon syringe filter.

Example 13

Figure 2:
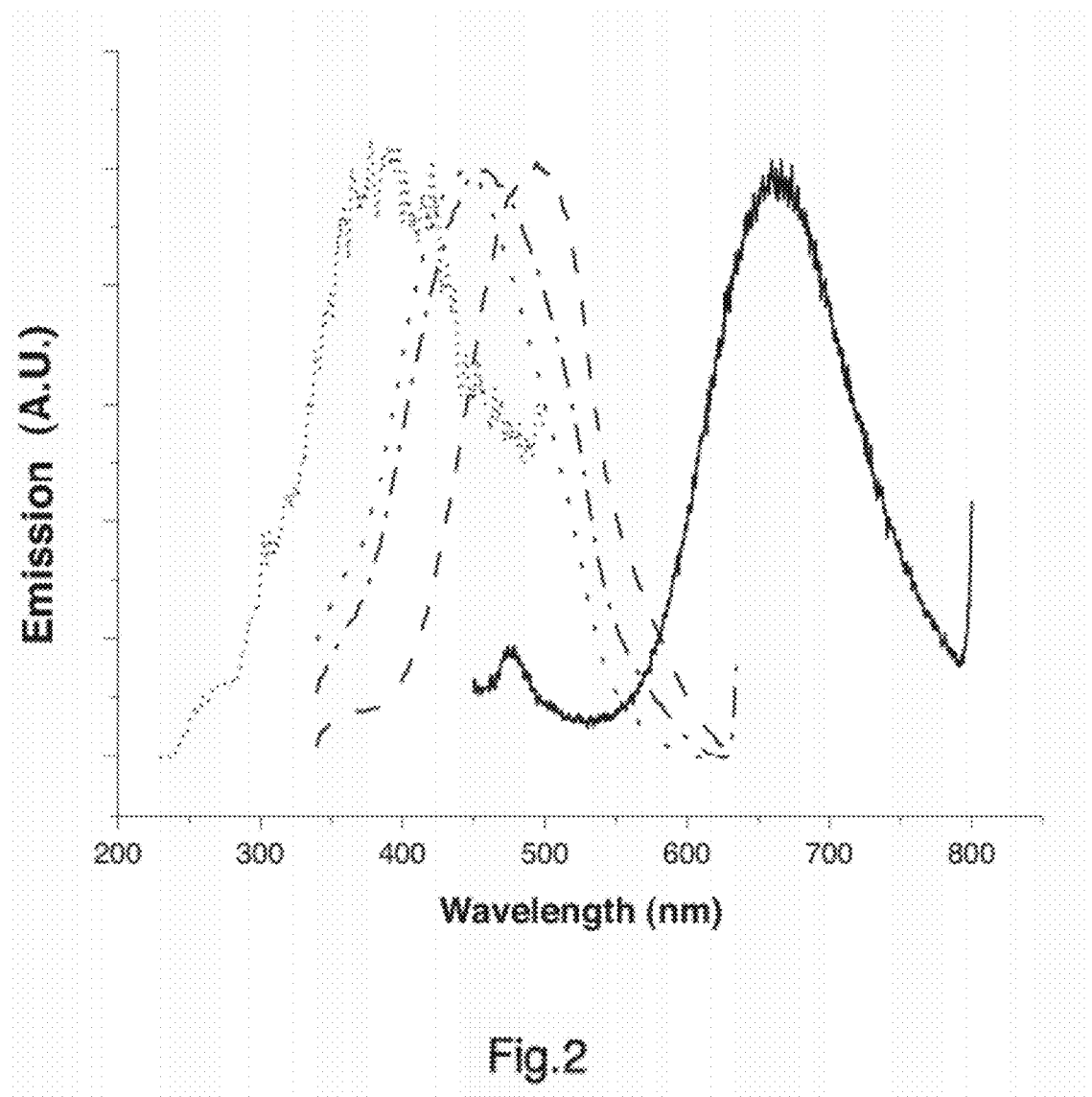
FIG. 2 represents emission spectra of different CdS/PAA composite nanoparticles prepared according to Example 13.
Figure 3:
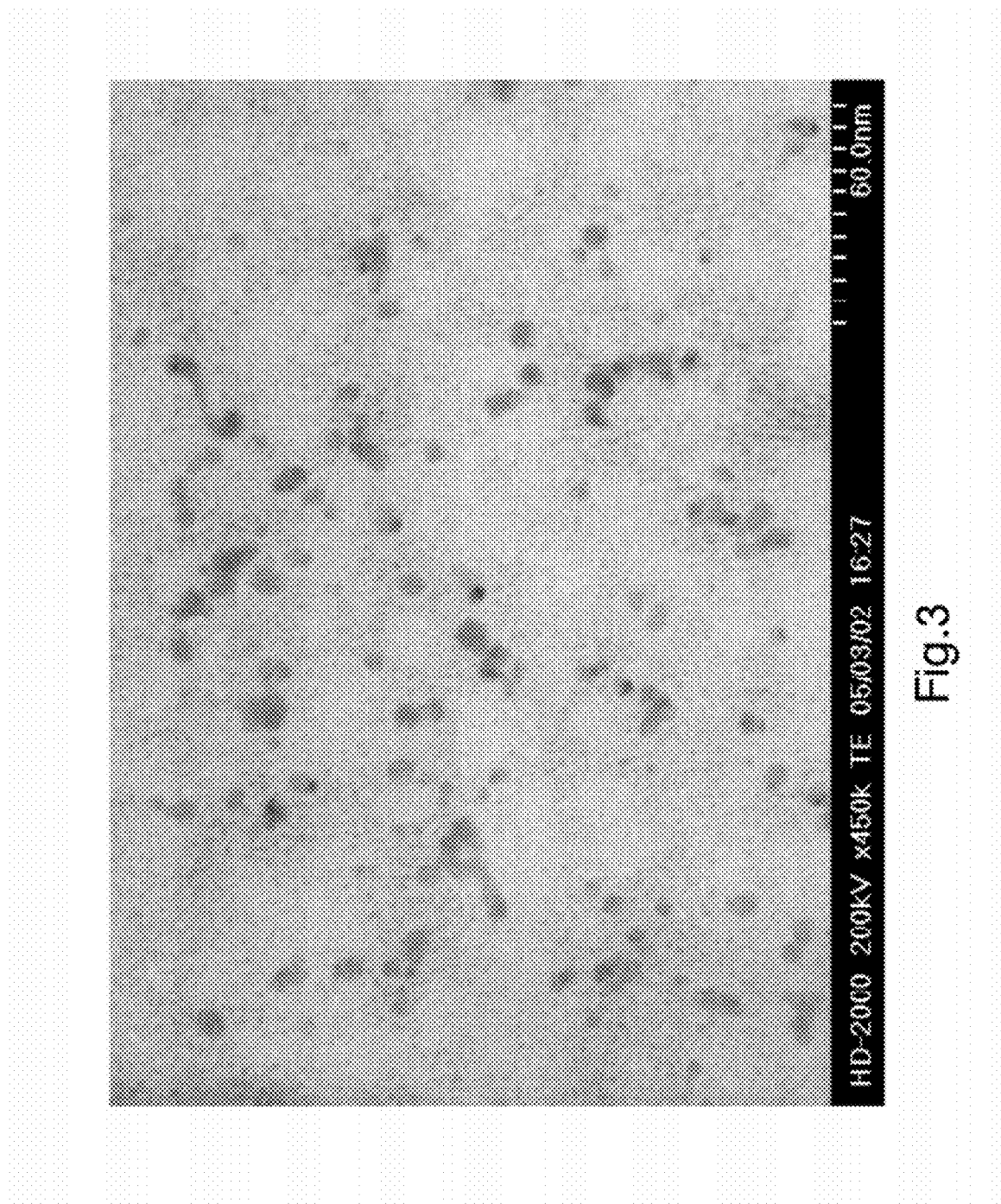
FIG. 3 represents STEM image of CdS/PAA composite nanoparticles prepared according to Example 13.

CdS/PAA Composite Nanoparticles According to the Invention 20 ml of crosslinked $Cd^{2+}$/PAA composite nanoparticles was prepared according to example 12 and was placed in a 50 ml glass beaker. Under vigorous stirring, 20.0 ml of 0.60 mM $Na_2S$ solution was added dropwise at a rate of 2 ml/min using a syringe pump. The resulting solution was yellow in color. Absorbance and emission spectra of the resulting solution are shown in FIG. 1. The maximum emission wavelength can be tuned to different frequencies by varying the ratio of $Na_2S$ to the amount to $Cd^{2+}$ ions present in the $Cd^{2+}$/PAA solution. This is shown in FIG. 2. A red shift in the Emission. is observed as more $Na_2S$ is added. Scanning Transmission Electron microscopy images of the CdS/PAA prepared are shown in FIG. 3.

Example 14

Figure 4:
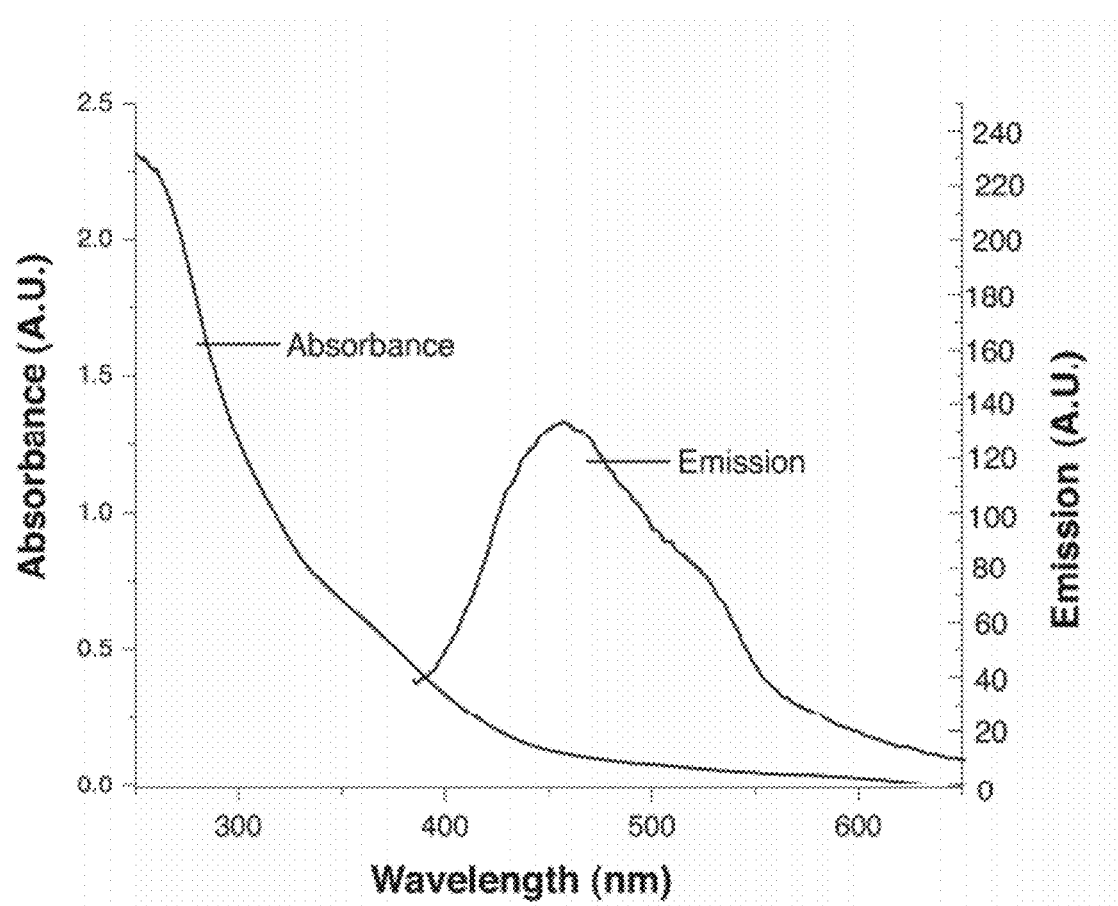
FIG. 4 represents uv-vis absorption and emission spectra of CdSe/PAA composite nanoparticles prepared according to Example 14.

CdSe/PAA Composite Nanoparticles According to the Invention 300 mL of $Cd^{2+}$/PAA was prepared according to Example 5. The pH of the solution adjusted to ~8.5-9.0 with 0.1 M NaOH and was bubbled with $N_{2(g)}$ for 30 minutes in a 500 ml round bottom flask. 18.2 mg of 1,1'-dimethylselenourea was dissolved in 5 ml of degassed, deionized water and was sealed with a septa in a 5 ml glass vial. Using a 5 ml syringe, 4.1 ml of this dimethlyselenourea solution was added to the $Cd^{2+}$/PAA under $N_2$ atmosphere. The resulting solution was stirred for 10 minutes and then heated on a heating mantle to a temperature of approximately 80° C. for 1 hour. After one hour, the solution was allowed to cool. The resulting solution has an absorption and emission spectra shown in FIG. 4.

Example 15

Figure 5:
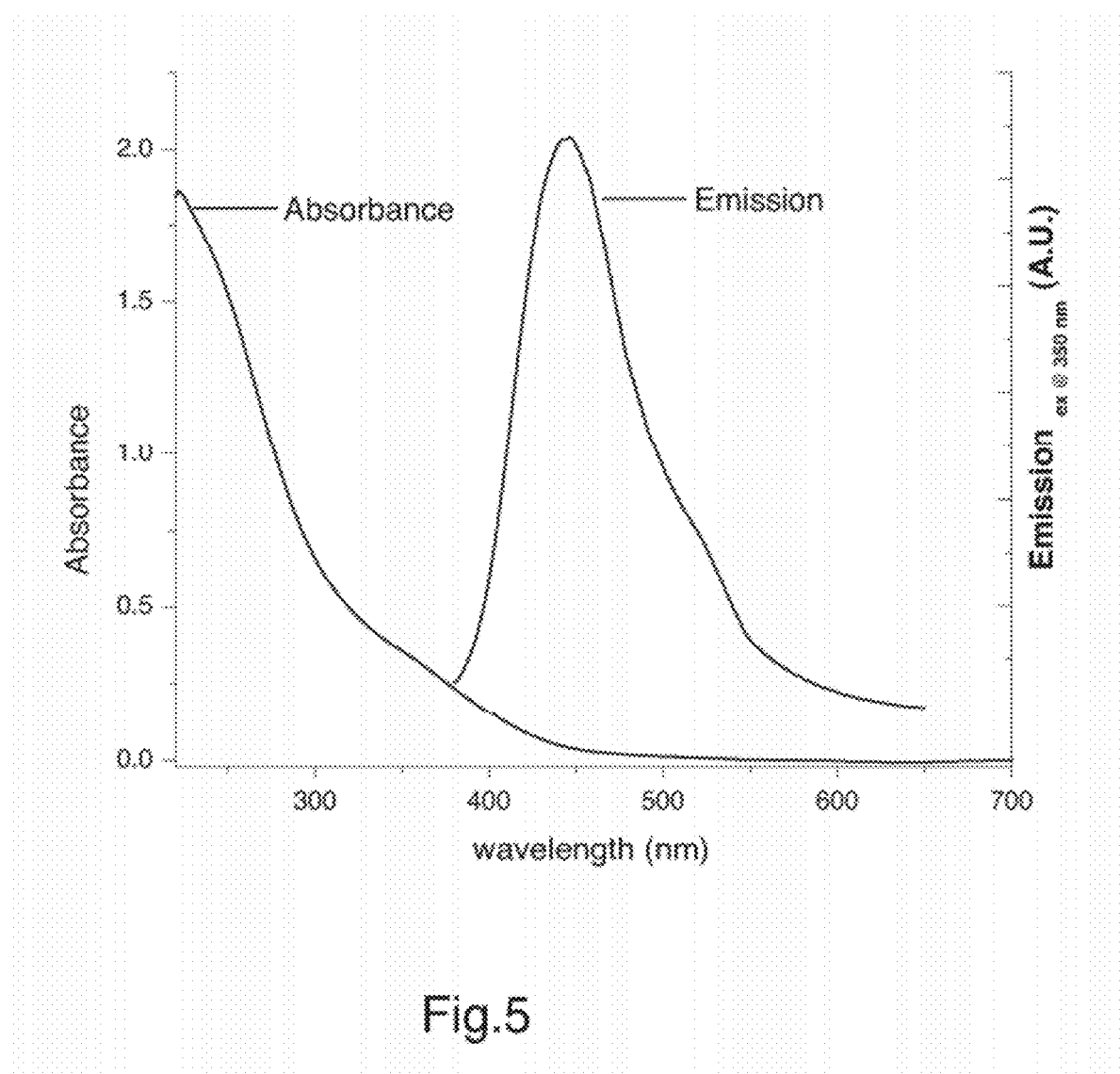
FIG. 5 represents uv-vis absorption and emission spectra of (CdSe—CdS)/PAA composite nanoparticles prepared according to Example 15.

(CdSe—CdS)/PAA Composite Nanoparticles According to the Invention 150 ml of CdSe/PAA nanoparticles produced according to Example 14 was placed in a 250 ml round bottom flask. 125.0 ml of 0.30 M thioacetamide in water was added to the flask containing the CdSe/PAA nanoparticles. The resulting mixture was stirred vigorously for 5 minutes, and was then heated to 80° C. on a heating mantle with very light stirring for 24 hours. The absorption and emission spectra of the resulting (CdSe—CdS)/PAA composite nanoparticles are shown in FIG. 5.

Example 16

CdTe/PAA Composite Nanoparticles according to the Invention

Figure 6:
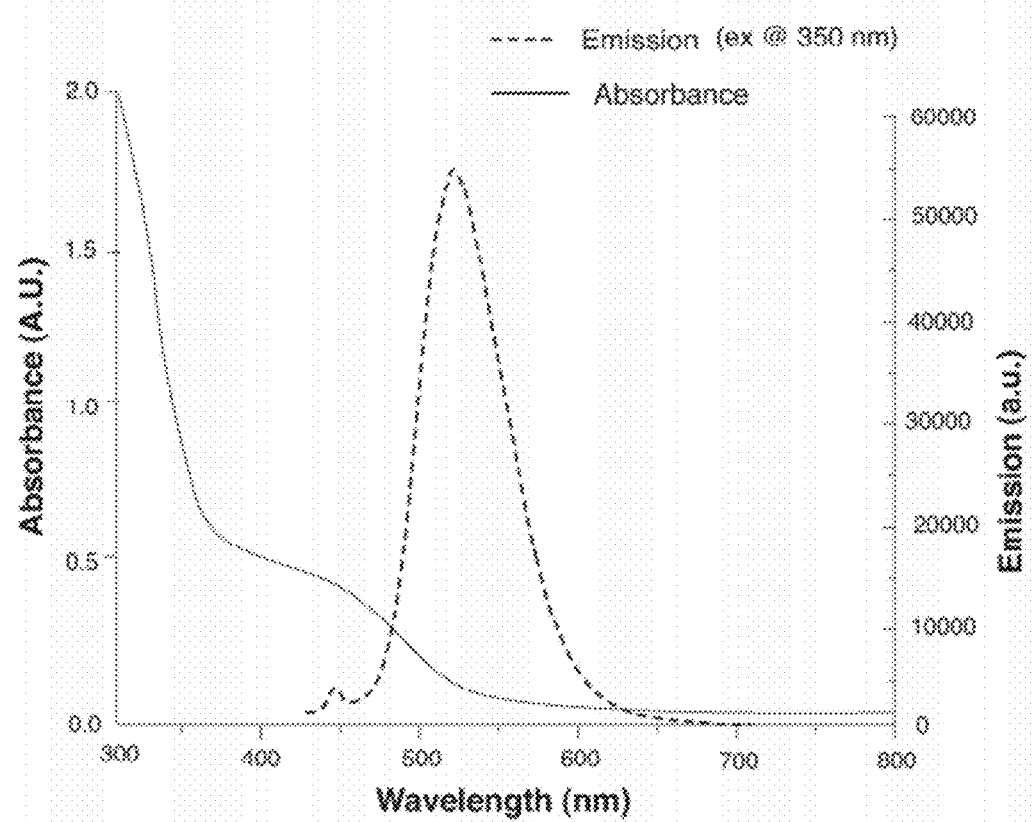
FIG. 6 represents uv-vis absorption and emission spectra of CdTe/PAA composite nanoparticles prepared according to Example 16.

Under ambient conditions, 300 ml of $Cd^{2+}$/PAA produced according to Example 12 was placed in a 500 ml round bottom flask. To this solution, 0.156 g of $NaBH_4$ and 0.312 g of trisodium citrate was added while the solution was being stirred. Immediately after the addition of the borohydride and the citrate, 12.5 ml of 0.01M $NaTeO_3$ was added. Upon addition of the $NaTeO_3$ solution, the solution develops a yellow color. The solution was then refluxed for approximately 20 hours to allow CdTe/PAA nanoparticles to form. The absorption and emission spectra of the resulting solution after 20 hours of reflux is shown in FIG. 6.

Example 17

(CdTe—ZnS)/PAA Composite Nanoparticles According to the Invention

Figure 7:
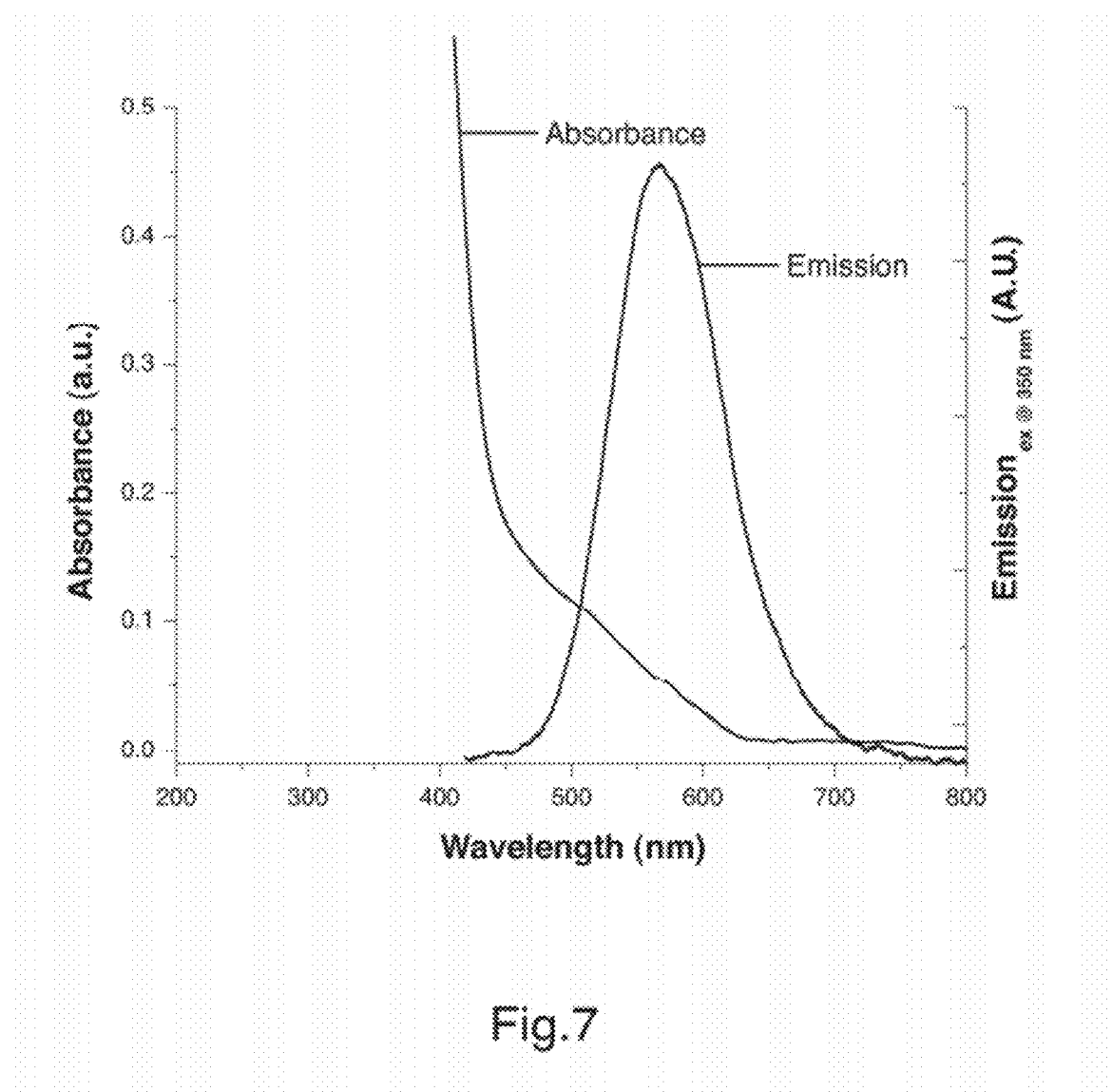
FIG. 7 represents uv-vis absorption and emission spectra of (CdTe—ZnS)/PAA composite nanoparticles produced according to Example 17.

In 50 a ml falcon tube, 1.7 ml of 3M NaCl was added to 15 ml CdTe/PAA nanoparticles particles formed according to Example 16. The resulting mixture was vortexed for 10 seconds after which 30 ml of absolute ethanol was added and was centrifuged at 8500 rpm for 15 minutes. After centrifugation, the brown pellet formed at the bottom of the falcon tube was rinsed with 20 ml 70% ethanol. The resulting solution was centrifuged at 8500 rpm for 10 mins. The brown pellet was isolated and resuspended in 15 ml deionized water. To 10 ml of the resuspended CdTe/PAA nanoparticles, 278 µL of 24 mM $Zn(NO_3)_2$ was added. The solution was stirred for 10 minutes after which 167 µL 39.5 mM $Na_2S$ was added. After 10 minutes of stirring, a second 278 µL of 24 mM $Zn(NO_3)_2$ was added. The solution was stirred for 10 minutes after which 167 µL 39.5 mM $Na_2S$ was added. After 10 more minutes of stirring, a third 278 µL of 24 mM $Zn(NO_3)_2$ was added. The solution was stirred for 10 minutes after which 167 µL 39.5 mM $Na_2S$ was added. The solution was left in a 50 ml falcon tube for at least 3 days before taking the emission spectra. The resulting solution's absorption and emission spectra after 3 days is shown in FIG. 7.

Example 18

Formation of $LiFePO_4$/PAA Composite Nanoparticles According to the Invention

Figure 8B:
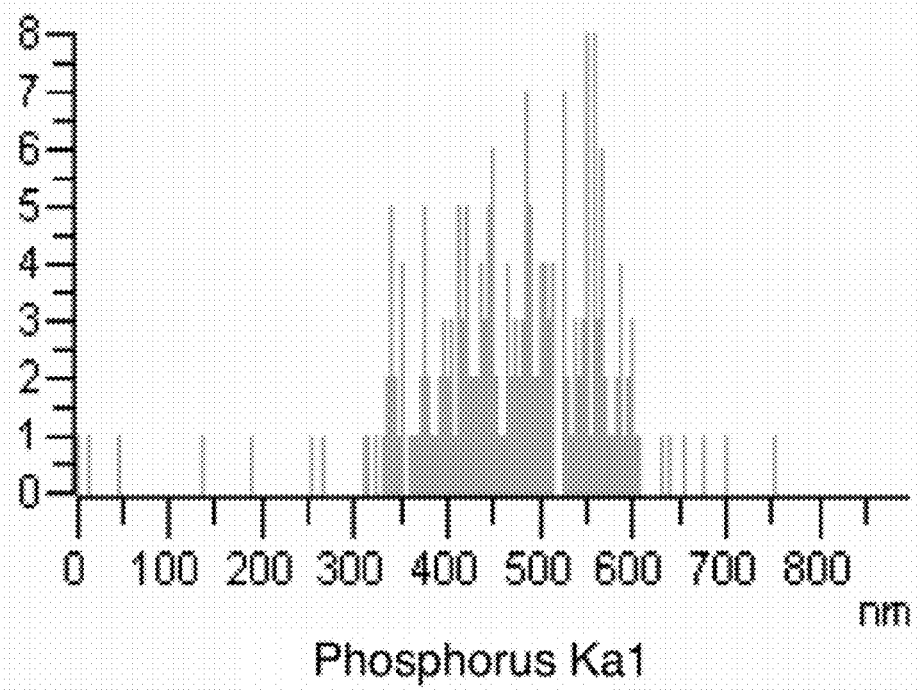
FIGS. 8(*a*)-8(*c*) represent STEM with EDX analysis of LiFePO$_4$/PAA composite nanoparticles produced according Example 18.
Figure 8C:
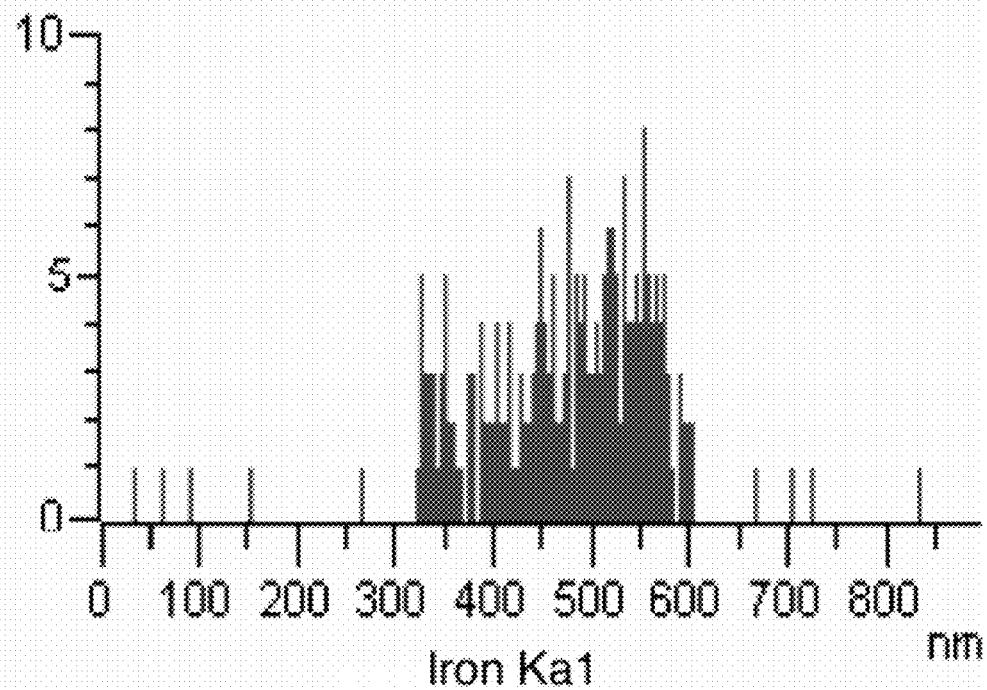
Figure 9:
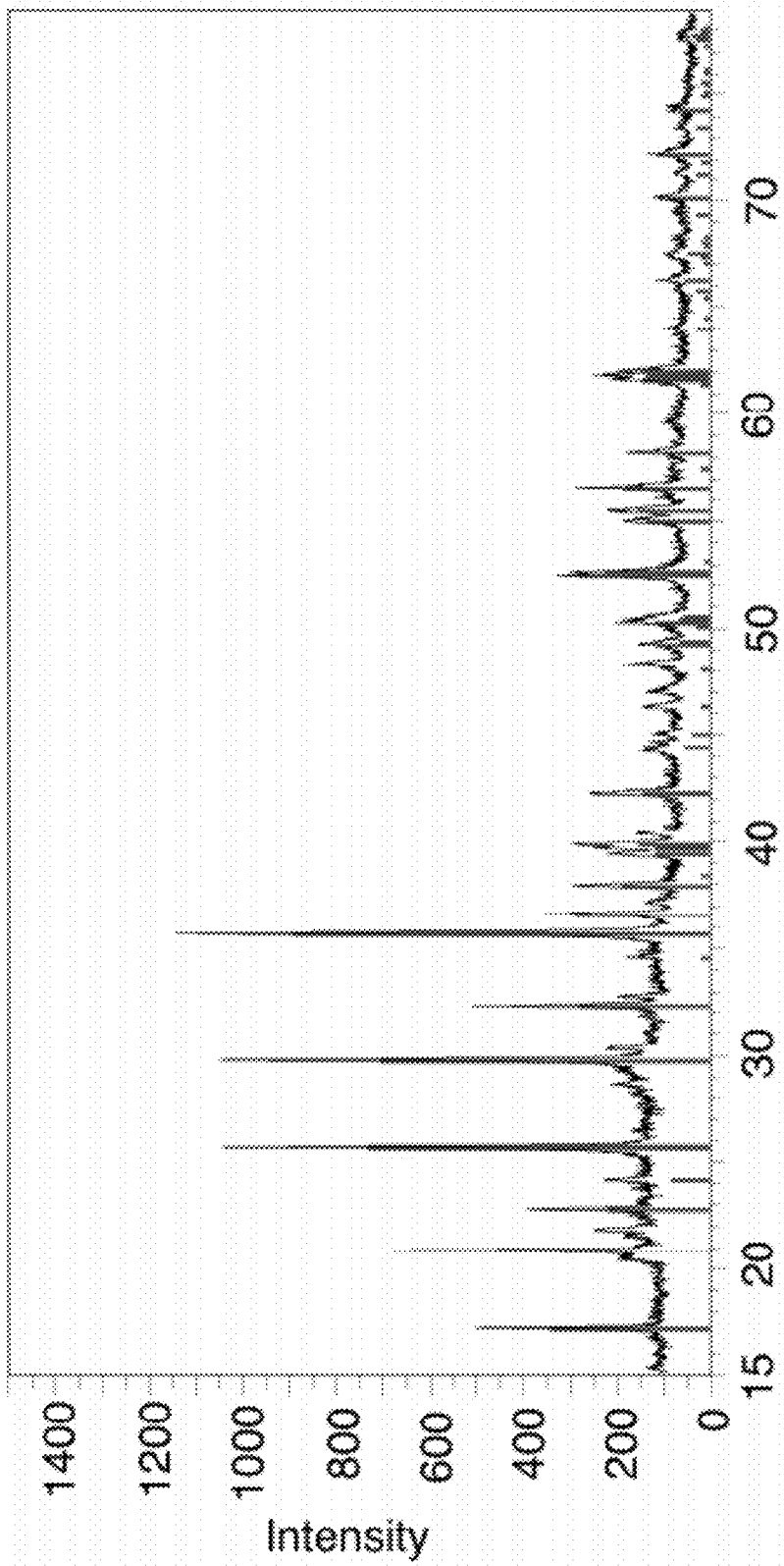
FIG. 9 represents a XRD pattern of LiFePO$_4$/PAA composite nanoparticles produced according Example 18.

A 20 ml solution of ($Fe^{2+}$, $Li^+$)/PAA was prepared according to Example 7 with some modifications. Briefly, in a 400 ml plastic beaker, 400.0 mg of PAA (Sigma, Average $M_V$ 1.2 million) was dissolved in 200 ml deionized water. The plastic beaker was immersed in a hot water bath (approximately 80-90° C.) and was stirred vigorously for at least 30 minutes or until all of the solid PAA has dissolved. Once the solution has cooled to room temperature, the pH was adjusted to 3.0 using 0.1 M $HNO_3$. pH measurements were done using narrow range pH paper. 10.0 ml of this PAA solution was taken and placed in a 50 ml glass beaker to which 10.0 ml of a solution that was 6.7 mM in both $FeCl_2$ and LiCl was added dropwise with vigorous stirring. The solution was crosslinked for 1.5 hours under 4 G25T8 Germicidal lamps. 5.0 ml of a 13 mM $NH_4H_2PO_4$ was then added to the UV exposed ($Fe^{2+}$, $Li^+$)/PAA. The solvent (water) of the resulting solution was removed using a rotary evaporator. When all of the solvent was removed, a light green colored residue remained and was then dried under vacuum for 12 hours. This light green residue was placed in tube furnace and was heated under $N_2$ atmosphere for 12 hours at 600° C. After 12 hours of heating in the furnace, the light green residue tuned black. The STEM images with EDX analysis of the $LiFePO_4$/PAA composite nanoparticle are shown in FIG. 8. FIG. 8a is a STEM image of $LiFePO_4$/PAA prepared according to the present invention, and wherein FIG. 8b shows the cross-sectional abundance of phosphorous along the scanned line in FIG. 8a acquired using electron dispersive x-rays; and FIG. 8c shows the cross-sectional abundance of iron along the scanned line in FIG. 8a acquired using electron dispersive x-rays. The XRD pattern for the $LiFePO_4$/PAA composite nanoparticle is shown in FIG. 9.

Example 19

Figure 10B:
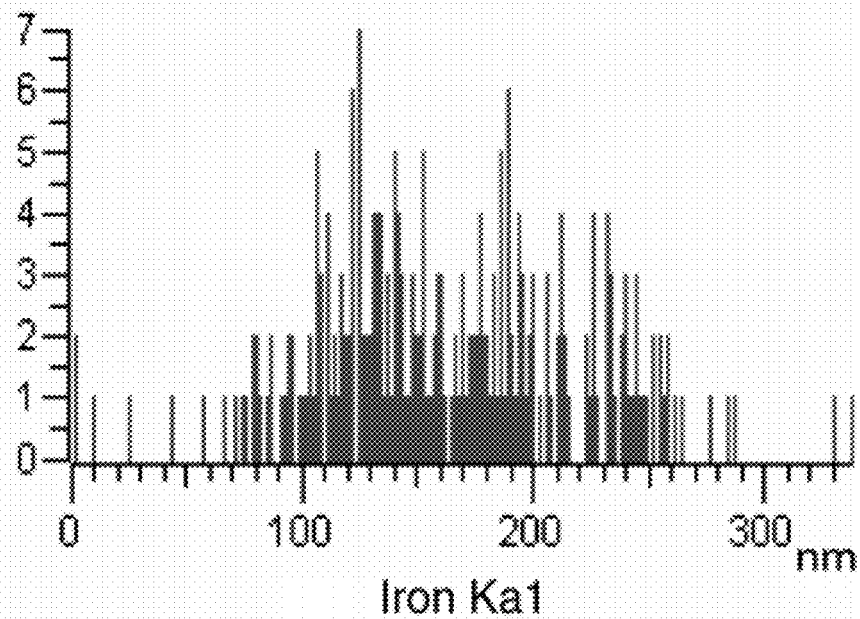
FIGS. 10(*a*)-10(*c*) represents STEM with EDX analysis of Fe$_2$O$_3$/PAA composite nanoparticles produced according Example 19.
Figure 10C:
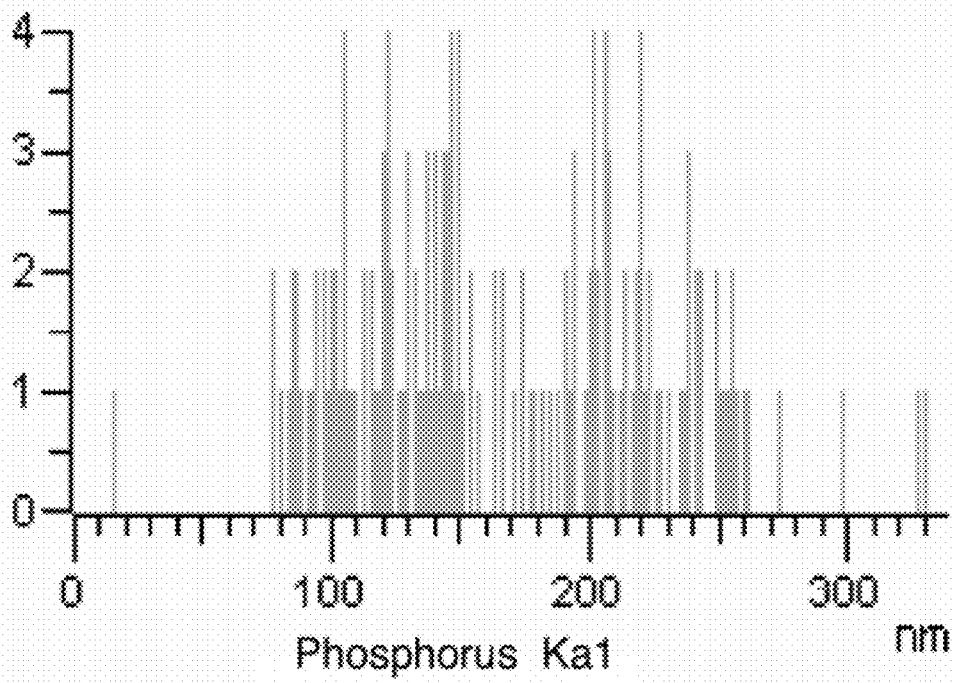
Figure 11:
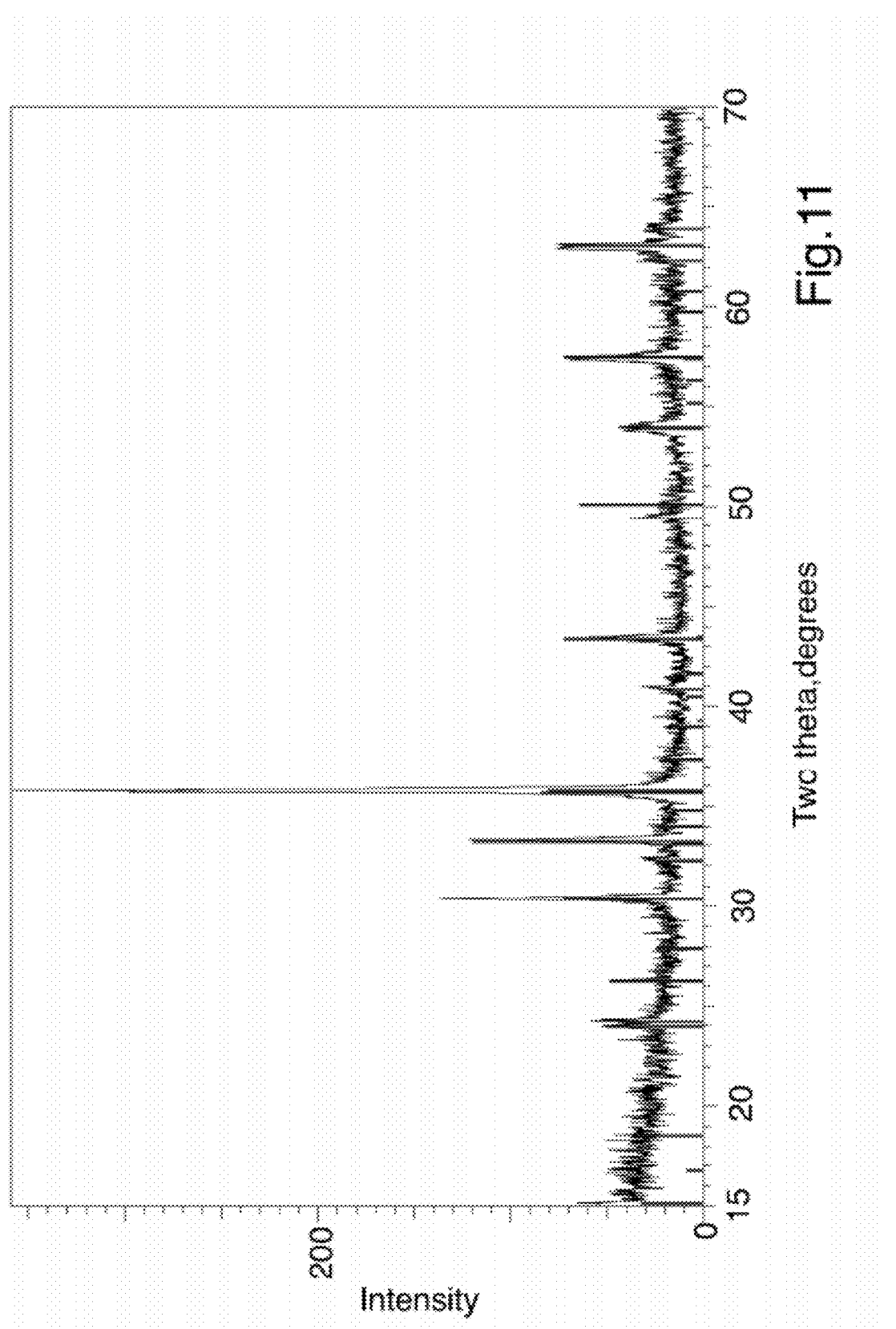
FIG. 11 represents an XRD x-ray diffraction pattern of Fe$_2$O$_3$/PAA composite nanoparticles produced according to Example 19.

Formation of $Fe_2O_3$/PAA Composite Nanoparticles According to the Invention $Fe_2O_3$/PAA is formed by following exactly Example 18 with only one modification. The pH of the PAA should be adjusted to pH 6.8 instead of pH 3.0 using 0.1M NaOH before adding the $FeCl_2$ and LiCl solution. The rest of the procedure remains the same. Surprisingly, this single modification leads to the formation of $Fe_2O_3$/PAA instead of $LiFePO_4$/PAA. The STEM images with EDX analysis of the $LiFePO_4$/PAA nanocomposite particles are shown in FIG. 10. FIG. 10a is a STEM image $Fe_2O_3$/PAA nanocomposite prepared according to the present invention, and wherein FIG. 10b shows the cross-sectional abundance of iron along the scanned line in FIG. 10a acquired using electron dispersive x-rays; and FIG. 10c shows the cross-sectional abundance of phosphorous along the scanned line in FIG. 10a acquired using electron dispersive x-rays. The XRD pattern is shown in FIG. 11, wherein H is hematite, alpha-Fe2O3 and M is defect spinal structure of magnetite, gamma-Fe2O3, maghemite. Note that although the EDX images show the presence of phosphate, the XRD pattern suggests that $Fe_2O_3$ is present and not $LiFePO_4$.

Example 20

Formation of ZnO/PAA Composites Nanoparticles According to the Invention

Figure 12:
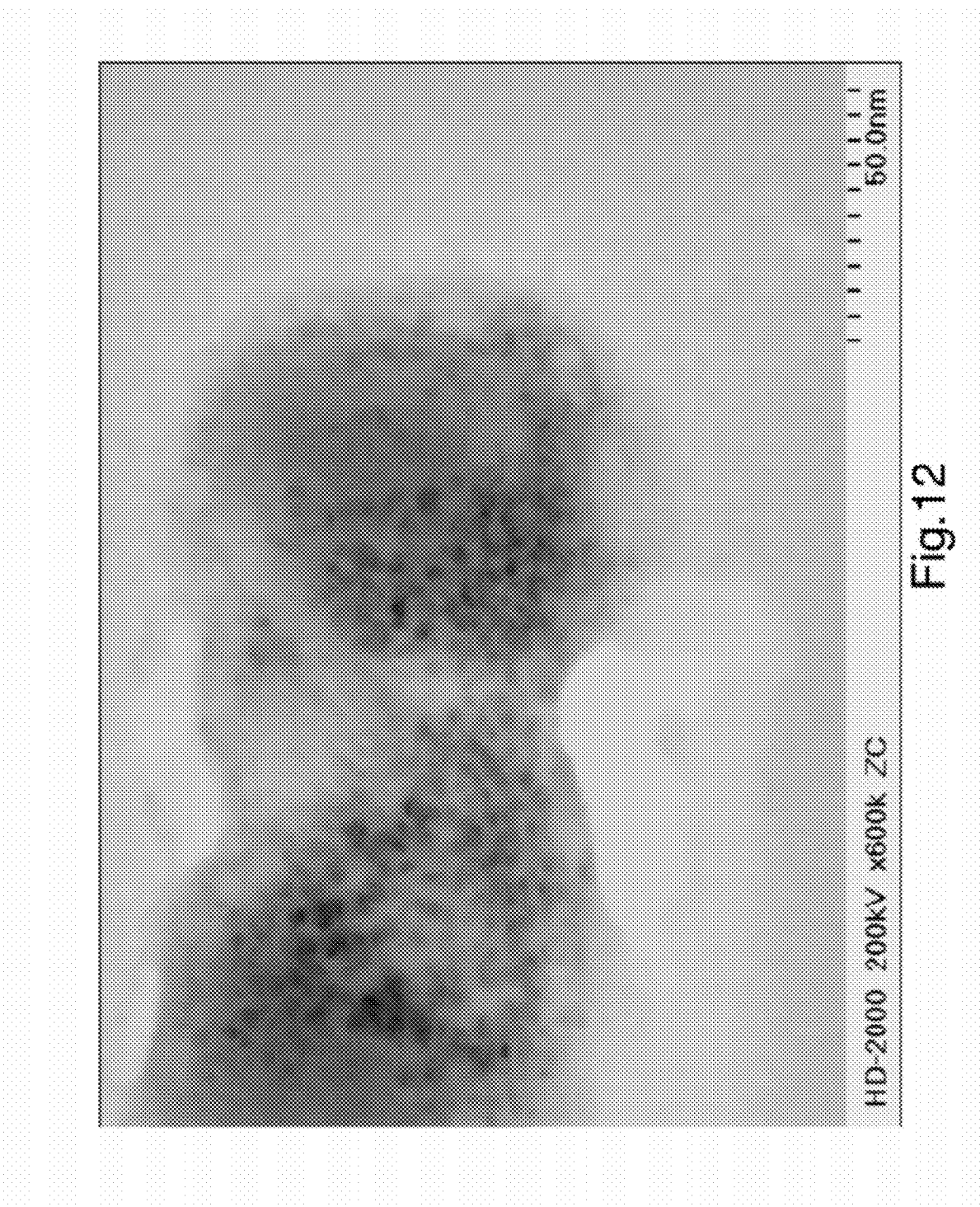
FIG. 12 represents STEM image of ZnO/PAA composite nanoparticles made according to Example 20.
Figure 13:
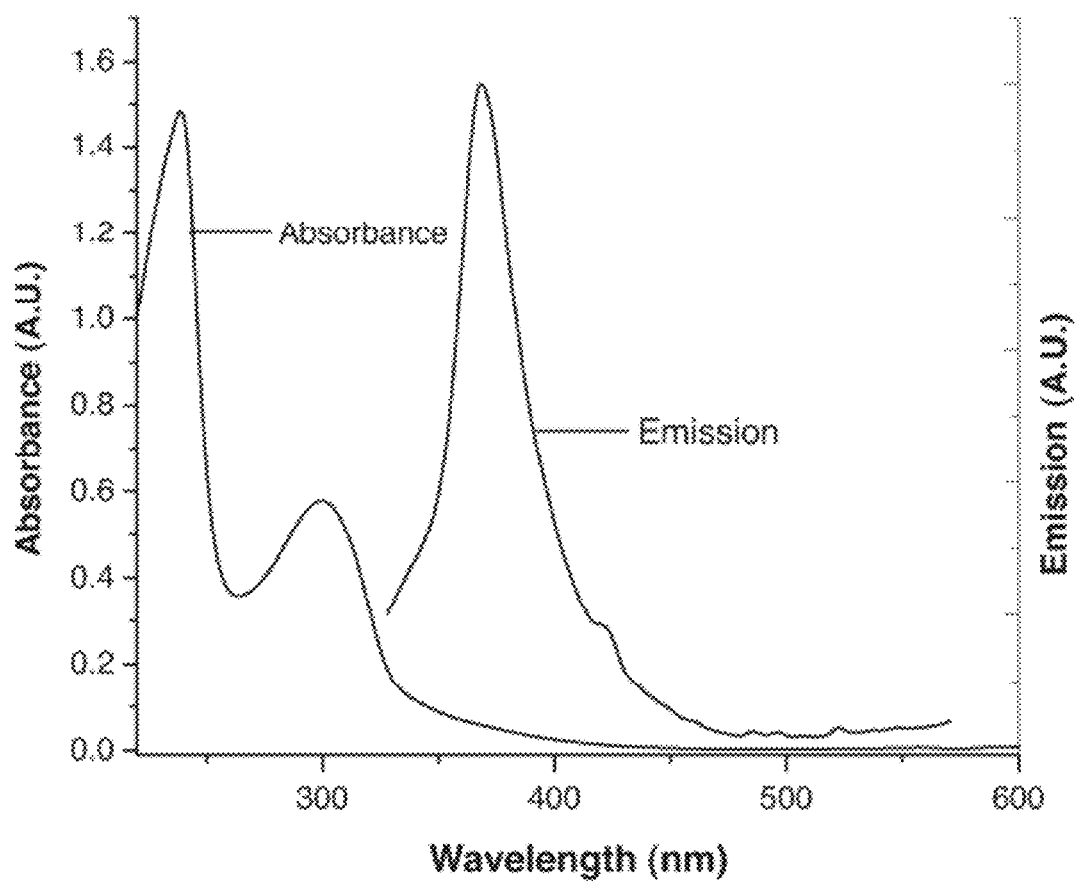
FIG. 13 represents uv-vis absorbance and emission spectra of ZnO/PAA composite nanoparticles made according to Example 20.

A 20 ml solution of $Zn^{2+}$/PAA was prepared by dropwise addition of 10 ml of 0.005M $Zn(NO_3)_2$ solution to 10 ml of 2 mg/ml aqueous solution of PAA (Sigma, Ave $M_w$ 1.2 million PAA, pH adjusted to 6.8 with 0.1 M NaOH) with vigorous stirring. The solution was exposed to UV radiation for 1.5 hours under 4 G25T8 Germicidal lamps as in Example 12. The pH UV exposed $Zn^{2+}$/PAA was adjusted to pH 11.0 with 0.1 M NaOH, and then refluxed for 1 hour. After reflux, the solution turns slightly cloudy. The absorbance, emission spectra and STEM image are shown in FIG. 12 and the absorbance and emission spectra are shown in FIG. 13.

Example 21

Figure 14:
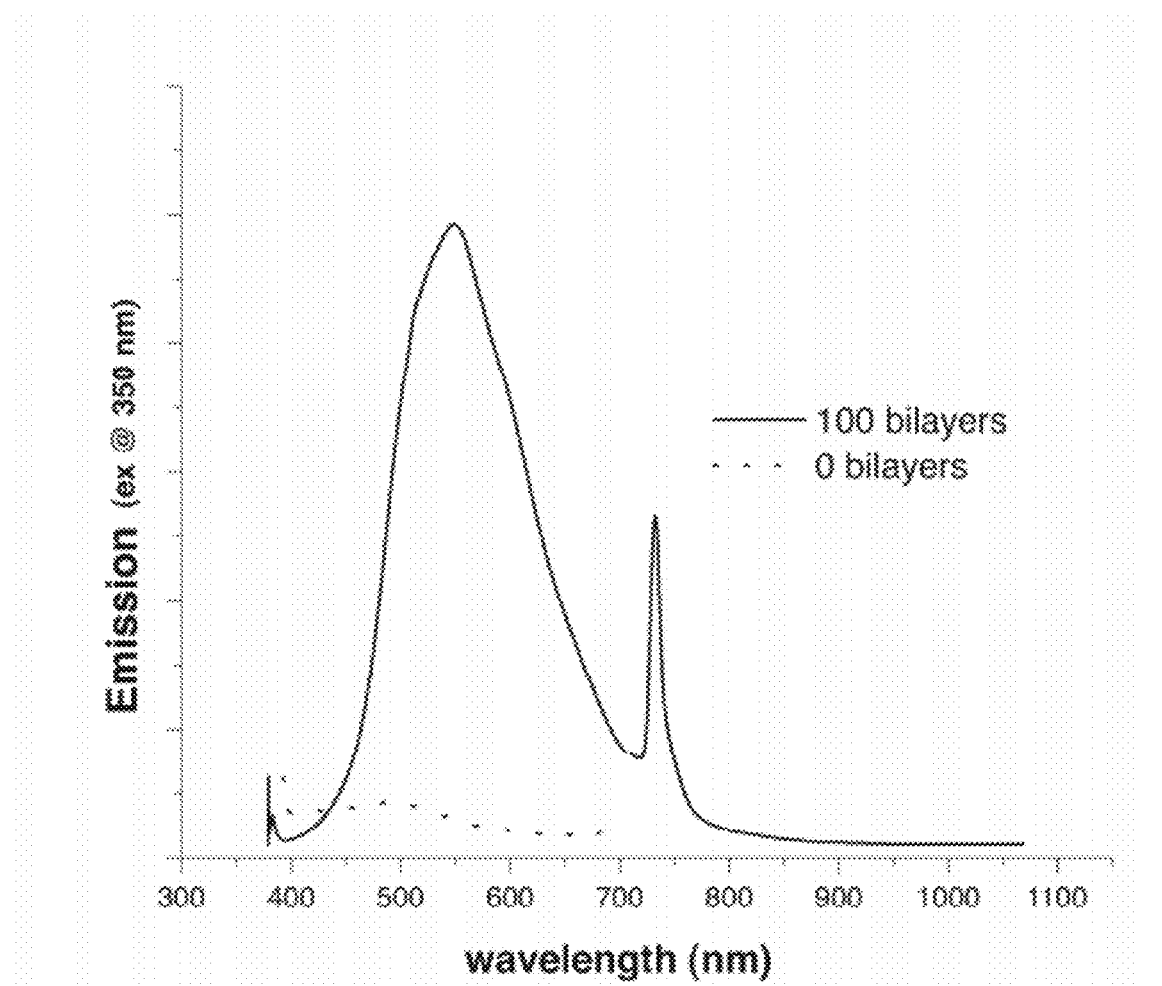
FIG. 14 represents emission spectra of both CdS/PAA composite nanoparticles coated and non-coated polystyrene prepared according to Example 21.

Incorporation of CdS/PAA Composite Nanoparticles According to the Invention into Layer-by-Layer Thin Films Polystyrene substrates were sonicated in 0.01M sodium dodecyl sulfate +0.1M HCl solution for 3 minutes, rinsed with distilled water, and dried with nitrogen. Layer by Layer (LbL) thin films were formed by immersing the substrate in 1 mg/ml PAH (poly(allylamine) hydrochloride) in 0.1M NaCl for 5 minutes, followed by a 5 minute rinse in 0.1M NaCl, then immersed in a solution of CdS/PAA nanoparticle solution (prepared according Example 13) for 5 minutes, then rinsed in 0.1 M NaCl solution for 5 minutes. This process was repeated 100 times. Emission spectra of the polystyrene substrate coated with the LbL thin films of PAH:CdS/PAA composite nanoparticles is shown in FIG. 14.

Example 22

Figure 15:
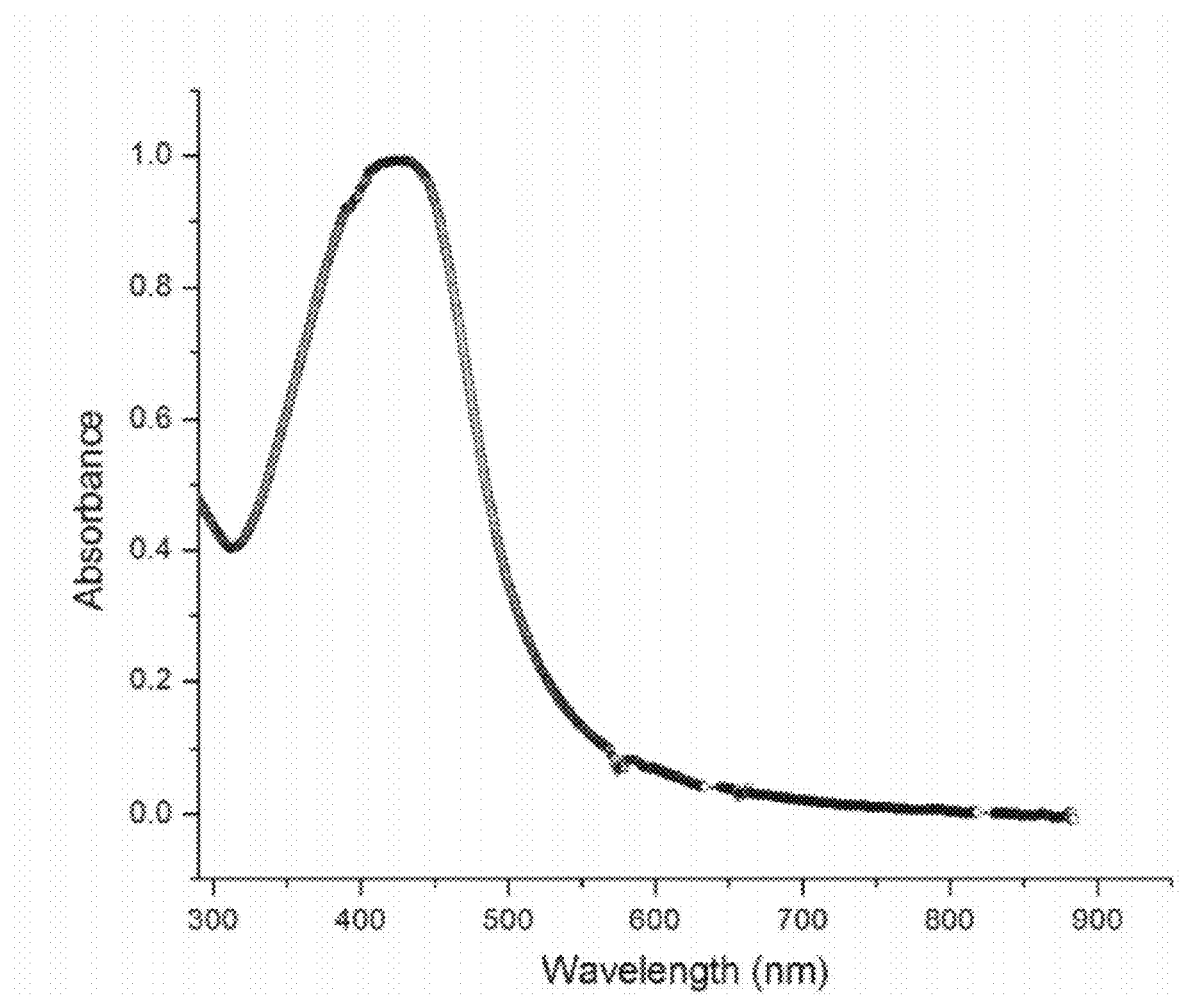
FIG. 15 represents uv-vis absorption spectra of Ag/PAA composite nanoparticles produced according to Example 22.
Figure 16:
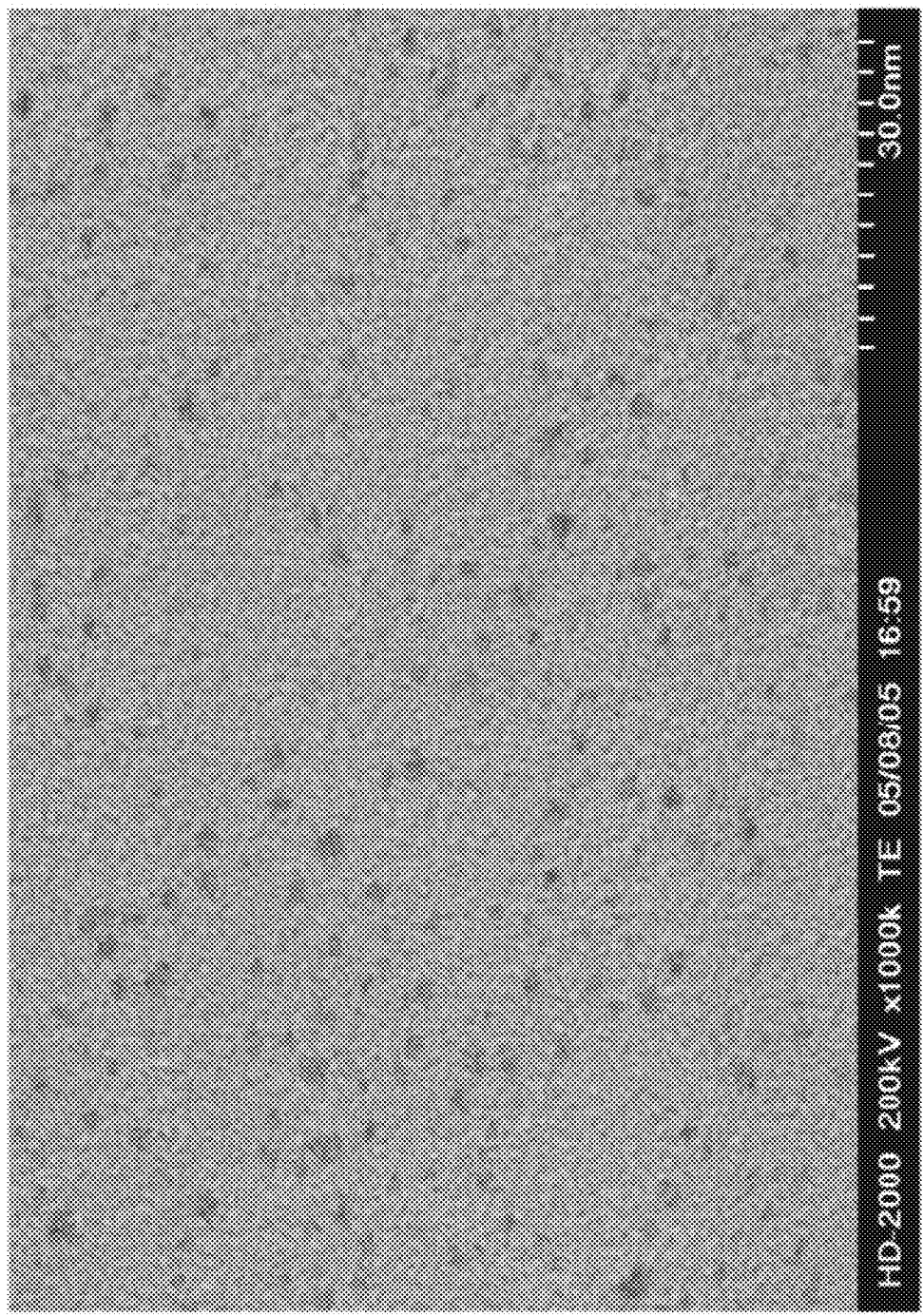
FIG. 16 represents a STEM image of Ag/PAA composite nanoparticles produced according to Example 22.

Ag/PAA Composite Nanoparticles According to the Invention 20 ml of $Ag^+$/PAA was made according to Example 4. Briefly, in a 400 ml plastic beaker, 400.0 mg of PAA (Sigma, Average $M_V$ 1.2 million) was dissolved in 200 ml deionized water. The plastic beaker was immersed in a hot water bath (approximately 80-90° C.) and was stirred vigorously for at least 30 minutes or until all of the solid PAA has dissolved. Once the solution has cooled to room temperature, the pH was adjusted to 6.8 using 0.1 M NaOH. pH measurements were done using narrow range pH paper. 10.0 ml of this PAA solution was placed in a 20 ml scintillation vial and to this, 10 ml of 4.0 mM $AgNO_3$ solution was added drop wise under constant stirring. 0.5 mL of 2-propanol was added to the mixture. The final solution volume was 20 mL. The vials were sealed with rubber septa and subjected to $^{60}Co$ irradiation using a gamma cell type G.C. 220 with a dose rate of 3.3 kGy/hr, at a total dose of 15 kGy. The UV-vis spectra and STEM images of the resulting Ag/PAA composite nanoparticles are shown in FIGS. 15 and 16, respectively.

Example 23

Figure 17:
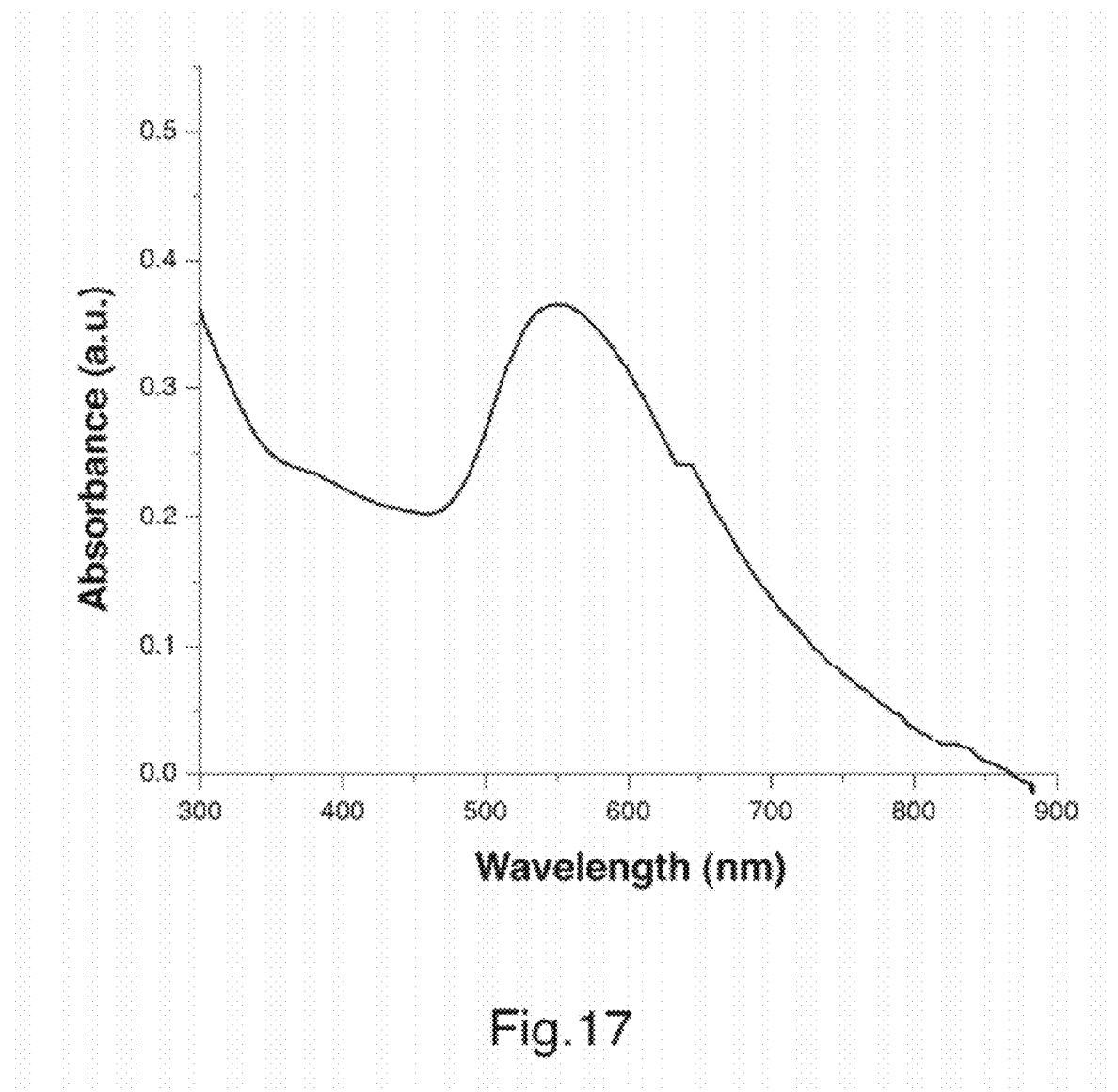
FIG. 17 represents uv-vis absorption spectra of Au/PAA composite nanoparticles produced according to Example 23.
Figure 18:
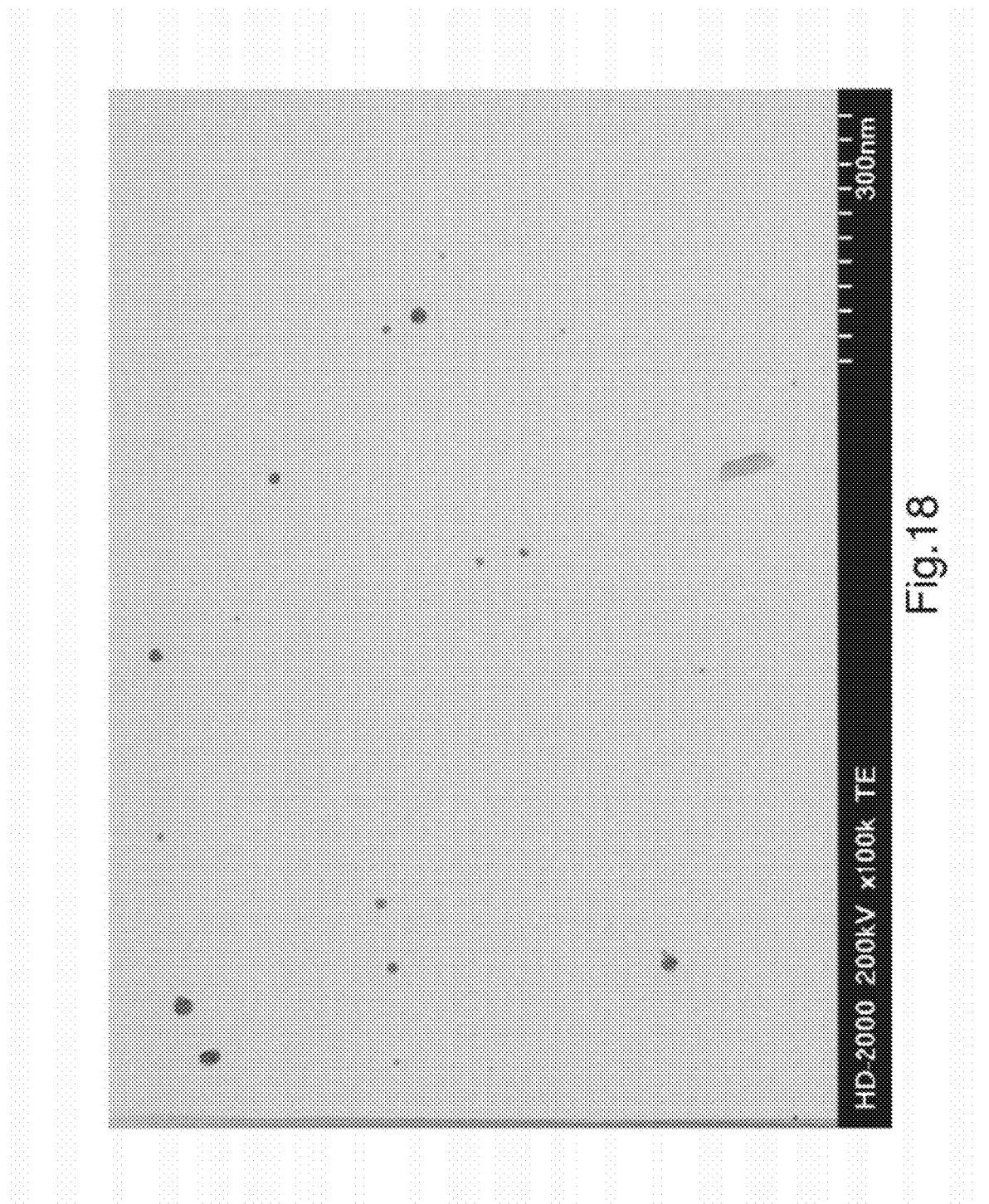
FIG. 18 represents STEM image of Au/PAA composite nanoparticles produced according to Example 23.

Au/PAA Composite Nanoparticles According to the Invention 20 ml of $Au^{3+}$/PAA was made according to Example 4. Briefly, in a 400 ml plastic beaker, 400.0 mg of PAA (Sigma, Average $M_V$ 1.2 million) was dissolved in 200 ml deionized water. The plastic beaker was immersed in a hot water bath (approximately 80-90° C.) and was stirred vigorously for at least 30 minutes or until all of the solid PAA has dissolved. Once the solution has cooled to room temperature, the pH was adjusted to 6.8 using 0.1 M NaOH. pH measurements were done using narrow range pH paper. 10.0 ml of this PAA solution was placed in a 20 ml scintillation vial, and to this 10 ml of 4.0 mM $HAuCl_3$ solution was added drop wise under constant stirring. 0.5 mL of 2-propanol was added to the mixture. The final solution volume was 20 mL. The vials were sealed with rubber septa and subjected to $^{60}Co$ irradiation using a gamma cell type G.C. 220 with a dose rate of 3.3 kGy/hr, at a total dose of 15 kGy. The UV-vis spectra and STEM images of the resulting Au/PAA composite nanoparticles are shown in FIGS. 17 and 18, respectively.

Example 24

Figure 19:
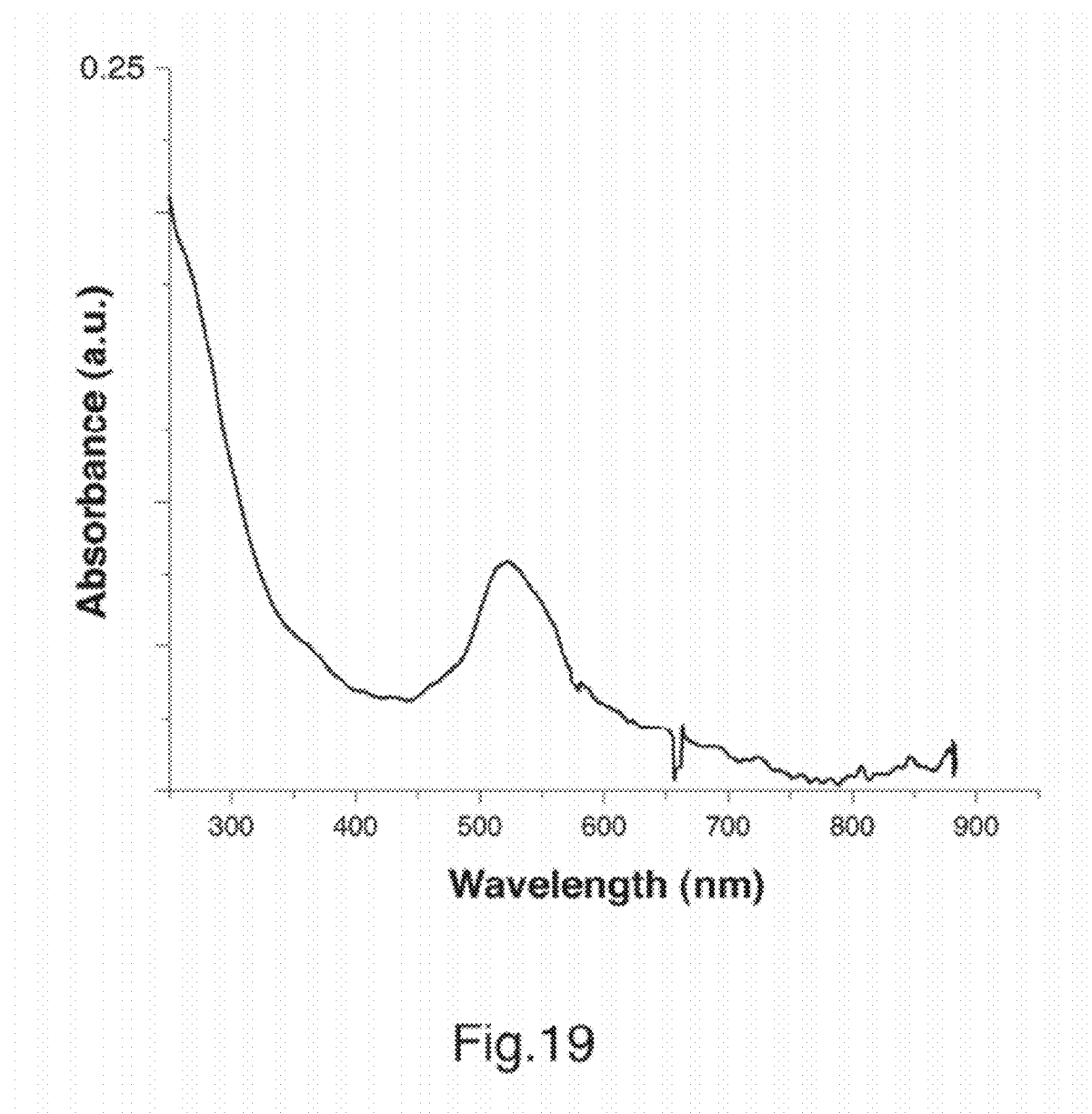
FIG. 19 represents uv-vis spectra of (Au, Ag)/PAA composite nanoparticles produced according to Example 24.

(Au, Ag)/PAA Composite Nanoparticles According to the Invention 20 ml of $(Ag^+, Au^{3+})$/PAA was made according to Example 4. Briefly, in a 400 ml plastic beaker, 400.0 mg of PAA (Sigma, Average $M_V$ 1.2 million) was dissolved in 200 ml deionized water. The plastic beaker was immersed in a hot water bath (approximately 80-90° C.) and was stirred vigorously for at least 30 minutes or until all of the solid PAA has dissolved. Once the solution has cooled to room temperature, the pH was adjusted to 6.8 using 0.1 M NaOH. pH measurements were done using narrow range pH paper. 10.0 ml of this PAA solution was placed in a 20 ml scintillation vial, and to this 5 ml of 4.0 mM $HAuCl_3$ solution was added drop wise under constant stirring. This was then followed by the drop wise addition of 5.0 ml 4 mM $Ag(NO_3)$, and finally the addition of 0.5 ml of 2-propanol. The final solution volume was 20 mL. The solution was exposed to 4 G25T8 germicidal UV lamps (approximate power is 12 $\mu W/mm^2$) for approximately 1.5-2 hours under vigorous stirring. After irradiation, the solution changed from colorless to light purple. The UV-vis spectra and STEM images of the resulting (Au.Ag)/PAA composite nanoparticles are shown in FIGS. 19 and 20, respectively. FIG. 20a is a STEM image (Au, Ag)/PAA nanocomposite prepared according to the present invention; and wherein FIG. 20b shows the cross-sectional abundance of silver along the scanned line in FIG. 20a acquired using electron dispersive x-rays; and FIG. 20c shows the cross-sectional abundance of gold along the scanned line in FIG. 20a acquired using electron dispersive x-rays.

Example 25

Formation of CdSePAA-Fluorescein Conjugate According to the Invention

In a 1.5 mL microfuge tube, 400 µL of CdSePAA (~0.2 mg/mL in $ddH_2O$) was combined with 4.9 mg 1-ethyl-3-(3-dimethylaminopropyl)-carbodiimide (EDC) and 6 mg N-hydroxysuccinimide (NHS) in 500 µL of $ddH_2O$. 100 µL of 250 mM 2-morpholinoethanesulfonic acid (MES) (pH ~6.5) was added. And finally, 20 µL of 5 mg/mL fluorescein in N,N-dimethylformamide (DMF) was also added. The tube containing this mixture was wrapped in aluminum foil and placed on a rotating table for ~20 h at room temperature. The resulting mix was placed in a 10 kDa MWCO dialysis bag and dialyzed against $ddH_2O$. The dialysis solution (~200 fold dilution each time) was changed five times over a period of ~24 h. The solution remaining in the dialysis bag was recovered and centrifuged for 10 min at 15,000 RCF. A brown pellet is found after the centrifugation. The fluorescent supernatant was transferred to a new microfuge tube and further purified by precipitation with the addition of ~1/10 volume of 3M sodium acetate (pH ~5.5) and 2× volume of absolute ethanol. The resulting fluorescent precipitate was then isolated by centrifugation for 10 min at 15,000 RCF and resuspended in 200 µL ddH$_2$O.

The presence of fluorescein conjugated to CdSePAA was confirmed by gel permeation chromatography using a fluorescence detector (excitation at 480 nm and emission at 515 nm).

Example 26

Formation of CdSePAA-BSA Conjugate According to the Invention

In a 1.5 mL microfuge tube, 900 µL, of CdSe/PAA (~0.2 mg/mL in ddH$_2$O) was combined with 5.3 mg EDC and 10.8 mg NHS in 100 µL of 250 mM MES (pH ~6.5). And finally, 5.1 mg bovine serum albumin (BSA) was also added. The tube containing this mixture was placed on a rotating table for ~19 h at room temperature.

The resulting mix was centrifuged for 10 min at 15,000 RCF. ~500 µL of the supernatant was transferred to a 100 kDa MWCO centrifugal filter and centrifuged for 12 min at 14,000 RCF. The resulting filtrate was discarded, and the retenate was resuspended in 500 µL of ddH$_2$O in the same filter and centrifuged again. This was repeated three more times. The final retenate was recovered for characterization.

Removal of unconjugated BSA using the 100 kDa MWCO filter was confirmed by gel permeation chromatography. And the presence of BSA conjugated to CdSe/PAA remaining in the retenate was confirmed by assay with BioRad protein reagent.

Example 27

Figure 21:
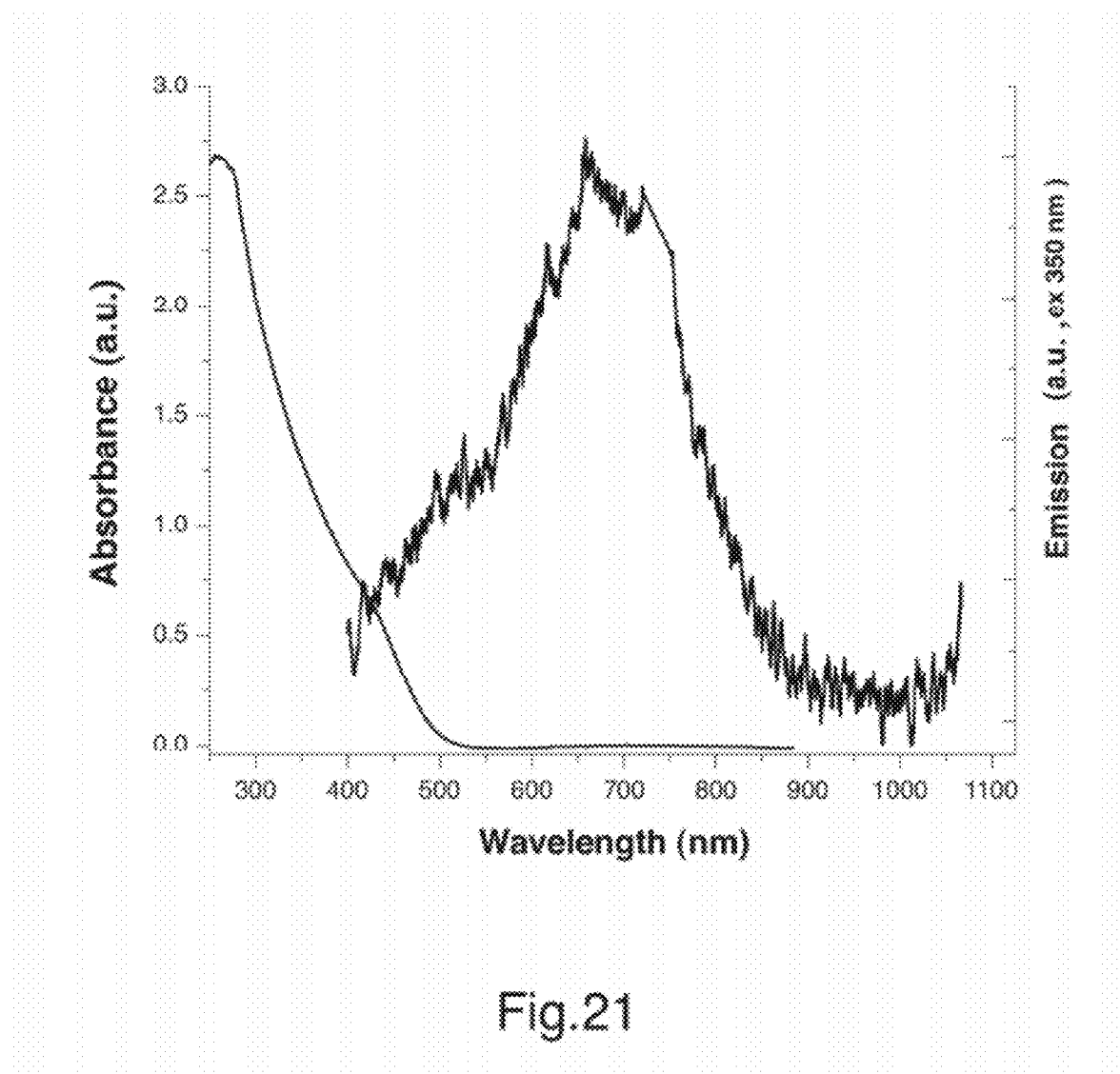
FIG. 21 represents uv-vis and emission spectra of CdS/PSS composite nanoparticles produced according to Example 27.

CdS/PSS Composite Nanoparticles According to the Invention 400 mg of Poly(styrene sulfonic acid) sodium salt (Alfa Aesar, Ave M$_w$ 1 million) was dissolved in 200.0 ml deionized water. 20.0 ml of this solution was placed in an 80 ml vial and to this, 20.0 ml 4.8 mM Cd(NO$_3$)$_2$ solution was added dropwise with vigorous stirring. The solution was exposed to 4 G25T8 germicidal UV lamps (approximate UV power is 12 µW/mm$^2$) for 1 hour under vigorous stirring. CdS was formed by adding 0.5 ml 1.4 mM Na$_2$S to 0.5 ml of the irradiated Cd$^{2+}$/PSS solution. UV-visible absorbance and emission spectra are shown in FIG. 21.

Example 28

Figure 22:
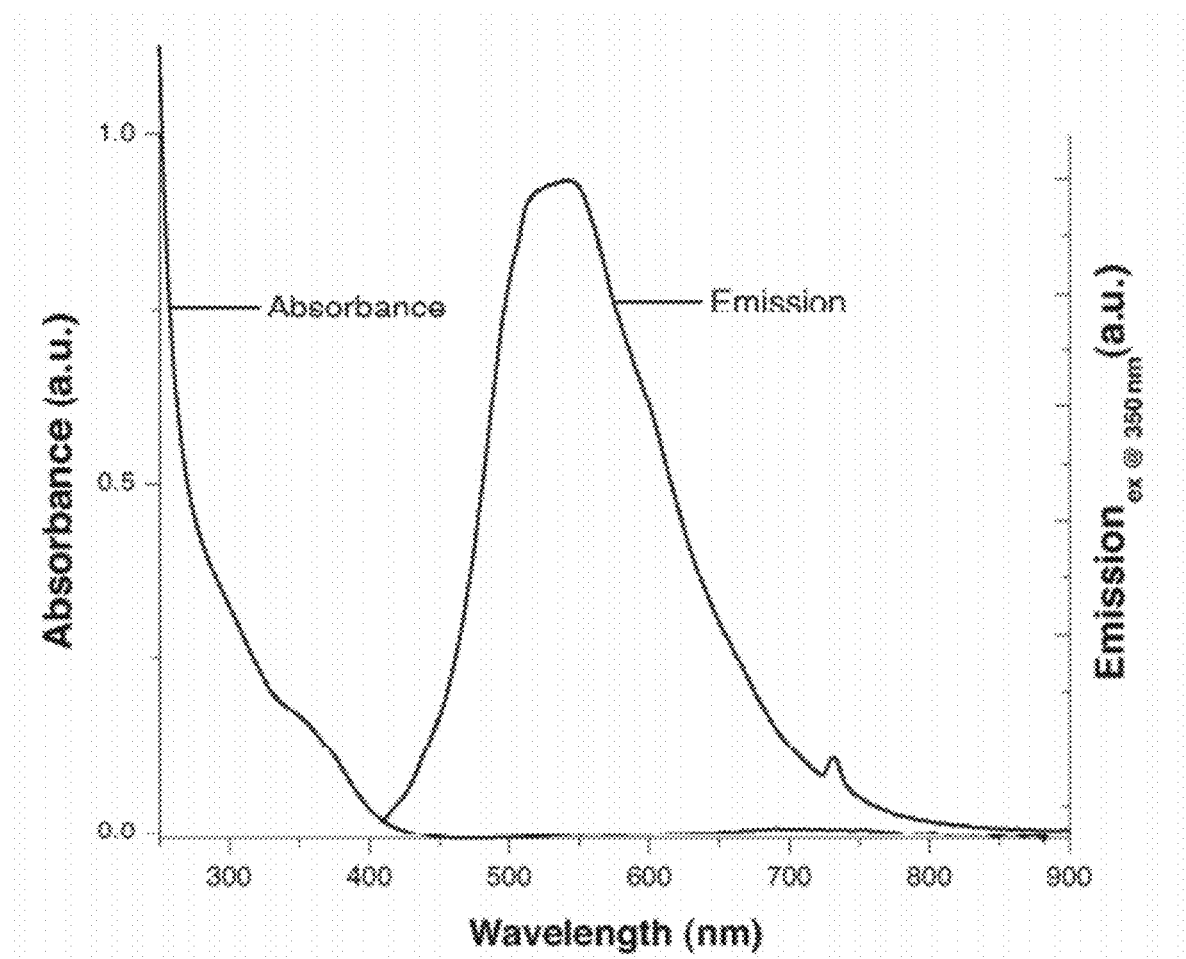
FIG. 22 represents uv-vis and emission spectra of CdS/PDDA composite nanoparticles produced according to Example 28.

CdS/PDDA Nanoparticles 15.0 ml of poly(diallyldimethylammonium chloride) (PDDA) [Sigma, Average M$_w$ 400-500K, 20 wt % in water] was diluted to 300 ml with deionized water. The solution was stirred for 10 minutes. 5.0 ml of this solution was diluted to 25.0 ml with deionized water in a 80 ml glass beaker. To this solution, 25.0 ml of 4 mM Na$_2$S was added dropwise with vigorous stirring. The solution was exposed to 4 G25T8 germicidal UV lamps (approximate UV power is 12 µW/mm$^2$) for 1 hour under vigorous stirring. CdS/PDDA was formed by adding 0.50 ml of 2.68 mM Cd(NO$_3$)$_2$ to 0.50 ml of irradiated S$^{2-}$/PDDA. UV-visible absorbance and emission spectra are shown in FIG. 22.

Example 29

Polyanion Collapse with Cd$^{2+}$/Pb$^{2+}$ Cations

In a 400 mL plastic beaker, 400.0 mg of PAA (Sigma, Average M$_V$ 1.2 million) was dissolved in 200 mL deionized water. The plastic beaker was immersed in a hot water bath (approximately 80-90° C.) and was stirred vigorously for at least 30 minutes or until all of the solid PAA had dissolved. Once the solution had cooled to room temperature, the pH was adjusted to 6.8 using 0.1 M NaOH. pH measurements were done using narrow-range pH paper. 25 mL of a Cd$_x$Pb$_{1-x}$(NO$_3$)$_2$ solution was prepared by the addition of 5 mM Cd(NO$_3$)$_2$ and 5 mM Pb(NO$_3$)$_2$ salt solutions in various proportions, where x=0.1, 0.2, 0.3, 0.4, 0.5, 0.6, . . . , 1. The total concentration of metal ions in the final solution was 5 mM. 20 mL of the pH-adjusted PAA and 25 mL of deionized water were obtained and placed in a 100 mL beaker. 15 mL of the metal solution was then added dropwise under vigorous stirring to yield 60 mL of a Cd$_x^{2+}$Pb$_{1-x}^{2+}$/PAA solution with a final [Cd$_x^{2+}$Pb$_{1-x}^{2+}$] of 1.25 mM and final PAA concentration of 0.67 mg/mL.

Example 30

Polyanion Collapse with Cd$^{2+}$-Mg$^{r+}$(10%) Cations

In a 400 mL plastic beaker, 400.0 mg of PAA (Sigma, Average M$_V$ 1.2 million) was dissolved in 200 mL deionized water. The plastic beaker was immersed in a hot water bath (approximately 80-90° C.) and was stirred vigorously for at least 30 minutes or until all of the solid PAA had dissolved. Once the solution had cooled to room temperature, the pH was adjusted to 6.8 using 0.1 M NaOH. pH measurements were done using narrow-range pH paper. 25 mL of a Cd$_{0.9}$Mg$_{0.1}$(NO$_3$)$_2$ solution was prepared by mixing together of 22.5 mL and 2.5 mL of 5 mM Cd(NO$_3$)$_2$ and 5 mM Mg(NO$_3$)$_2$ solutions, respectively. The total concentration of metal ions in solution was 5 mM. 20 mL of the pH-adjusted PAA and 25 mL of deionized water were obtained and placed in a 100 mL beaker. 15 mL of the metal solution was then added dropwise under vigorous stirring to yield 60 mL of a Cd$_{0.9}^{2+}$Mg$_{0.1}^{2+}$/PAA solution with a final [Cd$_{0.9}^{2+}$Mg$_{0.1}^{2+}$] of 1.25 mM and final PAA concentration of 0.67 mg/mL.

Example 31

Polyanion Collapse with Cd$^{2+}$—Zn$^{2+}$ (90%) Cations

In a 400 mL plastic beaker, 400.0 mg of PAA (Sigma, Average M$_V$ 1.2 million) was dissolved in 200 mL deionized water. The plastic beaker was immersed in a hot water bath (approximately 80-90° C.) and was stirred vigorously for at least 30 minutes or until all of the solid PAA had dissolved. Once the solution had cooled to room temperature, the pH was adjusted to 6.8 using 0.1 M NaOH. pH measurements were done using narrow-range pH paper. 10 mL of a Cd$_{0.1}$Zn$_{0.9}$(NO$_3$)$_2$ solution was prepared by mixing together of 1 mL and 9 mL of 5 mM Cd(NO$_3$)$_2$ and 5 mM Zn(NO$_3$)$_2$ solutions, respectively. The total concentration of metal ions in solution was 5 mM. 10 mL of pH-adjusted PAA was obtained and placed in a 50 mL beaker followed by the dropwise addition of 10 mL of the metal salt solution under vigorous stirring to yield 20 mL of a Cd$_{0.1}^{2+}$Zn$_{0.9}^{2+}$/PAA solution with a final [Cd$_{0.1}^{2+}$Zn$_{0.9}^{2+}$] of 2.5 mM and final PAA concentration of 1 mg/mL.

Example 32

Polyanion Collapse with $Cd^{2+}$—$Zn^{2+}$ (10%) Cations

In a 400 mL plastic beaker, 400.0 mg of PAA (Sigma, Average $M_r$ 1.2 million) was dissolved in 200 mL deionized water. The plastic beaker was immersed in a hot water bath (approximately 80-90° C.) and was stirred vigorously for at least 30 minutes or until all of the solid PAA had dissolved. Once the solution had cooled to room temperature, the pH was adjusted to 6.8 using 0.1 M NaOH. pH measurements were done using narrow-range pH paper. 6 mL of a $Cd_{0.9}Zn_{0.1}(NO_3)_2$ solution was prepared by mixing together of 5.4 mL and 0.6 mL of 5 mM $Cd(NO_3)_2$ and 5 mM $Zn(NO_3)_2$ solutions, respectively. The total concentration of metal ions in solution was 5 mM. 10 mL of pH-adjusted PAA and 4 mL of deionized water were obtained and placed in a 50 mL beaker. 6 mL of the metal salt solution was then added dropwise under vigorous stirring to yield 20 mL of a $Cd_{0.9}^{2+}Zn_{0.1}^{2+}$/PAA solution with a final $[Cd_{0.9}^{2+}Zn_{0.1}^{2+}]$ of 1.5 mM and final PAA concentration of 1 mg/mL.

Example 33

Polyanion Collapse with $Cd^2$/$Mn^{2+}$ (1%) Cations

In a 400 mL plastic beaker, 400.0 mg of PAA (Sigma, Average $M_r$ 1.2 million) was dissolved in 200 mL deionized water. The plastic beaker was immersed in a hot water bath (approximately 80-90° C.) and was stirred vigorously for at least 30 minutes or until all of the solid PAA had dissolved. Once the solution had cooled to room temperature, the pH was adjusted to 6.8 using 0.1 M NaOH. pH measurements were done using narrow-range pH paper. 25 mL of a $Cd_{0.99}Mn_{0.01}(NO_3)_2$ solution was prepared by mixing together of 24.75 mL and 0.25 mL of 5 mM $Cd(NO_3)_2$ and 5 mM $Mn(NO_3)_2$ solutions, respectively. The total concentration of metal ions in solution was 5 mM. 20 mL of the pH-adjusted PAA and 25 mL of deionized water were obtained and placed in a 100 mL beaker. 15 mL of the metal solution was then added dropwise under vigorous stirring to yield 60 mL of a $Cd_{0.99}^{2+}Mn_{0.01}^{2+}$/PAA solution with a final $[Cd_{0.99}^{2+}Mn_{0.01}^{2+}]$ of 1.25 mM and final PAA concentration of 0.67 mg/mL.

Example 34

Polyanion Collapse with $Cd^{2+}$/$Hg^{2+}$ (50%) Cations

In a 400 mL plastic beaker, 400.0 mg of PAA (Sigma, Average $M_r$ 1.2 million) was dissolved in 200 mL deionized water. The plastic beaker was immersed in a hot water bath (approximately 80-90° C.) and was stirred vigorously for at least 30 minutes or until all of the solid PAA had dissolved. Once the solution had cooled to room temperature, the pH was adjusted to 6.8 using 0.1 M NaOH. pH measurements were done using narrow-range pH paper. 25 mL of a $Cd_{0.5}Hg_{0.5}(NO3)2$ solution was prepared by mixing together of 12.5 mL and 12.5 mL of 5 mM $Cd(NO_3)_2$ and 5 mM $Hg(NO_3)_2$ solutions, respectively. The total concentration of metal ions in solution was 5 mM. 20 mL of the pH-adjusted PAA and 25 mL of deionized water were obtained and placed in a 100 mL beaker. 15 mL of the metal solution was then added dropwise under vigorous stirring to yield 60 mL of a $Cd_{0.5}^{2+}Hg_{0.5}^{2+}$/PAA solution with a final $[Cd_{0.5}^{2+}Hg_{0.5}^{2+}]$ of 1.25 mM and final PAA concentration of 0.67 mg/mL.

Example 35

Polyacrylic Acid Crosslinking with 4 G25T8 Germicidal Lamps 60 mL of $Cd_x^{2+}Pb_{1-x}^{2+}$/PAA was prepared according to Example 29 and was placed in a 150.0 mL glass beaker. The solution was exposed to 4 G25T8 germicidal UV lamps (approximate power is 12 μW/mm$^2$) for approximately 30 minutes under vigorous stirring. The irradiated solution was then dialyzed against deionized water for 3 hours, changing the deionized water reservoir every hour. Collapsed PAA with $Cd_xZn_{1-x}(NO_3)_2$, $Cd_xMn_{1-x}(NO_3)_2$, $Cd_xMg_{1-x}(NO_3)_2$ ... was UV-irradiated in a similar manner for approximately 1 hour. The viscosity of the collapsed irradiated, dialyzed solutions was much lower than that of collapsed, un-irradiated solutions. These solutions were filterable using a 0.2 μm nylon syringe filter.

Example 36

$Cd_{0.5}Pb_{0.5}Te$/PAA Nanoparticles

Figure 23:
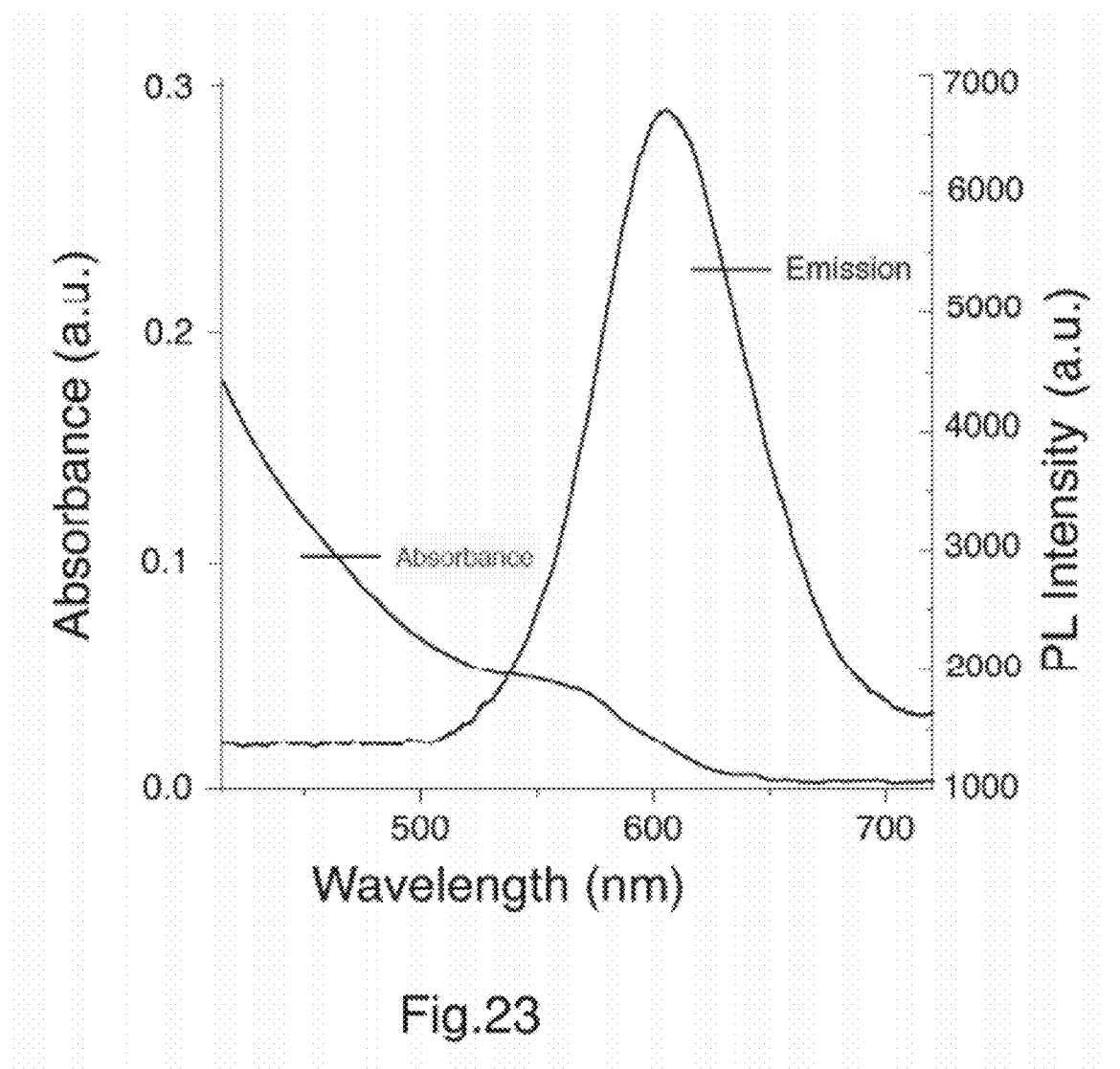
FIG. 23 represents absorbance and emission spectra of CdPbTe/PAA composite nanoparticles produced according to Example 36 according to the present invention.

Under ambient conditions, 20 ml of $Cd_x^{2+}Pb_{1-x}^{2+}$/PAA produced according to Example 35 was placed in a 100 mL round bottom flask. The pH was adjusted to 11 using 1.1 M NaOH. pH measurements were done using narrow-range pH paper. To this solution, 20.4 mg of $NaBH_4$ and 28.3 mg of trisodium citrate were added while the solution was being stirred. Immediately after the addition of the borohydride and the citrate, 0.625 mL of 0.01 $Na_2TeO_3$ was added. The solution develops a yellow colour upon addition of the tellurium-containing salt. The solution was then refluxed for approximately one hour under $N_2$ atmosphere to allow CdPbTe/PAA nanoparticles to form. The absorbance and emission spectra of the resulting solution after one hour of reflux is shown in FIG. 23. Unfortunately, the colloidal solutions were extremely unstable upon exposure to air and this was marked by a quick disappearance of the characteristic absorbance and emission spectra shown in FIG. 23.

Example 37

$Cd_{0.9}Zn_{0.1}Te$/PAA Nanoparticles

Figure 24:
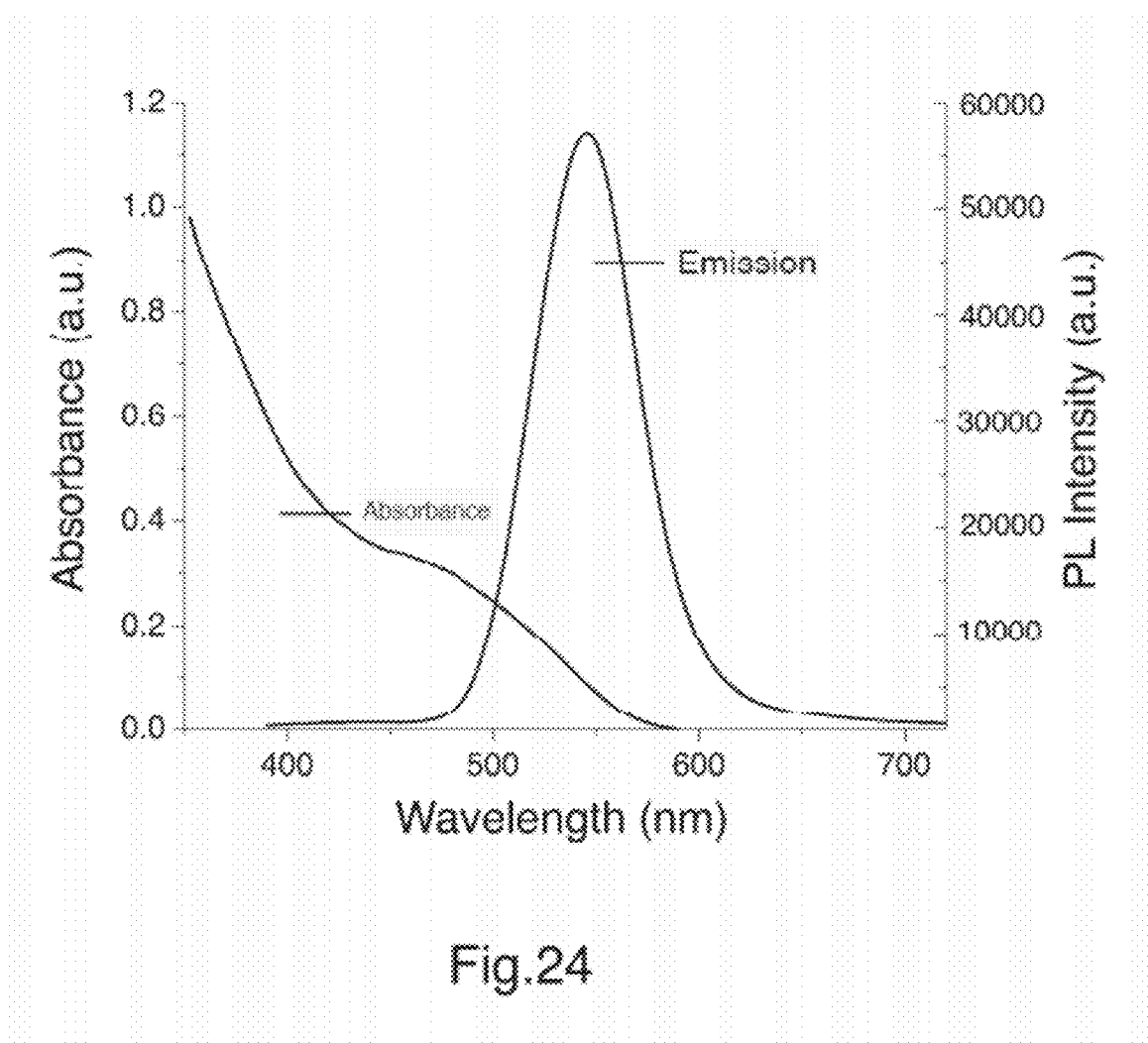
FIG. 24 absorbance and emission spectra of CdZnTe/PAA composite nanoparticles produced according to Example 37 according to the invention.

Under ambient conditions, 8 mL of $Cd_{0.9}^{2+}Zn_{0.1}^{2+}$/PAA produced according to Example 32 was placed in a 25 mL round bottom flask, and cross-linked using the permitted lamp as hereinabove described. To this solution, 15 mg of $NaBH_4$ and 30 mg of trisodium citrate were added while the solution was being stirred. Immediately after the addition of the borohydride and the citrate, 0.3 mL of 0.01 $Na_2TeO_3$ was added. The solution develops a peach colour upon addition of the tellurium-containing salt. The solution was then refluxed for approximately two hours to allow CdZnTe/PAA nanoparticles to form. The absorbance and emission spectra of the resulting solution after two hours of reflux are shown in FIG. 24.

Example 38

$Cd_{0.99}Mn_{0.01}Te$/PAA Nanoparticles

Figure 25:
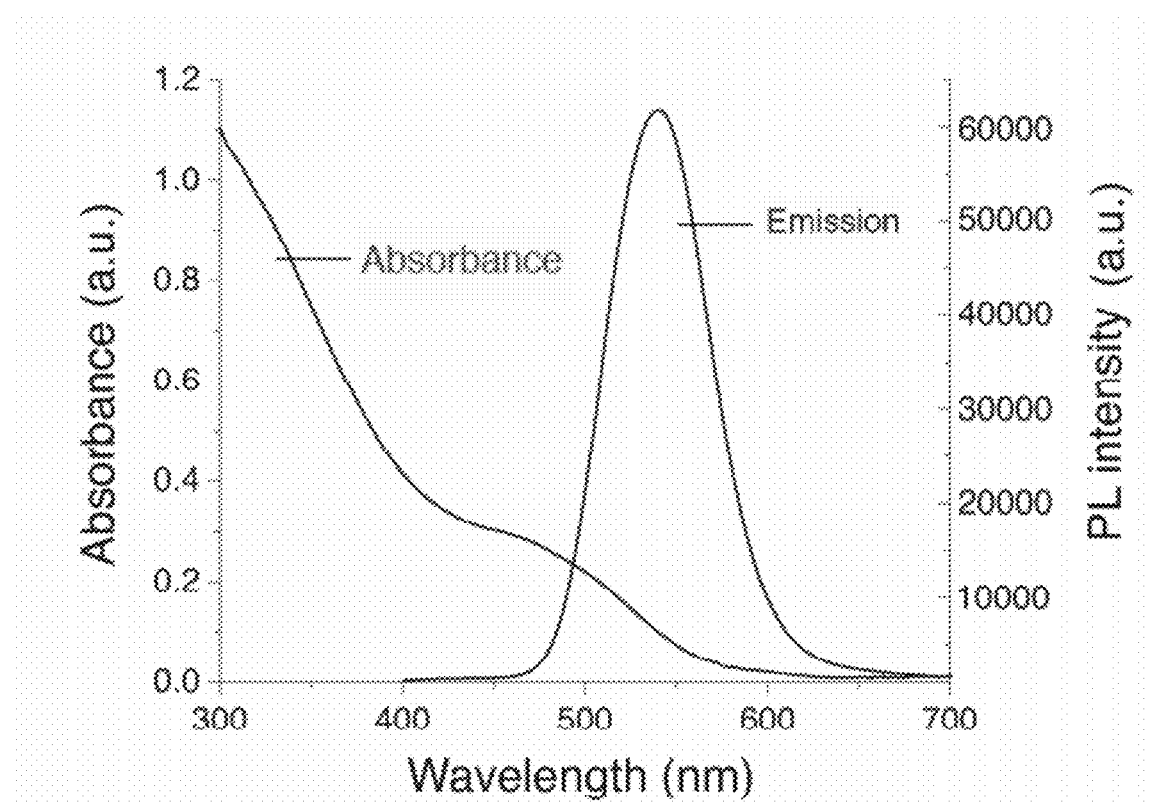
FIG. 25 absorbance and emission spectra of CdMnTe/PAA composite nanoparticles produced according to Example 38 according to the present invention.

Under ambient conditions, 10 mL of $Cd_{0.99}^{2+}Mn_{0.01}^{2+}$/PAA produced according to Example 33 was placed in a 25 mL round bottom flask, and cross-linked using the permitted lamp as hereinabove described. To this solution, 20 mg of NaBH$_4$ and 37 mg of trisodium citrate were added while the solution was being stirred. Immediately after the addition of the borohydride and the citrate, 0.313 mL of 0.01 Na$_2$TeO$_3$ was added. The solution develops a peach colour upon addition of the tellurium-containing salt. The solution was then refluxed for approximately one hour to allow CdMnTe/PAA nanoparticles to form. The absorbance and emission spectra of the resulting solution after one hour of reflux are shown in FIG. 25.

Example 39

Cd$_{0.5}$Hg$_{0.5}$Te/PAA Nanoparticles

Under ambient conditions, 10 mL of Cd$_{0.5}^{2+}$Hg$_{0.5}^{2+}$/PAA produced according to Example 34 was placed in a 25 mL round bottom flask, and cross-linked using the permitted lamp as hereinabove described. To this solution, 16 mg of NaBH$_4$ and 29 mg of trisodium citrate were added while the solution was being stirred. Immediately after the addition of the borohydride and the citrate, 0.313 mL of 0.01 Na$_2$TeO$_3$ was added. The solution remained colourless upon addition of the tellurium-containing salt. The solution was then refluxed for approximately one hour to allow CdHgTe/PAA nanoparticles to form. However, the refluxed solution was not fluorescent.

Example 40

Formation of Methylene Blue/PAA Nanoparticles

In a 400 ml plastic beaker, 400.0 mg of PAA (Sigma, Average M$_r$ 1.2 million) was dissolved in 200 ml deionized water. The plastic beaker was immersed in a hot water bath (approximately 80-90° C.) and was stirred vigorously for at least 30 minutes or until all of the solid PAA has dissolved. Once the solution has cooled to room temperature, the pH was adjusted to 6.8 using 0.1 M NaOH. pH measurements were done using narrow range pH paper. 20.0 ml of this PAA solution was placed in a glass beaker and to this, 20.0 ml of aqueous 5.0 mM Methylene Blue solution was added dropwise under vigorous stirring. After all of the Methylene Blue solution was added, the viscosity of the mixture was observed to be much less than the original PAA solution. The resulting solution was exposed to UV radiation using 4 G25T8 germicidal UV lamps for 1.5 hours. The viscosity of the UV-irradiated Methylene Blue/PAA solution was less than the viscosity of the solution not exposed to UV radiation.

Example 41

Silver Nanoclusters

A PAA-PSS solution of was prepared as follows: 25.0 ml of 2 mg/ml PAA (1.2 million MW, pH adjusted to 6.8 with NaOH) was prepared and placed in a glass beaker. To this, 2.5 mg of PSS (70K MW) was added and the solution was stirred vigorously on a magnetic stirplate for about 20 minutes. The resulting solution, 25.0 ml PAA-PSS was clear and viscous and had a pH of about 6.8.

PAA-PSS was collapsed with Ag$^+$ in the following manner. Ag$^+$ collapsing solution was prepared by diluting 2.0 ml of 0.10 M AgNO3 to 25 ml with deionized water. This was then added dropwise to 25 ml of PAA-PSS under vigorous stirring. The rate of addition of the Ag+ collapsing solution was approximately 4-5 ml/min.

Figure 26:
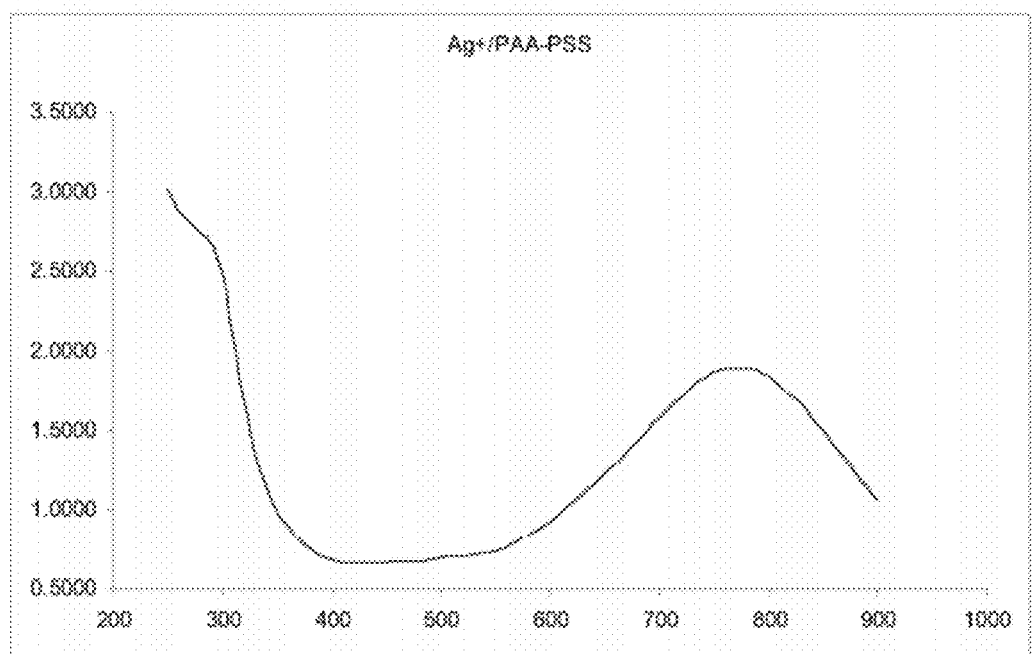
FIG. 26 represents UV-vis absorbance spectra of blue colored Ag$^+$/PAA-PSS produced according to Example 41 according to the present invention.

Once all of the collapsing solution has been added, the solution was then exposed to UV radiation under a UV-germicidal lamp for approximately 4 hours to obtain Ag$^+$/PAA-PSS. A spectra of this resulting solution is shown in FIG. 26. This solution can easily be filtered through a 0.2 micron syringe filter.

Figure 27:
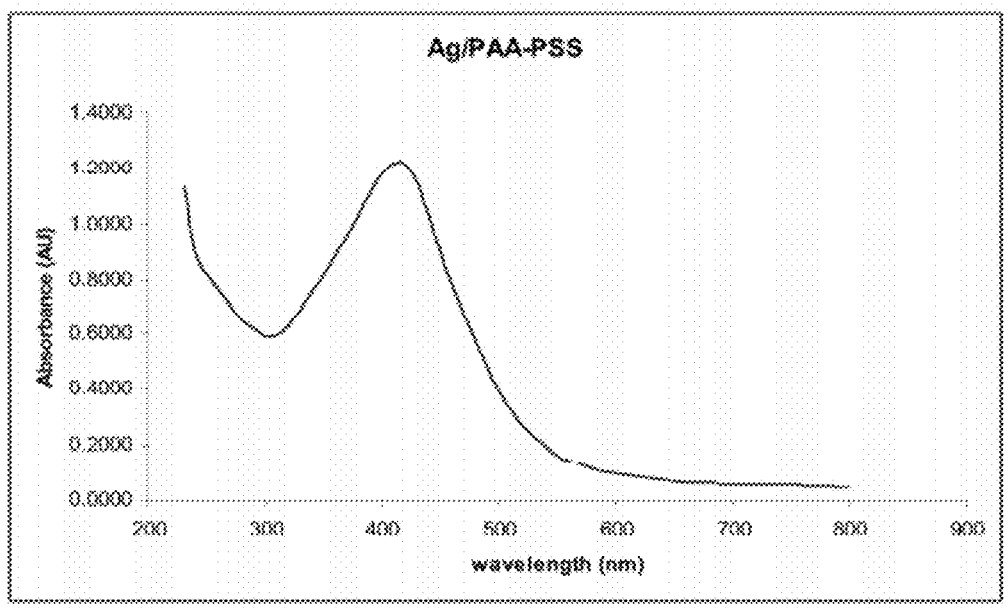
FIG. 27 represents UV-vis absorbance spectra of Ag/PAA-PSS produced according to Example 41 according to the present invention.

The silver was reduced as follows to produce silver nanoclusters: to the resulting solution after crosslinking, an excess of NaBH4 was added (approximately 5.0 mg solid NaBH4 for 25.0 ml of Ag$^+$/PAA-PSS) while the solution was being stirred. The solution turned from blue to amber-brown after borohydride addition. The spectra of the solution (now Ag/PAA-PSS) is shown below in FIG. 27.

We believe, without being held to theory, that this process produces silver nanoclusters, clusters of less than about 100 silver atoms, as demonstrated by the shift in the surface plasmon UV-Vis peak.

Example 42

Doped Nanoclusters: Indium-Tin/PAA

Sn(II) and In(III) precursor solutions can be prepared as follows. 32 mM SnCl$_2$ can be made by dissolving 0.2443 g of SnCl$_2$ in 39 ml of deionized water and 1 ml of 1M HCl. 24 mM In(NO$_3$)$_3$ can be made by dissolving 0.2488 g of In(NO$_3$)$_3$ in 40.0 ml deionized water. A 4 mM (In—Sn) precursor solution (1:1 mole ratio In(III):Sn(II)) can be made by mixing 4.2 ml of 24 mM In(NO$_3$)$_3$ and 3.1 ml of 32 mM SnCl$_2$ and diluting the mixture to 50 ml with deionized water.

In(III)-Sn(II)/PAA can be made by adding 25 ml of a 4 mM (In—Sn) precursor solution dropwise to 25 ml of pH 6.8 2 mg/mL PAA under vigorous stirring. Once all of the precursor solution has been added, the resulting mixture is exposed to a UV germicidal lamp for approximately 2 hours or until the solution could be filtered through a 0.2 micron syringe filter.

The mixed In—Sn oxide nanoparticle can be formed by adding NaOH to 20 ml of the UV exposed solution until the pH was between 10-11 and heated under reflux for 2 hours. Confirmation of the chemical structure can be obtained using XRD.

Example 43

Doped Nanoparticles and Nanoclusters: Zinc-Sulfur/PAA-PSS$_{5\%}$

Figure 28:
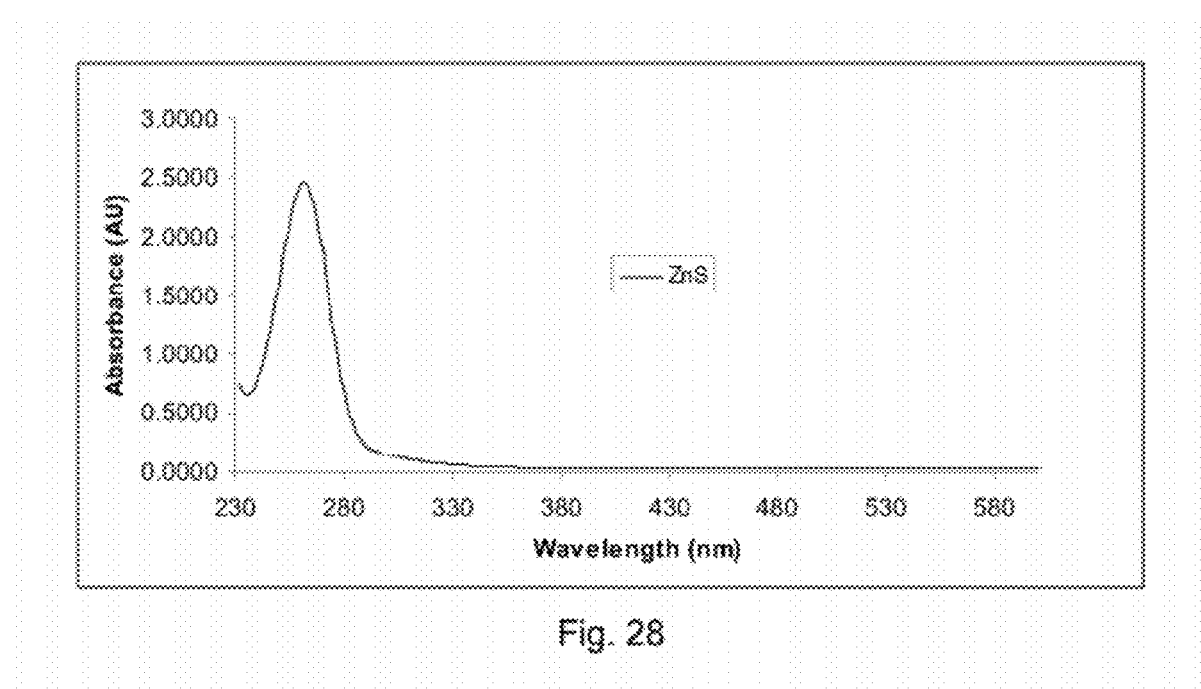
FIG. 28 represents an absorption profile of ZnS/PAA-PSS$_{5\%}$ nanoparticles diluted 10× produced according to Example 43 according to the present invention.

A ZnS nanocluster was prepared as follows. 200.0 ml of Zn$^{2+}$/PAA-PSS$_{5\%}$ (prepared substantially according to Example 9) was placed in a 250 ml round bottom flask. To this, 8.0 mL of 0.10 M aqueous Thioacetamide solution was added. The resulting mixture was stirred and heated to 80-90° C. for 17 hours under reflux. After heating, the solution was clear and had a very light yellow color. The UV-visible absorption spectrum of the sample diluted 10× is shown in FIG. 28.

Example 44

Doped Nanoparticles and Nanoclusters: Zn/Cd

Figure 29:
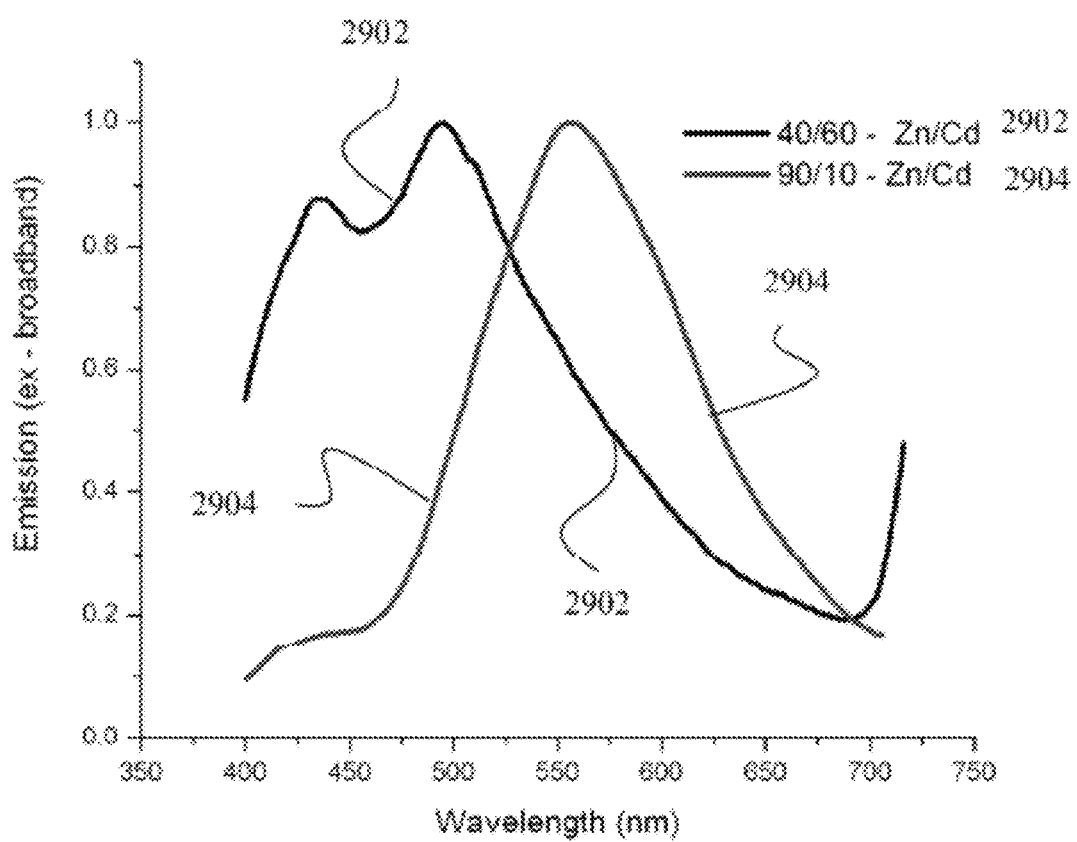
FIG. 29: represents measurements of fluorescence emission when excited using a broadband UV source of (Zn—Cd)S/PAA with different compositions prepared according to Example 44 according to the present invention.

A 40/60 mole ratio Zn/Cd-PAA solution (Solution 1) was made as follows. 2.4 ml of 5 mM Zn(NO$_3$)$_2$ and 3.6 ml of 5 mM Cd(NO$_3$)$_2$ were mixed together and diluted to 10 ml with deionized water. This solution was added dropwise, under vigorous stirring to 10 ml of pH 6.8, 2 mg/ml PAA (1.2 million MW). The final solution was exposed to a UV germicidal lamp for 2 hours. A 90/10 mole ratio Zn/Cd-PAA solution (Solution 2) was made as follows. 9.0 ml of 5 mM $Zn(NO_3)_2$ and 1.0 ml of 5 mM $Cd(NO_3)_2$ were mixed together. This solution was added dropwise, under vigorous stirring to 10 ml of pH 6.8, 2 mg/ml PAA (1.2 million MW). The final solution was exposed to a UV germicidal lamp for 2 hours. (Zn—Cd)S/PAA was made from Solutions 1 and 2 by adding 0.5 ml of 4.5 mM $Na_2S$ to 0.5 ml of Solutions 1 and 2. The resulting emission spectra of the formed (Zn—Cd)S/PAA nanoparticles for a 40/60 mole ratio of Zn/Cd-PAA solution (2902) and a 90/10 mole ratio of Zn/Cd-PAA solution (2904) are shown in FIG. 29.

Example 45

Biopolymer Particles: Chitosan

Figure 30:
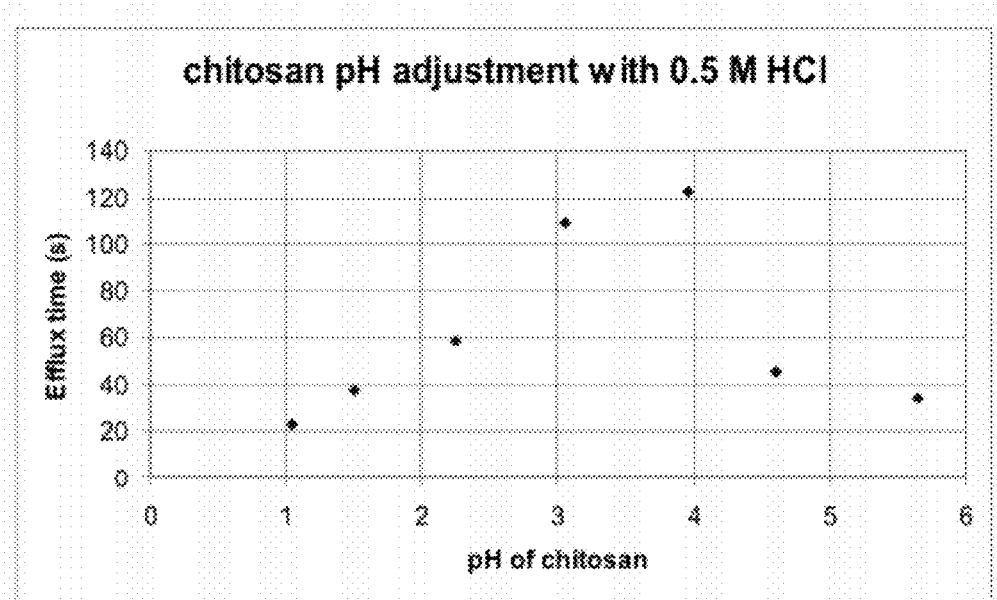
FIG. 30 represents measurements of viscosity as a function of pH for chitosan according to Example 45 according to the present invention, demonstrating collapse transition.

In various embodiments, the polymer portion comprises a biomolecule, e.g., a protein or other polymer. A nanoparticle using a random copolymer, here the biomolecule chitosan, was formed as follows. 0.9974 g Chitosan (High molecular weight, SIGMA) was dissolved in 100 ml 1% acetic acid solution. The initial pH of the solution right after dissolution is about 3.8-4.1 using pH paper. For pH-viscosity measurements, the pH of the initial Chitosan solution was adjusted between the pH range 1-6 to determine different viscosities at different pH. Chitosan starts to precipitate above pH 7; pH was adjusted using 0.5 M HCl or 0.5 M NaOH. Viscosity was measured in terms of "Efflux times (s)"—the time it took the solution level to move between 2 points in an ostwald viscometer. pH vs "Efflux time" plots are shown in FIG. 30.

Figure 31:
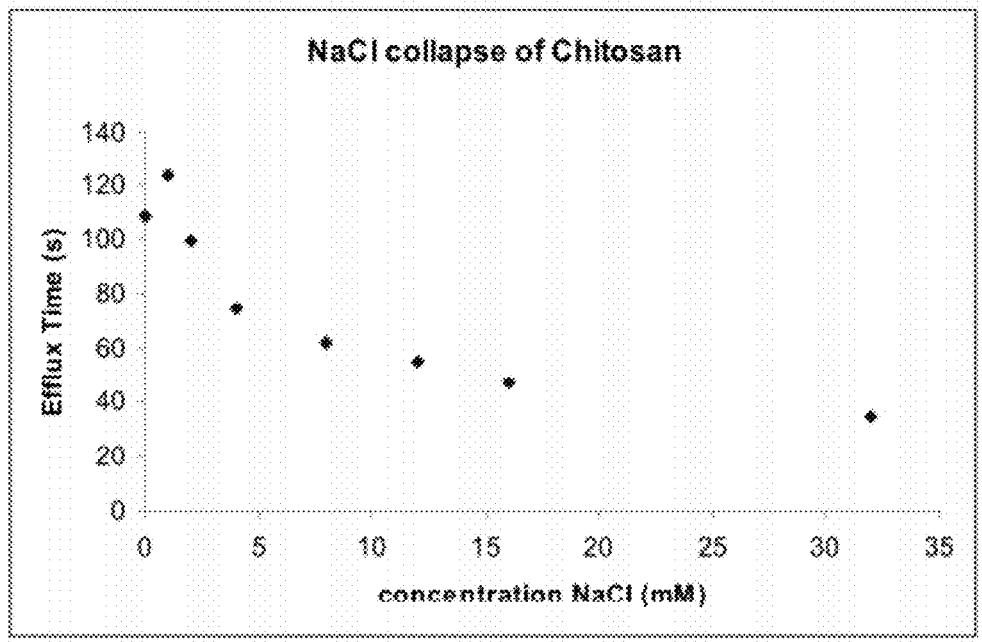
FIG. 31 represents measurements of the efflux time as a function of NaCl concentration according to Example 45 according to the present invention, demonstrating collapse transition.

Collapse of chitosan with a salt (NaCl) was also performed. To measure the amount of salt required to collapse chitosan, different solutions with varying NaCl concentrations were prepared and their corresponding solution viscosities were measured. For viscosity measurements, 20 ml of 2.5 mg/ml Chitosan solutions with different NaCl concentrations were made (0, 1, 4, 8, 12, 16, 32 mM NaCl). For example, to prepare 20.0 ml of 2.5 mg/ml chitosan with 4 mM NaCl, 10 ml of 5 mg/ml Chitosan was placed in small beaker. To this, 10 ml of 8 mM NaCl was added dropwise under vigorous stirring. The resulting mixture's viscosity was measured using an ostwald viscometer. The point of collapse was taken as when there was a change of slope in the efflux time vs NaCl concentration plot, at about 5 mM NaCl in FIG. 31.

Example 46

Zn Nanoparticle Formed by Vapor-Based Reduction

A composite nanoparticle can be formed as follows. 300 mL of $Zn^{2+}$/PAA prepared substantially as described in Example 5 using $Zn(NO_3)_2$ as the collapsing agent can be crosslinked according to Example 12. The solvent is then removed using rotary evaporation and the resulting powder placed in a crucible. The crucible is placed in a reducing atmosphere containing $H_2$ until Zn/PAA nanoparticles are formed. Existence of the Zn nanoparticles can be confirmed using electron microscopy.

Example 47

Collapse by pH

The polymer portion can be collapsed by a variety of approaches. In various embodiments, to a polyelectrolyte in its extended conformation is added a counterion—in an amount an insufficient to collapse the polymer. The counterion will associate with the polyelectrolyte but not collapse it. A collapse transition can be then driven, e.g., by one or more of: changing pH, solvent change, evaporation of solvent, cavitation, etc., to form a nanoparticle.

In various embodiments, collapse is facilitated and/or initiated by a change in pH as follows. To a 50 mL solution of PAA (2 mg/mL) add 30 mL of dd$H_2O$ in one portion followed by 12 mL of $Cd(NO_3)_2$ solution (5 mM) dropwise. After completion of addition the solution, adjust pH to about 3.5 by adding a solution of $HNO_3$ (5 mM). The resulting solution can be irradiated with UV light (254 nm) for 1 h. The resulting solution having a much decreased viscosity relative to uncollapsed PAA.

Example 48

Catalytic Activity of Nanoparticles

Figure 32:
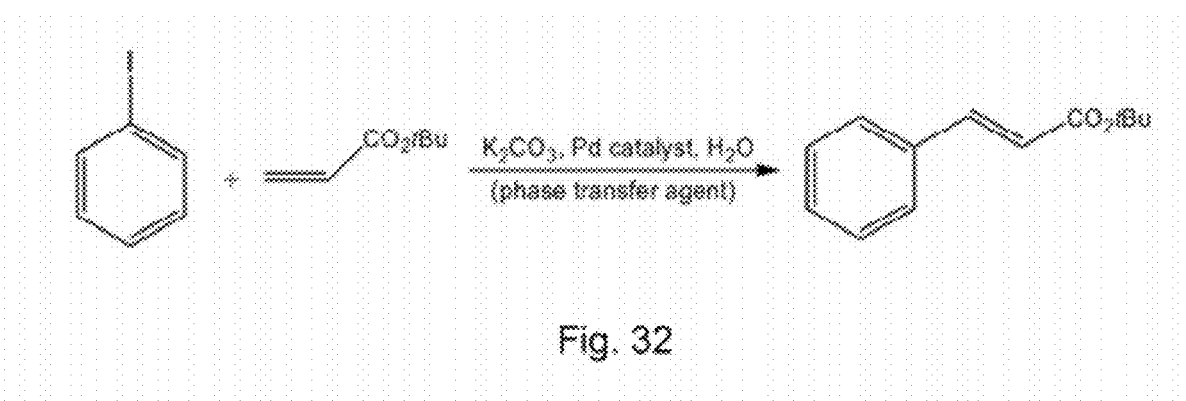
FIG. 32 schematically represents a Heck coupling reaction catalyzed by Pd nanoparticles prepared according to Example 51 according to the present invention.

The present example illustrates the catalytic activity of various embodiments of nanoparticles of the present inventions in performing a Heck reaction. A schematic for the reaction is shown in FIG. 32.

The nanoparticles were prepared as follows. In a round-bottom flask were put iodobenzene (22 uL, 0.20 mMol, 1 equiv.), tertbutyl acrylate (34.4 uL, 0.24 mMol, 1.2 equiv), $K_2CO_3$ (69 mg), dd$H2O$, palladium nanoparticles prepared according to the present invention, (100 uL, ~1.67 mM in palladium, 0.1%), and additive ($Bu_4NCl$ (56 mg) if indicated). Initially 0.5 mL dd$H2O$ was added, then 0.5 mL more was added after two days to prevent the reaction from drying up. The mixture was stirred at reflux at about 100° C. for 7 days, allowed to cool down to room temperature, and extracted with $CH_2Cl_2$. The combined extracts was dried with $MgSO_4$, filtered, and evaporated in vacuo. The NMR of the crude product was taken to confirm the success of the coupling reaction.

Example 49

Isotopic Substitutions

In various embodiments, isotopically substitutes nanoparticles can be formed. For example, isotopically enriched CdTe—ZnS/PAA composite nanoparticles can be produced according to a slightly modified version of Example 17. Instead of 167 μL of 39.5 mM $Na_2S$ in its standard isotopic state, 167 uL of 39.5 mM $Na_2{}^{35}S$ was used, where $^{35}S$ denotes the isotope of sulphur having a mass of about 34.9690322 amu, which can be obtained from commercial sources.

Example 50

Pyrolysis of Nanoparticles

Figure 33:
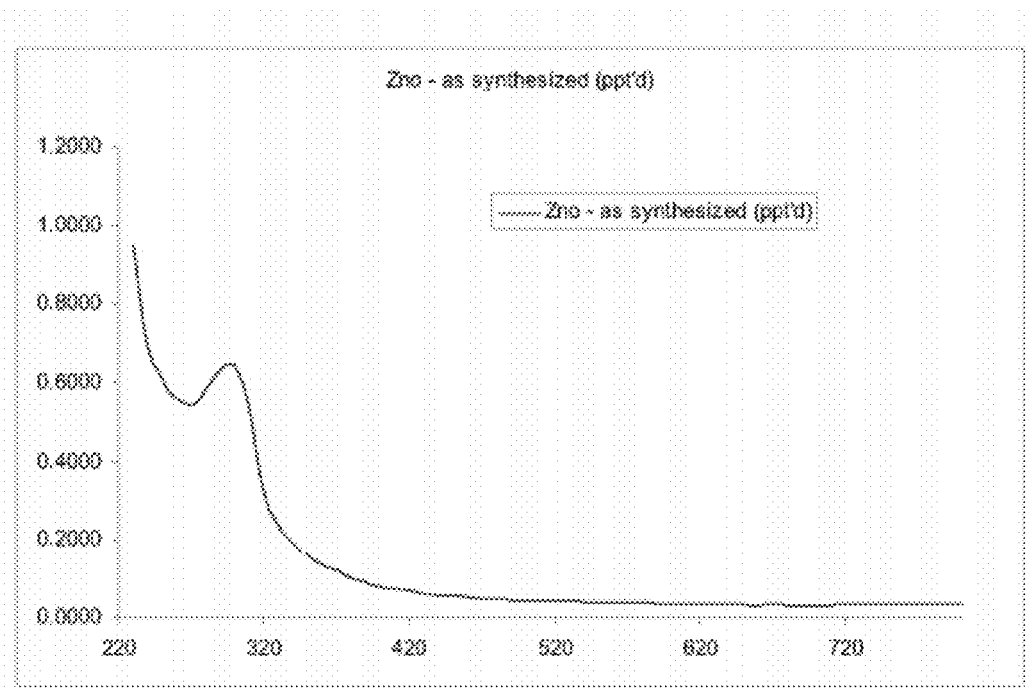
FIG. 33 represents UV-Vis absorbance spectra of ZnO nanoparticles prepared according to Example 53 according to the present invention.

ZnO nanoparticles were prepared as follows: 200 ml $Zn^{2+}$/PAA was placed in a 3 necked round bottom flask. A condenser was placed on the center neck and the other 2 necks were covered with rubber septa. NaOH solution. For 200 ml $Zn^{2+}$/PAA 50 mL of 13.4 mM NaOH was needed. 100 ml of 13.4 mM NaOH was prepared by adding 134 μL of 10 N NaOH to 50 mL water in a 100 mL graduated cylinder. The solution was diluted to 100 ml with DI water. Next, the round bottom flask with the $Zn^{2+}$/PAA was heated to about 80 degrees. 50 ml of the 13.4 mM NaOH was added with a syringe pump (using a needle) at a rate of 5 ml/min under vigorous stirring. Once all of the NaOH was added (50 ml), the solution was stirred at 8 degrees for 30 mins. Next, it was allowed to cool and was placed in a rotavap until the solution was reduced to about 10 ml. It was then precipitated and allowed to dry; the dried precipitate was flesh-cream in color. When re-suspended the solution is clear. The UV-Vis absorption spectrum of the resulting solution is shown in FIG. 33.

Figure 34:
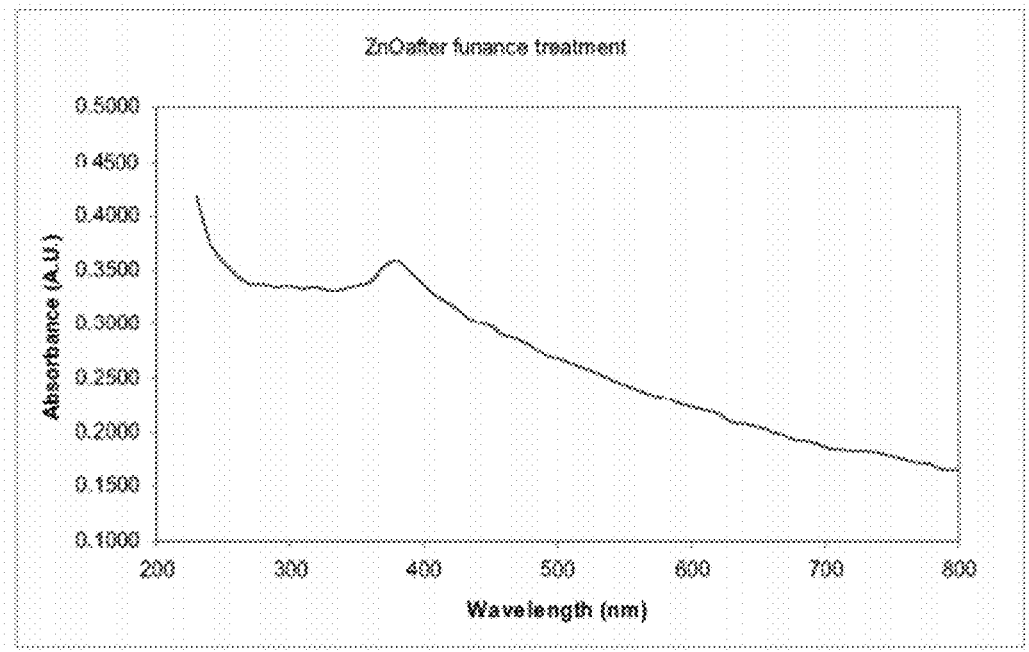
FIG. 34 represents UV-Vis absorption spectrum of the ZnO nanoparticles after heating according to Example 53 according to the present invention.
Figure 35:
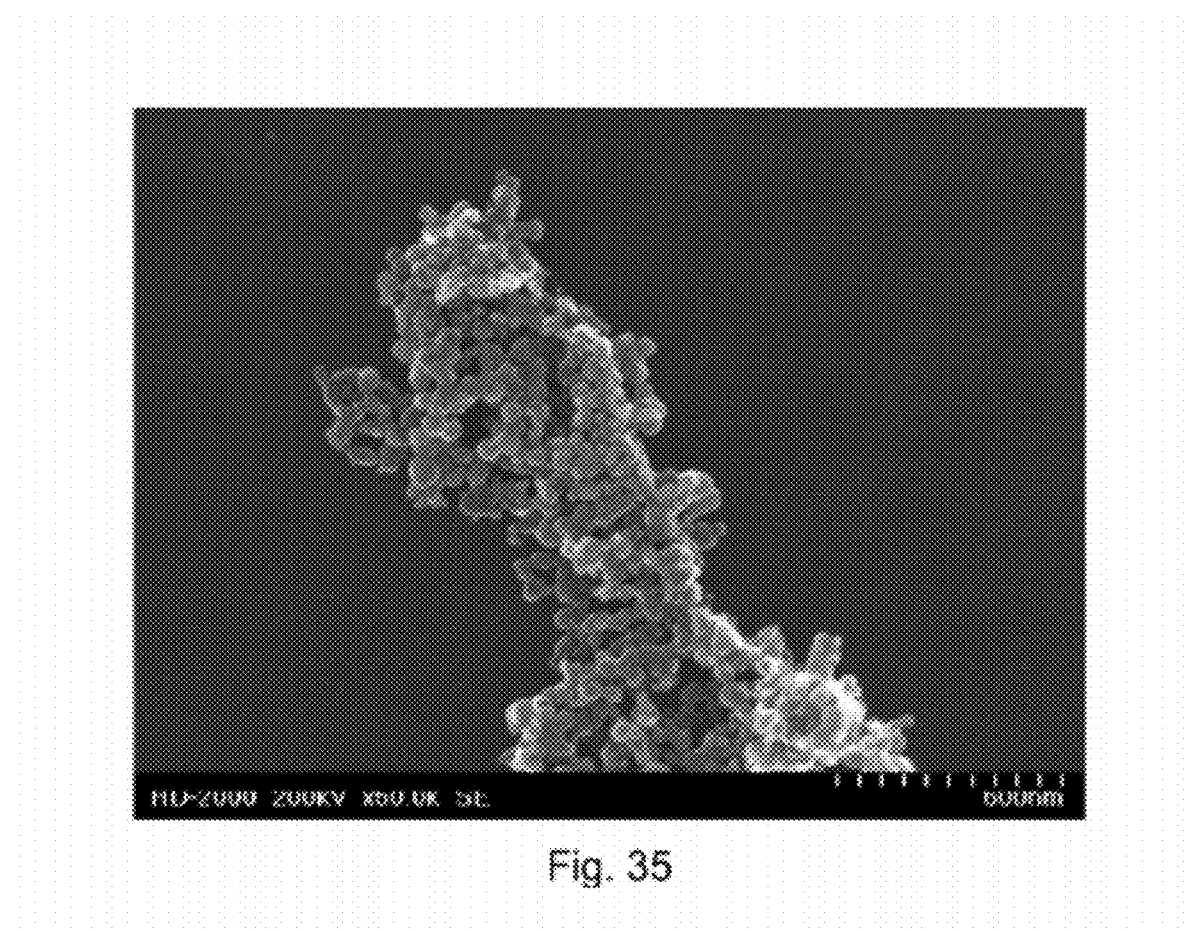
FIG. 35 represents a TEM image of the particles after heating to 450° C. according to Example 53 according to the present invention.

In various embodiments, the material can be sintered. For example, 0.1762 g of the dried precipitate from above was placed in a ceramic crucible was heated in a furnace under ambient atmosphere. The temperature was ramped up from room temperature to 450° C. at a rate of 10°/sec and was kept at 450° C. for 2 hours. After furnace treatment, the ppt was colored grey-white and the final weight was 0.0698 g. Some of the grey-white powder was dispersed in water. The spectra of the resulting suspension is shown in FIG. 34. TEM images of the particles after heating to 450° C. are also shown in FIG. 35. Samples were also heated to about 550° C. and about 700° C. for the same amount of time. The resulting powder from 550° C. heat treatment had a lighter grey color compared to the powder obtained from 450° C. heat treatment. Heating the dried precipitate to 700° C. produced powders that were grey-white in color. Spectra of the different heat treated powder suspensions in water had UV-visible spectra similar to the one shown in FIG. 33. This pyrolysis/sintering process can lead to changes in the nanoparticle size as shown, it is believed without being held to theory, by the spectral shift of the UV-Vis absorption peak and by the TEM images.

Example 51

Carbide Nanoparticles

In various embodiments, carbide nanoparticles can be formed as follows. Collapsed, crosslinked $V^{3+}$/PAA is formed substantially according to example 12, using $VCl_3$ as a precursor. The resulting product is heated in a furnace to 1200 K for 6-12 hours. This can be done, e.g., under (1) low pressure, e.g., vacuum conditions, and/or (2) a reducing atmosphere. In various embodiments, the heating is done under a vacuum of less than about $1 \times 10^{-4}$ torr. Confirmation of the production of vanadium carbide nanoparticles can be obtained using x-ray diffraction.

Example 52

Dispersability of Nanoparticles

In various embodiments, nanoparticle dispersability can be increased as follows. For example for CdTe/PAA, CdTe/PAA nanoparticles are produced as described in Example 12 or 16. After synthesis, the approximate concentration of PAA in solution is maintained at about 1 mg/ml. The nanoparticles are precipitated out of solution and then dried. The dried nanoparticles can be resuspended in less water than the original solution making up a more concentrated solution of nanoparticles. In various embodiments, up to about 32 times the original concentration. This can bring the effective 1.2 million MW PAA concentration to about 32 mg/ml. This exceeds the normal solubility of PAA in water.

Example 53

Removal of Polymer from Composite Nanoparticle by Cleavage

The polymer portion can be removed by a variety of approaches, such as, e.g., cleavage of encapsulating crosslinks and/or destruction of the encapsulating crosslinks, and/or cleavage of a coblock and/or chemical cleavage of backbone chains, etc.

For example, in various embodiments polymer can be removed as follows. Under ambient conditions, place 500 mL of CdTe/PAA produced according to Example 16 in a flat-bottom vessel. Place this vessel under a 4 G25T8 germicidal UV lamps (approximate power is 12 $\mu W/mm^2$) for approximately 12-18 hours (or until the polymer is removed, as measured by agglomeration tendency and/or changes in optical properties). Dialyze the irradiated solution against deionized water for 3 hours, changing the deionized water reservoir every hour. When imaged by electron microscopy, isolated and aggregated nanoparticles can be observed but substantially no encapsulating polymer film is observed.

Example 54

Nanoparticle Formed by Decomposition of a Complex

In a plastic 400.0 mL beaker, dilute 3.0 mL of poly (diallyldimethylammonium chloride) (PDDA) [Sigma, Average $M_w$, 400-500K, 20 wt % in water] to 300 mL with deionized water. Stir the solution stirred for 10 minutes. Obtain 5.0 mL aliquots and place in 20 mL scintillation vials. To each dropwise add with vigorous stirring 5.0 mL of aqueous potassium ferrocyanide solutions (2 mM-20 mM) to yield about 10 mL of $[Fe(CN)_6]^{4-}$/PDDA solutions with different $[[Fe(CN)_6]^{4-}]$ between 1 and 10 mM and a final PDDA concentration of about 1 mg/mL. The relative viscosity of each solution can be measured with an Ostwald viscometer. The point at which the viscosity as a function of $[Fe(CN)_6]^{4-}$ concentration changes suddenly can be taken as the PDDA collapse point with $[Fe(CN)_6]^{4-}$, such that at lower concentrations the PDDA is primarily in an extended conformation. The $[Fe(CN)_6]^{4-}$/PDDA can be exposed to 4 G25T8 germicidal UV lamps (approximate UV power is 12 $\mu W/mm^2$) for 1 hour under vigorous stirring to provide crosslinking. The resulting product is refluxed and production of iron or iron oxide nanoparticles can be confirmed by electron microscopy.

All literature and similar material cited in this application, including, patents, patent applications, articles, books, treatises, dissertations and web pages, regardless of the format of such literature and similar materials, are expressly incorporated by reference in their entirety. In the event that one or more of the incorporated literature and similar materials differs from or contradicts this application, including defined terms, term usage, described techniques, or the like, this application controls.

The section headings used herein are for organizational purposes only and are not to be construed as limiting the subject matter described in any way.

While the present inventions have been described in conjunction with various embodiments and examples, it is not intended that the present inventions be limited to such embodiments or examples. On the contrary, the present inventions encompass various alternatives, modifications, and equivalents, as will be appreciated by those of skill in the art. Accordingly, the descriptions, methods and diagrams of should not be read as limited to the described order of elements unless stated to that effect.

Although this disclosure has described and illustrated certain preferred embodiments of the invention, it is to be understood that the invention is not restricted to those particular embodiments. Rather, the invention includes all embodiments which are functional or mechanical equivalence of the specific embodiments and features that have been described and illustrated.

The claims should not be read as limited to the described order or elements unless stated to that effect. It should be understood that various changes in form and detail may be made without departing from the scope of the appended claims. Therefore, all embodiments that come within the scope and spirit of the following claims and equivalents thereto are claimed.

The invention claimed is:

1. A method for producing a composite nanoparticle, comprising the steps of:
   collapsing at least a portion of a polyelectrolyte polymer in solution about one or more precursor moieties to form a composite precursor moiety having a mean diameter in the range between about 1 nm and about 100 nm, wherein the polyelectrolyte polymer has an extended conformation in a first solution state and a more compact conformation in a second solution state; and
   cross-linking the polyelectrolyte polymer of the composite precursor moiety to form a composite nanoparticle
   wherein the precursory moiety is a charged organic ion.

2. The method of claim 1 wherein the composite nanoparticle has a diameter in the range of about 1 nm to about 100 nm.

3. The method of claim 1 wherein the cross-linking is performed by exposing the polyelectrolyte polymer to ultraviolet radiation.

4. The method of claim 1, wherein the collapsing is accomplished by changing the solution from a first solution state to a second solution state.

5. The method of claim 1, wherein the precursory moiety is added to the polyelectrolyte polymer solution in the collapsing step causing the polyelectrolyte polymer to collapse.

6. A method for producing a composite nanoparticle, comprising the steps of:
   collapsing at least a portion of a polyelectrolyte polymer in solution about one or more precursor moieties to form a composite precursor moiety having a mean diameter in the range between about 1 nm and about 50 nm, wherein the polyelectrolyte polymer has an extended conformation in a first solution state and a more compact conformation in a second solution state; and
   cross-linking the polyelectrolyte polymer of the composite precursor moiety to form a composite nanoparticle which has a diameter between about 1 nm and about 50 nm,
   wherein the precursory moiety is a charged organic ion.

7. The method of claim 6, wherein the composite nanoparticle has a diameter in the range of about 1 nm to about 50 nm.

8. The method of claim 6, wherein the cross-linking is performed by exposing the polyelectrolyte polymer to ultraviolet radiation.

9. The method of claim 6, wherein the collapsing is accomplished by changing the solution from a first solution state to a second solution state.

10. The method of claim 6, wherein the precursory moiety is added to the polyelectrolyte polymer solution in the collapsing step causing the polyelectrolyte polymer to collapse.

11. A method for producing a composite nanoparticle, comprising the steps of:
    collapsing at least a portion of a polyelectrolyte polymer in solution about one or more precursor moieties to form a composite precursor moiety having a mean diameter in the range between about 1 nm and about 100 nm, by adding a collapsing agent wherein the polyelectrolyte polymer has an extended conformation in a first solution state and a more compact conformation in a second solution state; and
    cross-linking the polyelectrolyte polymer of the composite precursor moiety to form a composite nanoparticle
    wherein the precursory moiety is the collapsing agent and a charged organic ion.

12. The method of claim 11, wherein the composite nanoparticle has a diameter in the range of about 1 nm to about 100 nm.

13. The method of claim 11, wherein the cross-linking is performed by exposing the polyelectrolyte polymer to ultraviolet radiation.

14. The method of claim 11, wherein the collapsing is accomplished by changing the solution from a first solution state to a second solution state.

15. A method for producing a composite nanoparticle, comprising the steps of:
    collapsing at least a portion of a polyelectrolyte polymer in solution about one or more precursor moieties to form a composite precursor moiety having a mean diameter in the range between about 1 nm and about 100 nm, wherein the polyelectrolyte polymer has an extended conformation in a first solution state and a more compact conformation in a second solution state; and
    cross-linking the polyelectrolyte polymer of the composite precursor moiety to form a composite nanoparticle
    wherein the precursory moiety is a charged organic ion; and
    the polyelectrolyte polymer is a co-polymer.

16. The method of claim 15, wherein the precursor moiety has a diameter in the range between about 1 nm and about 50 nm.

17. The method of claim 15, wherein the composite nanoparticle has a diameter in the range of about 1 nm to about 100 nm.

18. The method of claim 15, wherein the composite nanoparticle has a diameter in the range of about 1 nm to about 50 nm.

19. The method of claim 15, wherein the cross-linking is performed by exposing the polyelectrolyte polymer to ultraviolet radiation.

20. The method of claim 15, wherein the collapsing is accomplished by changing the solution from a first solution state to a second solution state.

21. The method of claim 15, wherein the precursory moiety is added to the polyelectrolyte polymer solution in the collapsing step causing the polyelectrolyte polymer to collapse.

22. A method for producing a composite nanoparticle, comprising the steps of:
    collapsing at least a portion of a polyelectrolyte polymer in solution about one or more precursor moieties to form a composite precursor moiety having a mean diameter in the range between about 1 nm and about 100 nm, wherein the polyelectrolyte polymer has an extended conformation in a first solution state and a more compact conformation in a second solution state; and irradiating the polyelectrolyte polymer of the composite precursor moiety with ionizing radiation to form a composite nanoparticle wherein the precursory moiety is a charged organic ion.

23. The method of claim 22, wherein the precursor moiety has a diameter in the range between about 1 nm and about 50 nm.

24. The method of claim 22, wherein the composite nanoparticle has a diameter in the range of about 1 nm to about 100 nm.

25. The method of claim 22, wherein the composite nanoparticle has a diameter in the range of about 1 nm to about 50 nm.

26. The method of claim 22, wherein the ionizing radiation is ultraviolet radiation.

27. The method of claim 22, wherein the collapsing is accomplished by changing the solution from a first solution state to a second solution state.

28. The method of claim 22, wherein the precursory moiety is added to the polyelectrolyte polymer solution in the collapsing step causing the polyelectrolyte polymer to collapse.

* * * * *